(12) United States Patent
Amaki et al.

(10) Patent No.: US 11,734,112 B2
(45) Date of Patent: *Aug. 22, 2023

(54) MEMORY SYSTEM

(71) Applicant: Kioxia Corporation, Tokyo (JP)

(72) Inventors: Takehiko Amaki, Yokohama (JP);
Toshikatsu Hida, Yokohama (JP);
Shunichi Igahara, Fujisawa (JP);
Yoshihisa Kojima, Kawasaki (JP);
Suguru Nishikawa, Arakawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,881

(22) Filed: Jul. 21, 2022

(65) Prior Publication Data
US 2022/0358011 A1 Nov. 10, 2022

Related U.S. Application Data

(63) Continuation of application No. 17/198,451, filed on Mar. 11, 2021, now Pat. No. 11,442,808.

(30) Foreign Application Priority Data

Mar. 12, 2020 (JP) ................................. 2020-042783
Jan. 28, 2021 (JP) ................................. 2021-012149

(51) Int. Cl.
*G11C 29/00* (2006.01)
*G06F 11/10* (2006.01)
*G06F 12/0891* (2016.01)
*G06F 12/02* (2006.01)
*G06F 11/07* (2006.01)

(52) U.S. Cl.
CPC ........ *G06F 11/1068* (2013.01); *G06F 11/073* (2013.01); *G06F 11/1004* (2013.01); *G06F 12/0246* (2013.01); *G06F 12/0891* (2013.01)

(58) Field of Classification Search
CPC ............. G06F 12/0891; G06F 12/0246; G06F 11/1068; G06F 11/1004; G06F 11/073
See application file for complete search history.

(56) References Cited

U.S. PATENT DOCUMENTS

| | | | |
|---|---|---|---|
| 9,026,893 B1 | 5/2015 | Syu et al. | |
| 10,127,997 B2 | 11/2018 | Baek et al. | |
| 10,748,589 B1 | 8/2020 | Yamada | |
| 11,442,808 B2 * | 9/2022 | Amaki | ................ G06F 12/0891 |
| 2010/0241930 A1 | 9/2010 | Chang | |
| 2016/0291869 A1 | 10/2016 | Yi | |
| 2019/0220353 A1 | 7/2019 | Yang et al. | |
| 2020/0264950 A1 | 8/2020 | Schaefer | |

* cited by examiner

*Primary Examiner* — Samir W Rizk
(74) *Attorney, Agent, or Firm* — Oblon, McClelland, Maier & Neustadt, L.L.P.

(57) ABSTRACT

According to one embodiment, a memory system includes a nonvolatile memory, a random access memory and a controller. When writing n−1 data portions of a first unit that are included in n−1 error correction code frames of a first size, respectively, in the nonvolatile memory, the controller generates a second error correction code that constitutes an error correction code frame of a second size together with the n−1 data portions of the first unit and a second data portion to be written into the nonvolatile memory by encoding the n−1 data portions of the first unit and the second data portion, and writes the second data portion and the second error correction code into the nonvolatile memory.

22 Claims, 34 Drawing Sheets

| Terms | Explanations |
|---|---|
| WordLineStringChunk (WLSC) | Write unit in physical block |
| Physical block (PB) | Minimum erase unit in nonvolatile memory |
| Logical block (LB) | Group of physical blocks in which writing in units of WLSC for each physical block is performed in parallel |
| Logical WLSC | Parallel write unit composed of WLSCs |
| Complete media block | Unit composed of physical blocks and protected by final ECC |
| Incomplete media block | Unit composed of at least one physical block and protected by using intermediate ECC or ECC difference information |

FIG. 2

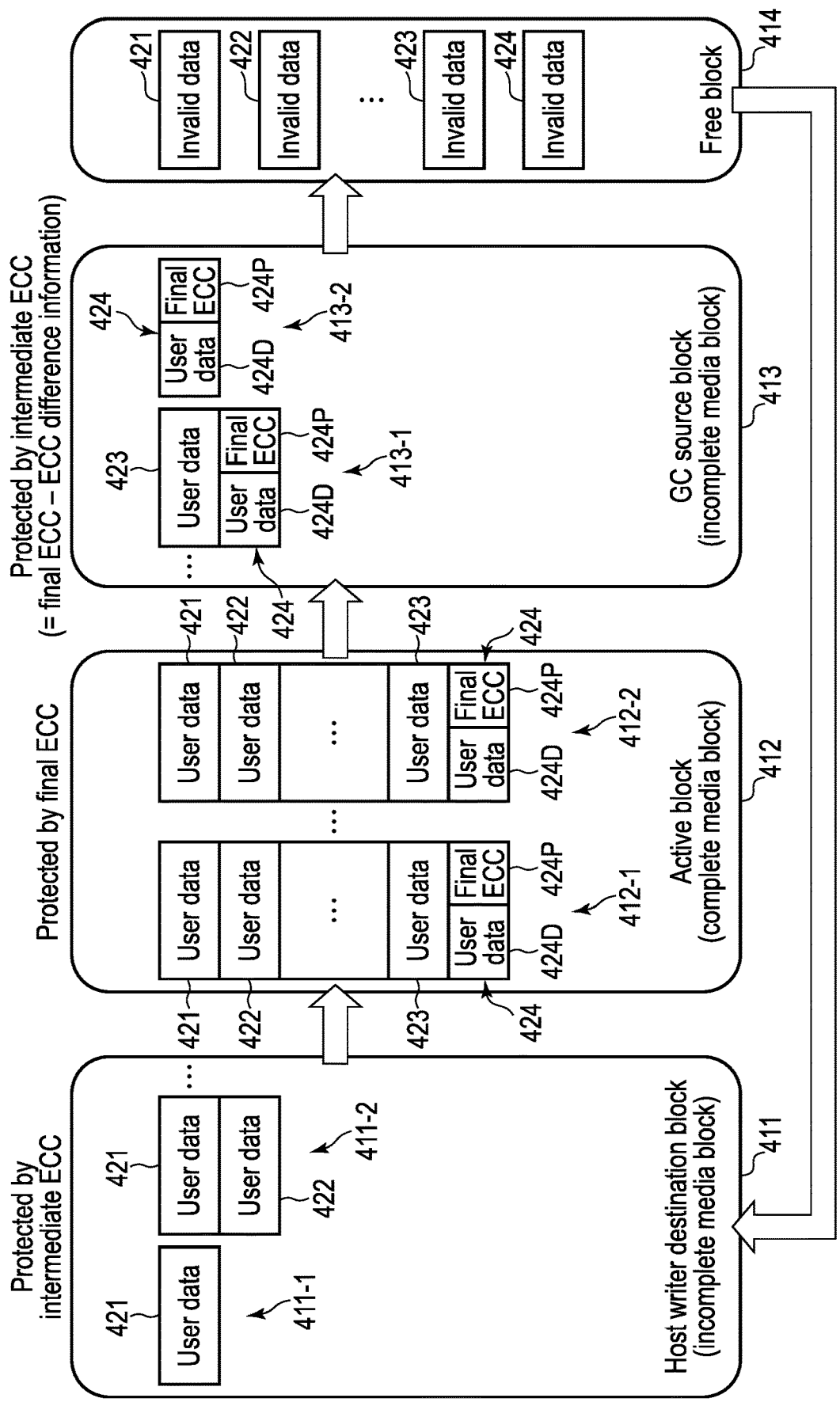
F I G. 3

|  | Comparative example | Embodiment |
|---|---|---|
| Write unit | WLSC | WLSC |
| Erase unit | Physical block | Physical block |
| Unit composed of physical blocks that operate in parallel in a parallel write operation | Logical block | Logical block |
| Unit of block supply | Complete media block | Physical block (range from one physical block to complete media block) |
| Unit of block release | Complete media block | Physical block (range from one physical block to complete media block) |
| ECC used for error correction | Final ECC | (1) Final ECC<br>(2) Intermediate ECC<br>(3) Final ECC and ECC difference information |

FIG. 4

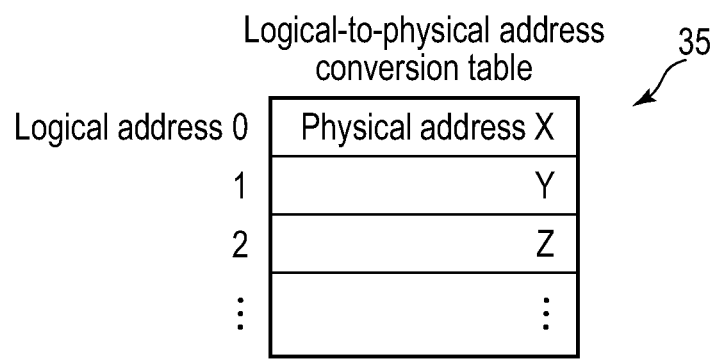

FIG. 5

Media block management table

| Media block ID | Physical block #0 | | Physical block #1 | | ... | Physical block #(n-1) | |
|---|---|---|---|---|---|---|---|
| | ID | Unreleased/released | ID | Unreleased/released | | ID | Unreleased/released |
| | | | | | | | |
| | | | | | | | |
| | | | | | | | |

~36

F I G. 6

Data address – ECC address correspondence table

| Physical address of user data | Physical address of intermediate ECC or ECC difference information |
|---|---|
| | |
| | |
| | |

~37

F I G. 7

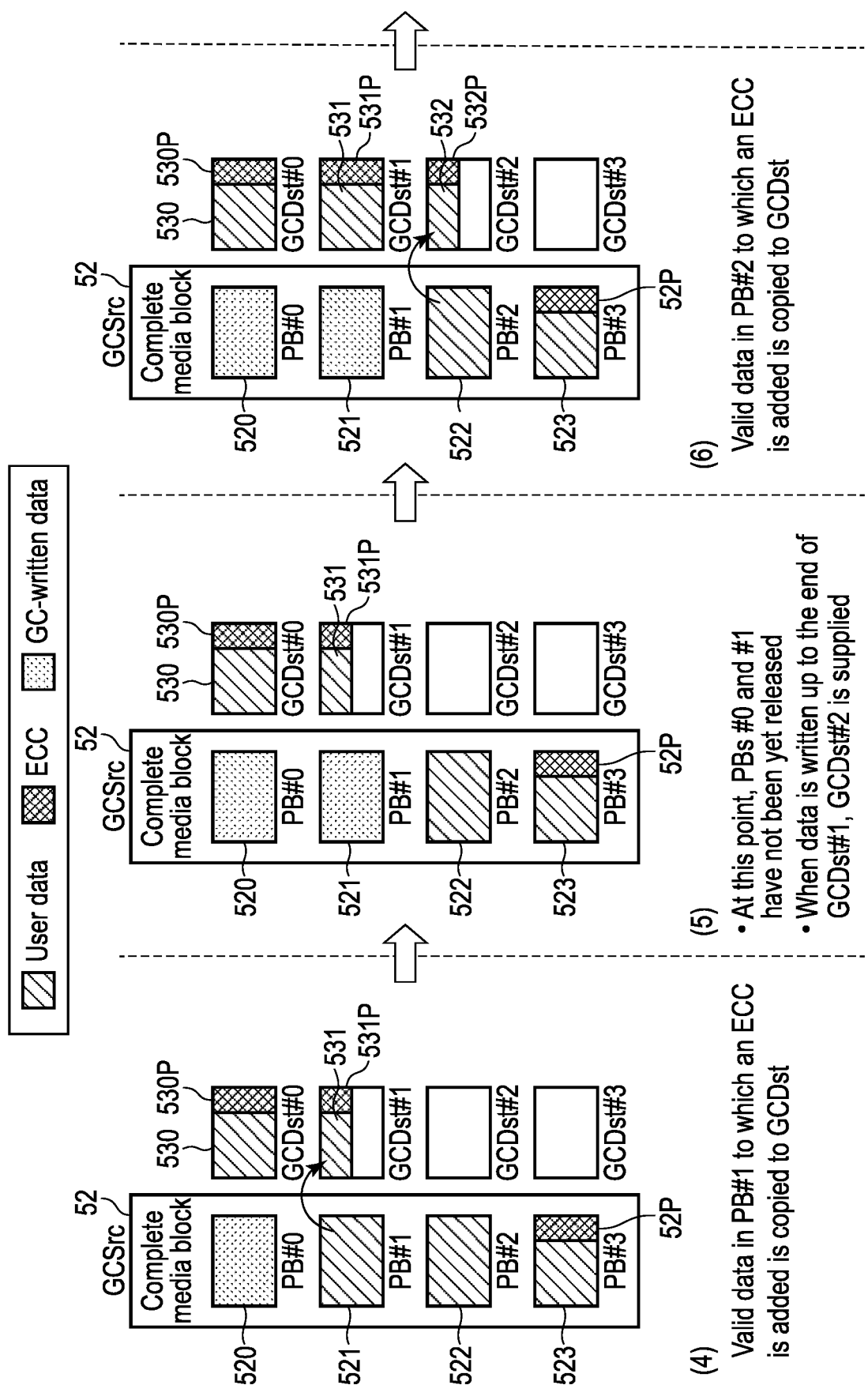
F I G. 10

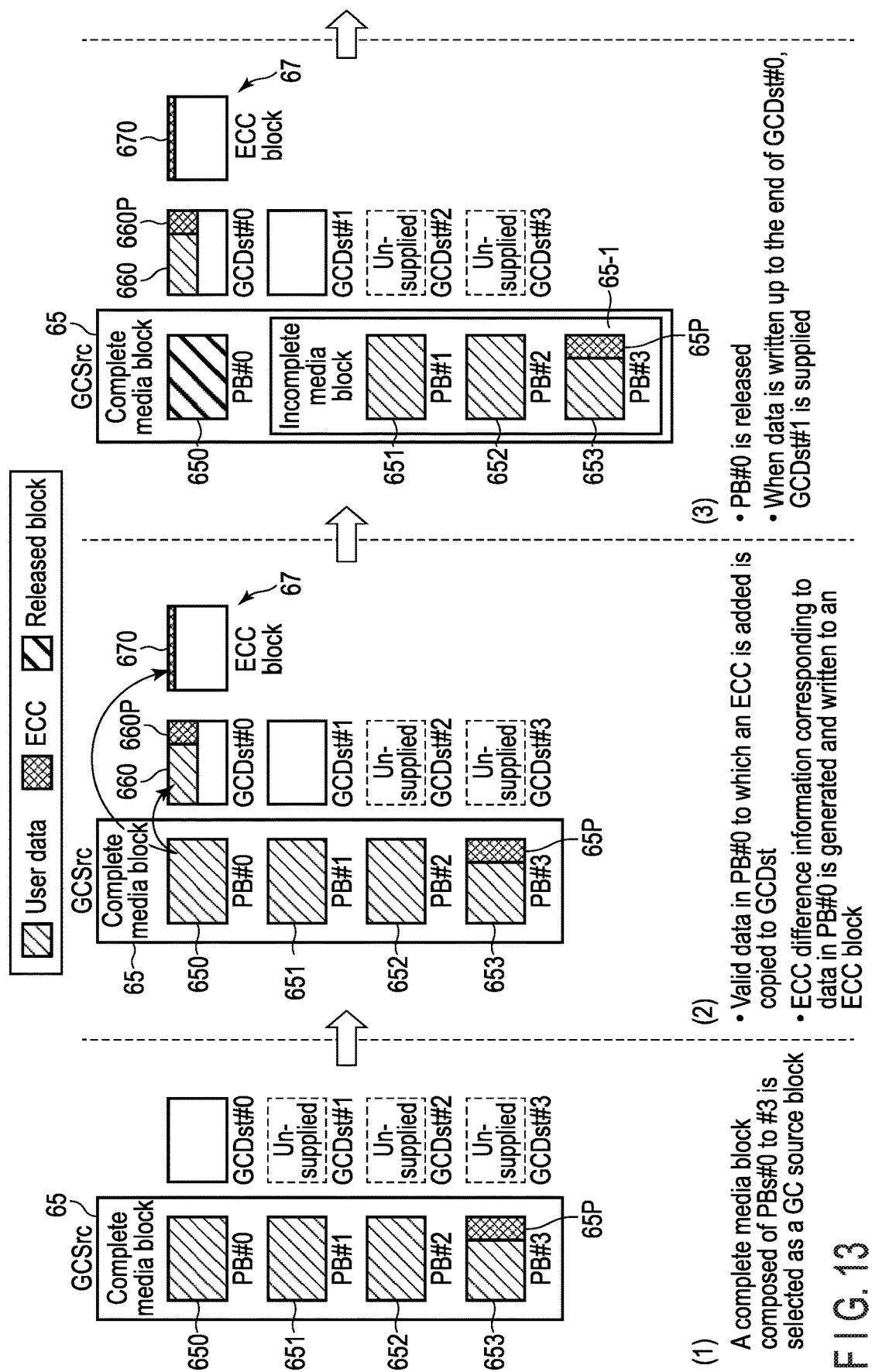
F I G. 13

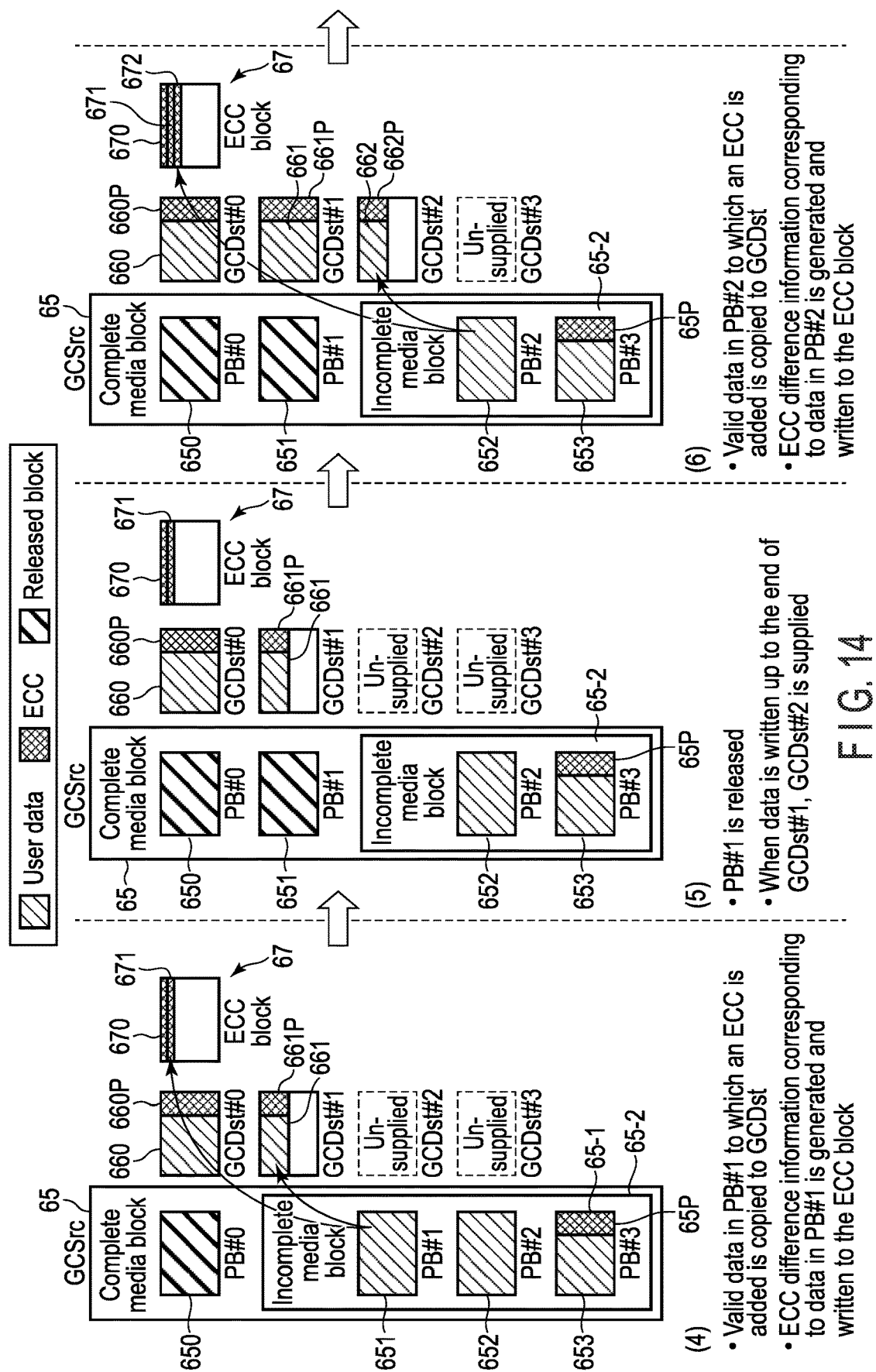
F I G. 14

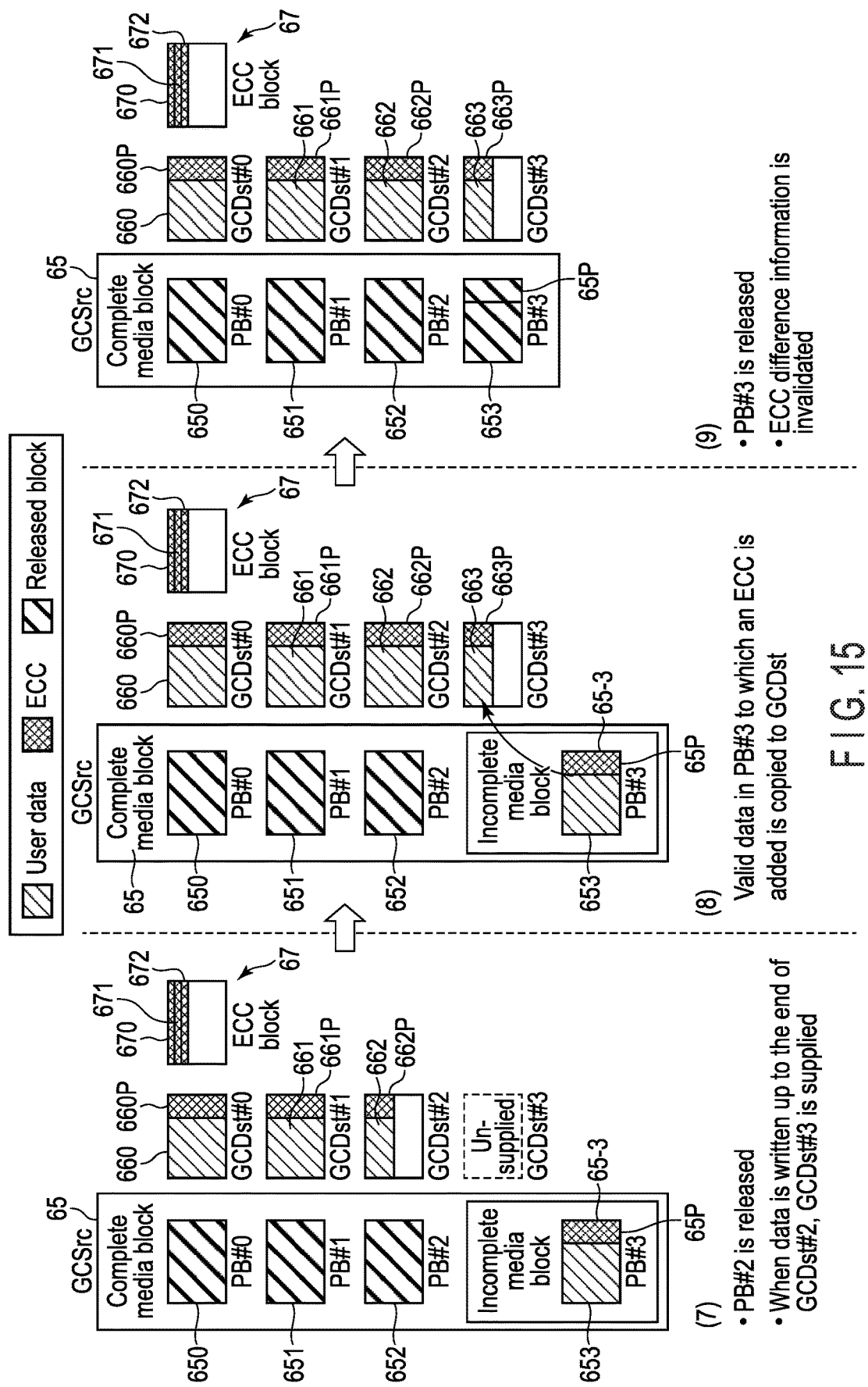
F I G. 15

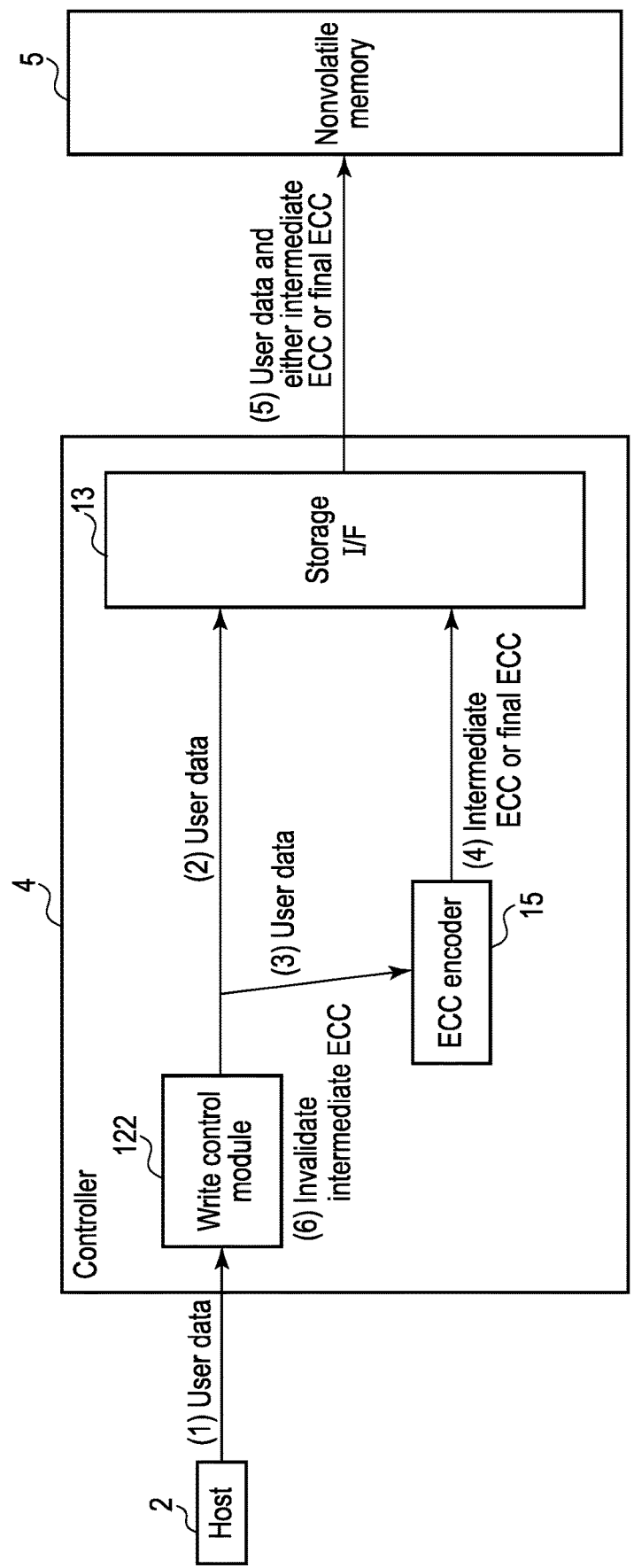
F I G. 16

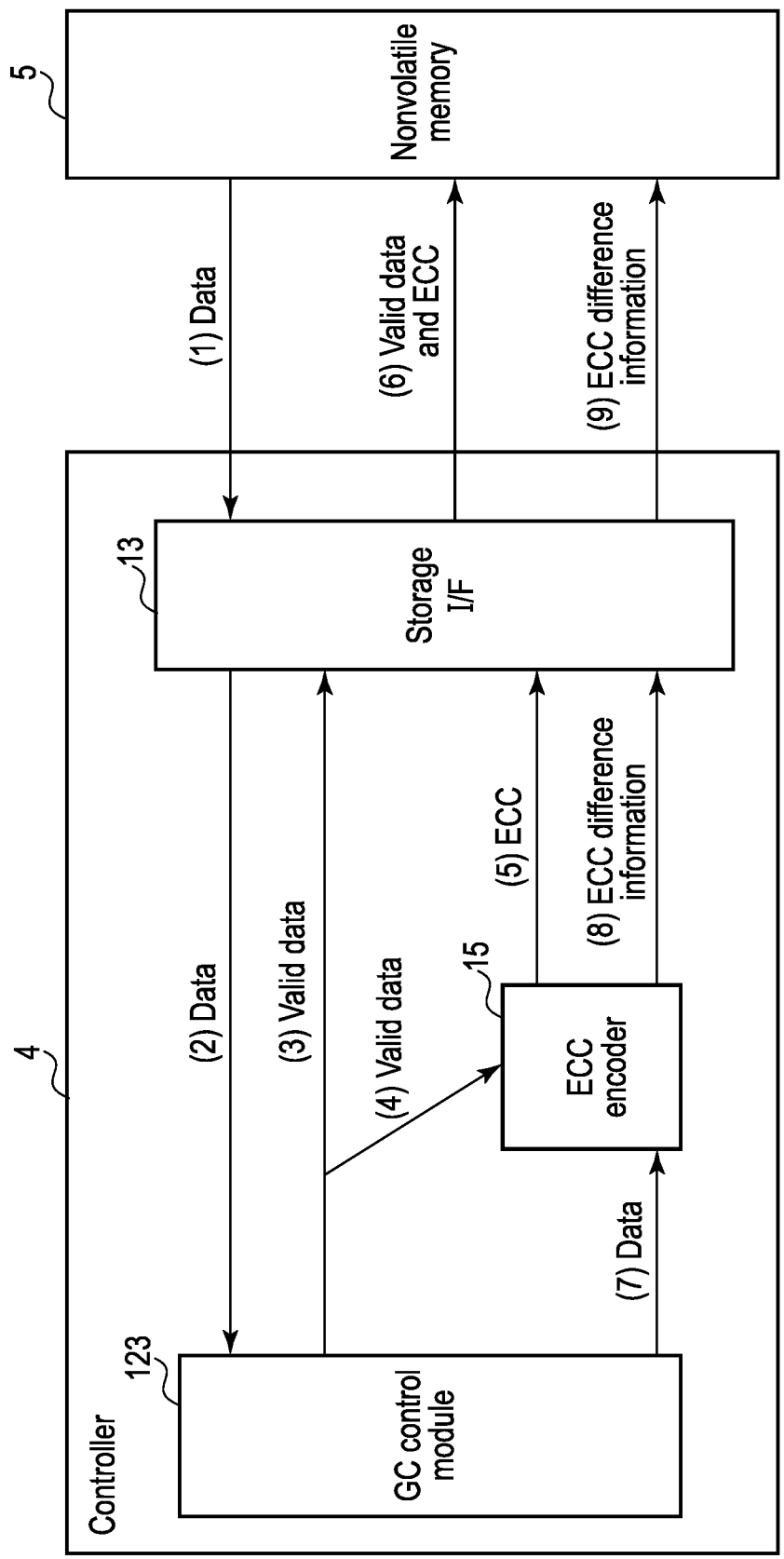
F I G. 17

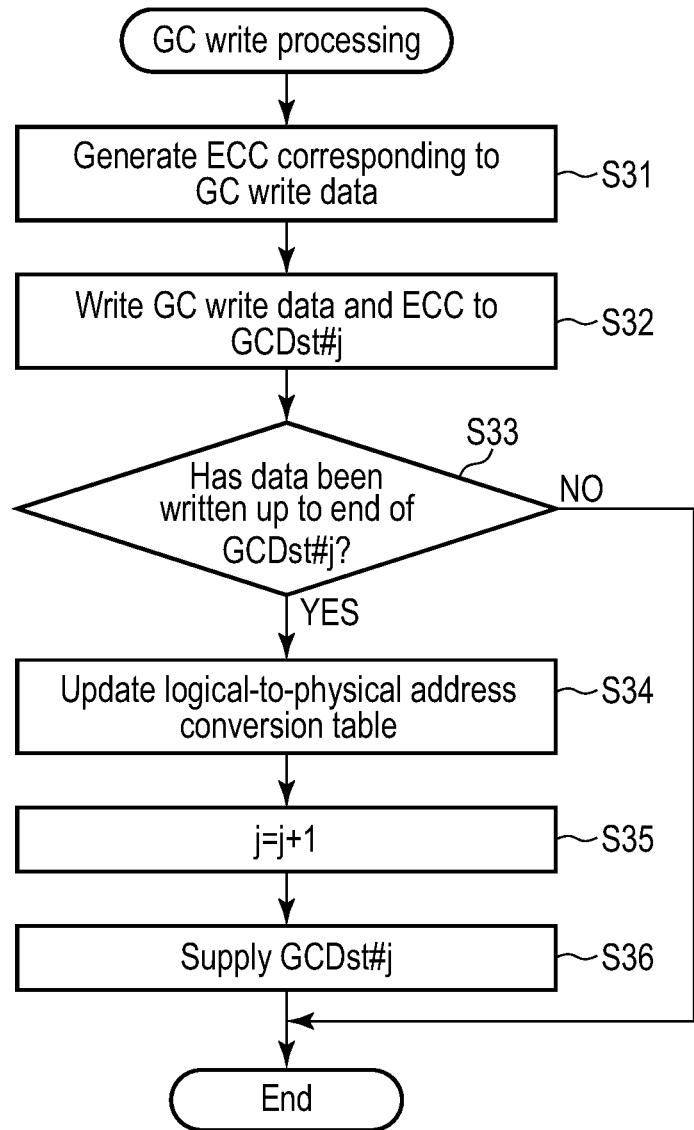
F I G. 20

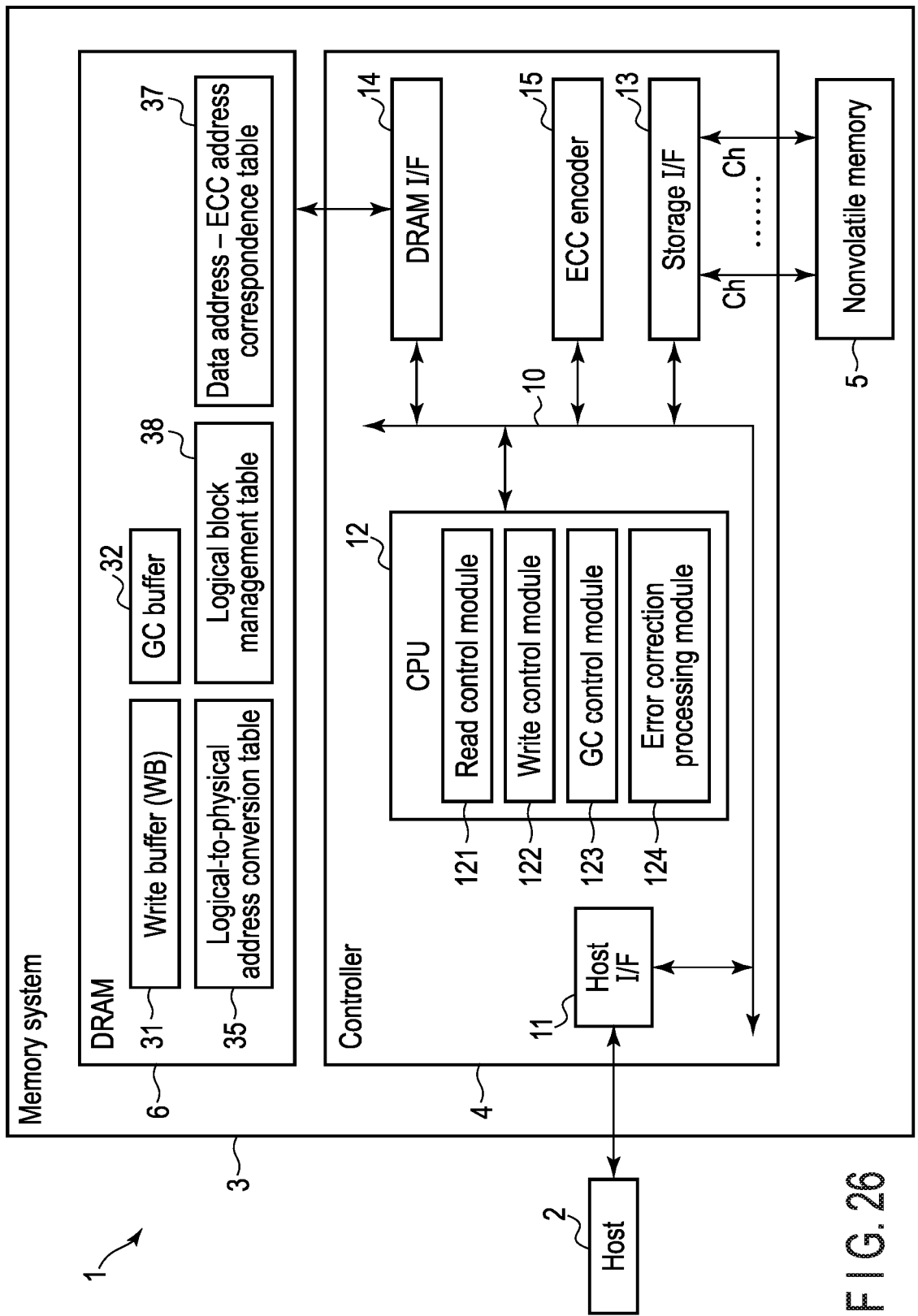
F I G. 26

Logical block

| Physical blocks | 0 | 1 | 2 | 3 | 4 | 5 | 6 | 7 | 8 | 9 | ... | x-1 |
|---|---|---|---|---|---|---|---|---|---|---|---|---|
| Logical WLSC0 | | | | | | | | | | | | |
| Logical WLSC1 | | | | | | | | | | | | |
| Logical WLSC2 | | | | | | | | | | | | |
| Logical WLSC3 | | | | | | | | | | | | |
| .... | | | | | | | | | | | | |
| Logical WLSC(y-1) | | | | | | | | | | | | |

F I G. 27

Logical block management table

| Block ID | Writing | RV completed logical WLSC ID | Logical WLSC ID to be next written |
|---|---|---|---|
| 1 | No | — | — |
| 2 | No | — | — |
| 3 | Yes | 14 | 16 |
| ... | ... | ... | ... |

F I G. 28

|  | Data density | R/W speed |
|---|---|---|
| QLC | 16 values (4 pages) | Slow |
| TLC | 8 values (3 pages) | ↕ |
| MLC | 4 values (2 pages) | |
| SLC | 2 values (1 pages) | Fast |

F I G. 31

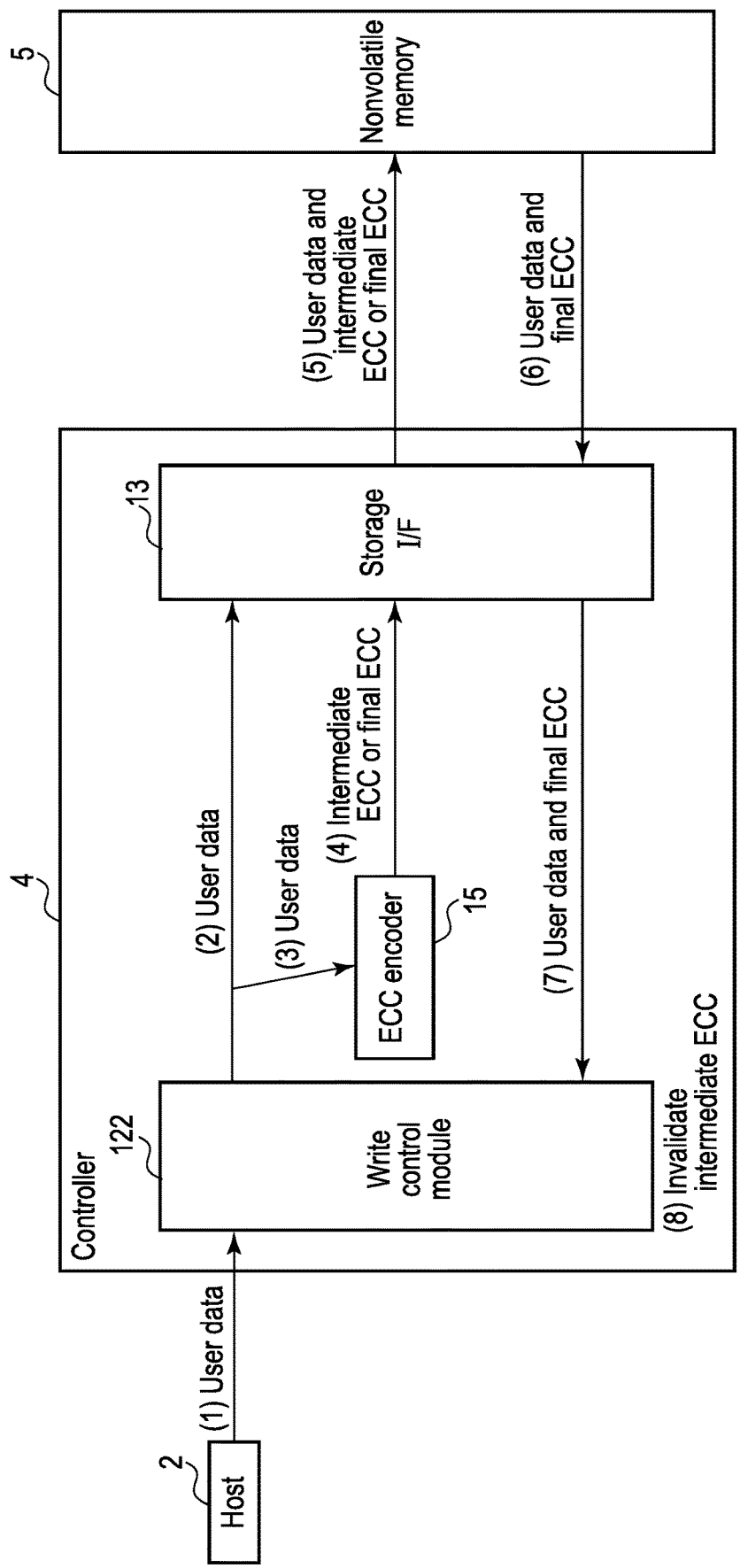
F I G. 33

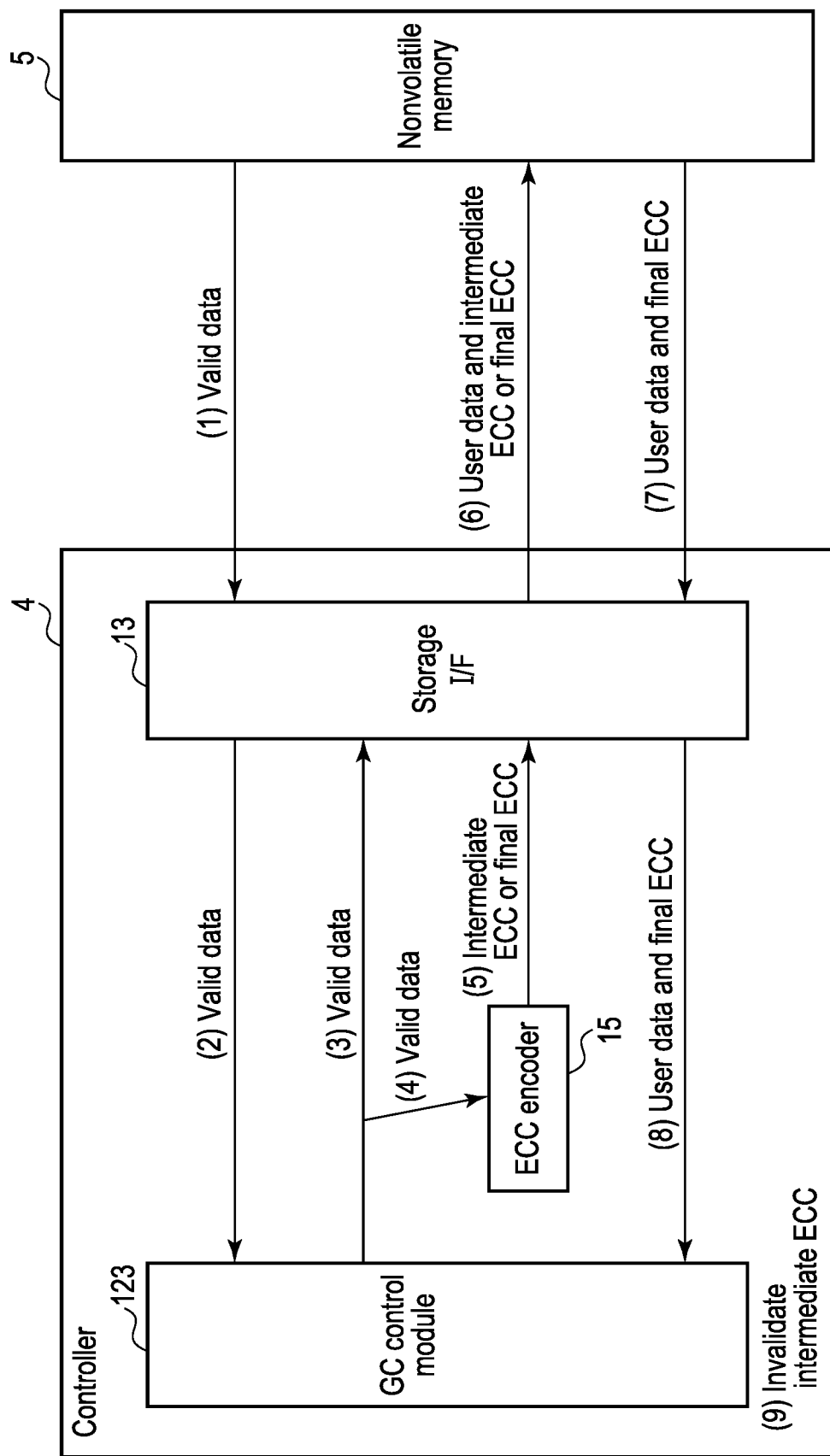
F I G. 34

MEMORY SYSTEM

CROSS-REFERENCE TO RELATED APPLICATIONS

This application is a continuation of U.S. application Ser. No. 17/198,451 filed Mar. 11, 2021, which is based upon and claims the benefit of priority from Japanese Patent Applications No. 2020-042783, filed Mar. 12, 2020; and No. 2021-012149, filed Jan. 28, 2021, the entire contents of all of which are incorporated herein by reference.

FIELD

Embodiments described herein relate generally to a memory system including a nonvolatile memory.

BACKGROUND

In recent years, memory systems including nonvolatile memories are widely used. As a type of the memory systems, a solid state drive (SSD) having a NAND flash memory is known. SSDs are used as a main storage of various computing devices.

The nonvolatile memory includes physical blocks. Nowadays, the size of a physical block has been increasing, and the number of physical blocks in a nonvolatile memory has decreased accordingly.

In addition, a controller of the memory system may have a function for recovering data in a defective physical block. The controller has an error correction function that corrects data in which an error occurs by using, for example, an error correction code (ECC).

In order to increase the amount of user data that can be stored in the nonvolatile memory, it is desirable that a ratio of ECCs in data stored in the nonvolatile memory be lower. In other words, it is desirable to be able to cope with defects of the physical blocks at a lower ratio of ECCs.

BRIEF DESCRIPTION OF THE DRAWINGS

FIG. 2 is a diagram illustrating terms and explanations used for the memory system of the first embodiment.

FIG. 3 is a diagram illustrating a state transition example of physical blocks used in the memory system of the first embodiment.

FIG. 4 is a diagram illustrating a difference between a memory system according to a comparative example and the memory system of the first embodiment.

FIG. 5 is a diagram illustrating a configuration example of a logical-to-physical address conversion table used in the memory system of the first embodiment.

FIG. 6 is a diagram illustrating a configuration example of a media block management table used in the memory system of the first embodiment.

FIG. 7 is a diagram illustrating a configuration example of a data address-ECC address correspondence table used in the memory system of the first embodiment.

FIG. 10 is a diagram illustrating an example of the GC operation following FIG. 9.

FIG. 13 is a diagram illustrating an example of a GC operation in the memory system of the first embodiment.

FIG. 14 is a diagram illustrating an example of the GC operation following FIG. 13.

FIG. 15 is a diagram illustrating an example of the GC operation following FIG. 14.

FIG. 16 is a block diagram illustrating a configuration example for a host write operation in the memory system of the first embodiment.

FIG. 17 is a block diagram illustrating a configuration example for a GC operation in the memory system of the first embodiment.

FIG. 20 is a flowchart illustrating an example of the procedure of GC write processing executed by the GC control module in the controller in the memory system of the first embodiment.

FIG. 26 is a block diagram illustrating a configuration example of an information processing system including a memory system according to a second embodiment.

FIG. 27 is a diagram illustrating a configuration example of a logical block managed in the memory system according to the second embodiment.

FIG. 28 is a diagram illustrating a configuration example of a logical block management table used in the memory system according to the second embodiment.

FIG. 31 is a diagram illustrating characteristics of write modes used in the memory system according to the second embodiment.

FIG. 33 is a block diagram illustrating a configuration example of a host write operation in the memory system according to the second embodiment.

FIG. 34 is a block diagram illustrating a configuration example of a GC write operation in the memory system according to the second embodiment.

DETAILED DESCRIPTION

Various embodiments will be described hereinafter with reference to the accompanying drawings.

In general, according to one embodiment, a memory system includes a nonvolatile memory, a random access memory, and a controller. The controller controls the nonvolatile memory and the random access memory. The controller generates a first error correction code that constitutes an error correction code frame of a first size together with a data portion of a first unit to be written into the nonvolatile memory by encoding the data portion of the first unit. The controller writes the data portion of the first unit into the nonvolatile memory, and writes the first error correction code into the nonvolatile memory or stores the first error correction code in the random access memory. When writing n−1 data portions of the first unit that are included in n−1 error correction code frames of the first size, respectively, in the nonvolatile memory, the controller generates a second error correction code that constitutes an error correction code frame of a second size together with the n−1 data portions of the first unit and a second data portion to be written into the nonvolatile memory by encoding the n−1 data portions of the first unit and the second data portion, and writes the second data portion and the second error correction code into the nonvolatile memory. N is an integer greater than one.

First Embodiment

Figure 1:
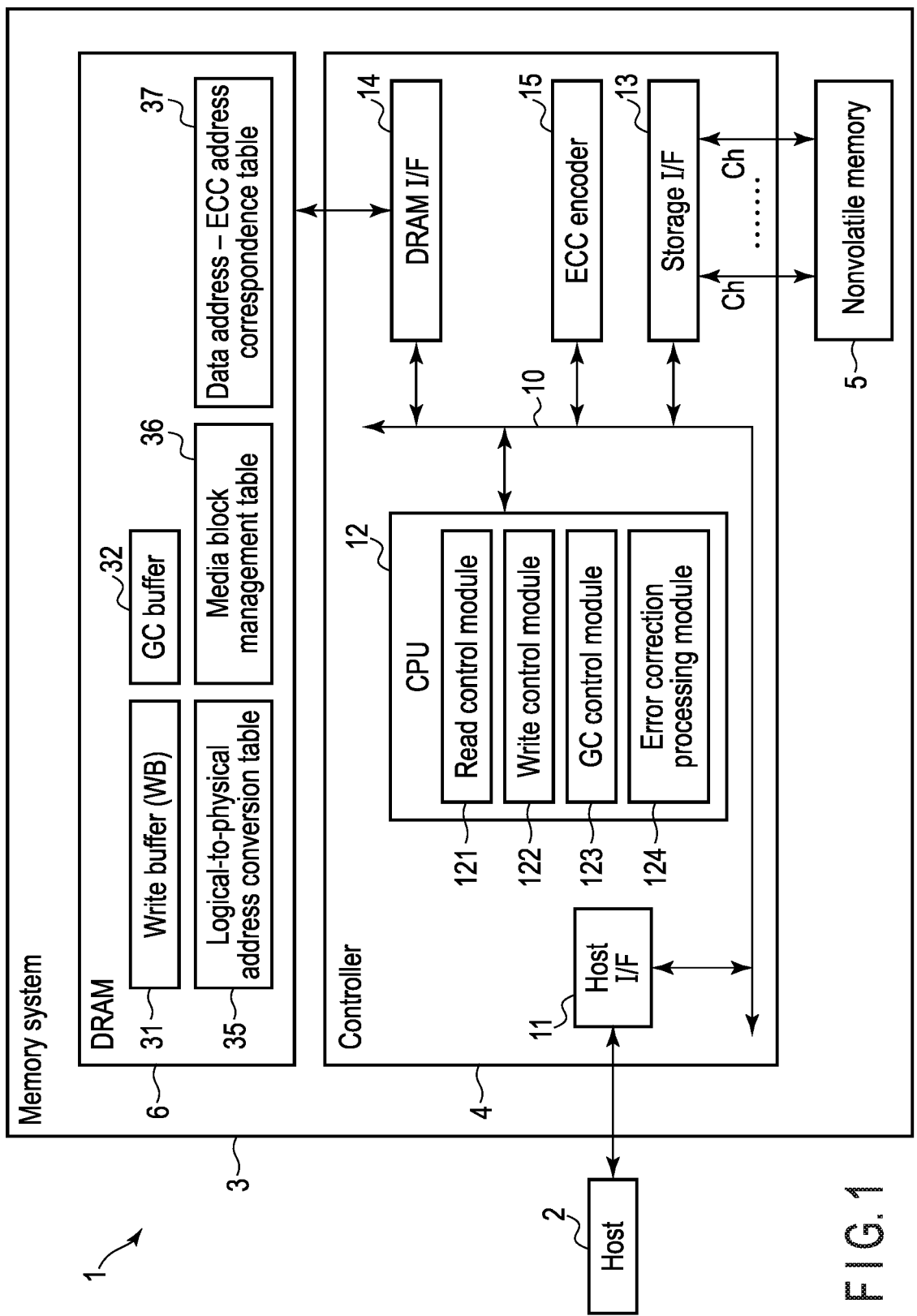
FIG. 1 is a block diagram illustrating a configuration example of an information processing system including a memory system according to a first embodiment.

FIG. 1 is a block diagram illustrating a configuration example of an information processing system 1 according to a first embodiment. The information processing system 1 includes a host (host device) 2 and a memory system 3.

The host 2 is an information processing device (computing device) that accesses the memory system 3. The host 2 may be a server (storage server) that stores a large amount of and a variety of data to the memory system 3, or may be a personal computer.

The memory system 3 is a semiconductor storage device configured to write data into a nonvolatile memory 5 and read data from the nonvolatile memory 5. The memory system 3 may be realized, for example, as a solid state drive (SSD) including a NAND flash memory. The memory system 3 may be used as a main storage of the host 2. The memory system 3 is connected to the host 2 via a cable or a network.

As an interface for the mutual connection between the host 2 and the memory system 3, SCSI, Serial Attached SCSI (SAS), ATA, Serial ATA (SATA), PCI Express (PCIe) (registered trademark), Ethernet (registered trademark), Fibre channel, or NVM Express (NVMe) (registered trademark) may be used.

The memory system 3 includes a controller 4 and the nonvolatile memory 5.

The controller 4 functions as a memory controller configured to control the nonvolatile memory 5. The controller 4 may be realized with a circuit such as a system-on-a-chip (SoC).

The nonvolatile memory 5 includes a memory cell array. The memory cell array includes memory cells arranged in an array. The memory cell array of the nonvolatile memory 5 includes physical blocks. The nonvolatile memory 5 may include nonvolatile memory chips (for example, NAND flash memory dies). The nonvolatile memory 5 may be a two-dimensional structure nonvolatile memory or a three-dimensional structure nonvolatile memory.

Each of the physical blocks includes pages. The physical blocks each function as a minimum erase unit. A physical block may be referred to as an erase block. Each of the pages includes memory cells connected to a single word line. The pages each function as a unit of data read operation. A word line functions as a unit of data write operation. The tolerable maximum number of program/erase cycles (P/E cycles) for each of the physical blocks is limited. One P/E cycle of a particular physical block includes an erase operation to erase data stored in all memory cells in the physical block and a write operation (program operation) to write data in each page of the physical block.

The memory system 3 may include a random access memory (RAM) which is a volatile memory. The RAM is, for example, a dynamic RAM (DRAM) 6. Alternatively, the memory system 3 may have a RAM, such as a static RAM (SRAM), built into the controller 4. Instead of the DRAM 6, another RAM such as an SRAM provided in the memory system 3 may be used. In the following, a case where the DRAM 6 is used as the RAM is mainly exemplified.

The DRAM 6 includes, for example, a write buffer (WB) 31 and a GC buffer 32 which are buffer areas for temporarily storing data to be written into the nonvolatile memory 5, and a cache area of a logical-to-physical address conversion table 35. The DRAM 6 may further include storage areas for various values used during processing and various tables (for example, a media block management table 36 and a data address-ECC address correspondence table 37). The DRAM 6 may be provided inside the controller 4.

The controller 4 may function as a flash translation layer (FTL) configured to execute data management and block management of the nonvolatile memory 5. The data management includes (1) management of mapping data indicative of relationship between each logical address and each physical address of the nonvolatile memory 5, (2) process for encapsulating read operations of each page, write operations of each word line, and erase operations of each physical block, and the like. The block management includes management of defective blocks, wear leveling, and garbage collection.

The logical address is an address used by the host 2 for addressing the memory system 3. As a logical address, for example, a logical block address (LBA) may be used. The management of mapping between each logical address and each physical address is executed by using the logical-to-physical address conversion table 35. The controller 4 manages mapping between each logical address and each physical address with a certain management size unit by using the logical-to-physical address conversion table 35. A physical address indicates a memory location in the nonvolatile memory 5. The logical-to-physical address conversion table 35 may be loaded from the nonvolatile memory 5 to the DRAM 6 when the memory system 3 is started.

Data write to one page is executable only once in a single P/E cycle. In addition, the tolerable number of P/E cycles is limited. Thus, the controller 4 writes update data corresponding to a logical address not to an original memory location in which previous data corresponding to the logical address is stored but to a different memory location. Then, the controller 4 updates the logical-to-physical address conversion table 35 to associate the logical address with a physical address indicative of the different memory location and to invalidate the previous data. In the following, data referred by the logical-to-physical address conversion table 35 (that is, data associated with a logical address) will be referred to as valid data. Furthermore, data not associated with any logical address will be referred to as invalid data. The valid data is data to possibly be read by the host 2 later. The invalid data is data not to be read by the host 2 anymore.

The controller 4 may include a host interface (host I/F) 11, a CPU 12, a storage I/F 13, a DRAM interface (DRAM I/F) 14, and an ECC encoder 15. The host I/F 11, the CPU 12, the storage I/F 13, the DRAM I/F 14, and the ECC encoder 15 may be mutually connected through a bus 10.

The host I/F 11 functions as a circuit that receives various commands such as I/O commands, various control commands and the like from the host 2. The I/O commands may include a write command, a read command, an unmap command (trim command), and a format command. The format command is a command for unmapping all the logical addresses in the memory system 3 entirely.

The CPU 12 is a processor configured to control the host I/F 11, the storage I/F 13, the DRAM I/F 14, and the ECC encoder 15. The CPU 12 performs various processes by executing control programs (e.g., firmware) stored in a ROM or the like which is not illustrated. The CPU 12 may perform, in addition to the above described processes of FTL, command processes to process various commands from the host 2. The operation of the CPU 12 is controlled by the above described firmware executed by the CPU 12. Note that part or all of the entire FTL processes and the command processes may be executed by a dedicated hardware in the controller 4.

The storage I/F 13 functions as a storage control circuit configured to control the nonvolatile memory 5. The storage I/F 13 is, for example, a Toggle DDR and an open NAND flash interface (ONFI). The controller 4 is electrically connected to the nonvolatile memory 5 through the storage I/F 13. The storage I/F 13 may be connected to memory chips in the nonvolatile memory 5 through channels.

The DRAM I/F 14 functions as a DRAM controller configured to control accesses of the DRAM 6. The memory area of the DRAM 6 is used to store the WB 31, the GC buffer 32, the logical-to-physical address conversion table 35, the media block management table 36, the data address-ECC address correspondence table 37, and the like.

The ECC encoder 15 generates an ECC (i.e., parity) corresponding to data by encoding the data. The ECC encoder 15 may generate a linear code as an ECC. In ECCs that are linear codes, subtraction between the ECCs, that is, an exclusive logical OR (XOR) operation on the ECCs is possible. As such an ECC, for example, a Reed-Solomon (RS) code or an XOR parity is used.

FIG. 2 illustrates terms and explanations used for the memory system 3 of the first embodiment.

A WordLineStringChunk (WLSC) indicates a unit of write operation in a physical block. That is, the controller 4 writes data with the size of a WLSC into the nonvolatile memory 5, in a write operation on the physical block.

A physical block (PB) functions as a minimum erase unit in the nonvolatile memory 5.

A logical block (LB) is composed of physical blocks. Data portions in units of WLSC are written, in parallel, to the physical blocks, respectively. Hereinafter, write operations on physical blocks in a logical block performed in parallel by the controller 4 is also referred to as a parallel write operation. That is, the controller 4 may write, in parallel, data portions each having a size equivalent to a WLSC, to the physical blocks in the logical block, respectively, in a parallel write operation.

A logical WLSC is composed of WLSCs. The logical WLSC is a unit of parallel write operation.

In the following, for the sake of clarity, the case where the controller 4 writes data with the size of a WLSC to a physical block in a write operation is mainly exemplified. Note that in a parallel write operation, the controller 4 may write, in parallel, a particular number of data portions each having a size equivalent to a WLSC, to the particular number of physical blocks in the logical block.

A complete media block is composed of physical blocks. The complete media block functions as a unit protected by a final ECC.

An incomplete media block is composed of at least one physical block. The incomplete media block functions as a unit protected by using an intermediate ECC or ECC difference information.

An intermediate ECC constitutes an ECC frame of a first size (that is, a first frame length) together with a user data portion of a first protection unit stored in an incomplete media block. That is, the user data portion of the first protection unit is protected by the corresponding intermediate ECC. User data is, for example, write data received from the host 2 along with a write command.

A final ECC constitutes an ECC frame of a second size (that is, a second frame length) with a user data portion of a second protection unit stored in a complete media block. That is, the user data portion of the second protection unit is protected by the corresponding final ECC. The second protection unit is larger than the first protection unit. The second size is larger than the first size. In addition, the user data portion of the second protection unit includes at least one user data portion of the first protection unit.

ECC difference information corresponds to user data that is included in an ECC frame of the second size and is erased from a complete media block. User data that is included in the ECC frame of the second size and is not yet erased from the complete media block is protected by an intermediate ECC. The intermediate ECC is obtained by subtracting the ECC difference information from the final ECC included in the ECC frame of the second size.

All the ECCs used as the final ECC, the intermediate ECC, and the ECC difference information in the memory system 3 of the first embodiment are inter-page ECCs. The inter-page ECCs are linear codes. Therefore, subtraction (XOR operation) on, for example, the final ECC and the ECC difference information can be performed. Note that although not specifically mentioned, in the memory system 3, not only an inter-page ECC but also an intra-page ECC (channel ECC) may be used. As the intra-page ECC, for example, a Bose Chaudhuri Hocquenghem (BCH) code or a low density parity check (LDPC) code is used.

By the way, in recent years, the size of a physical block is increasing, and the number of physical blocks included in the nonvolatile memory 5 is decreasing accordingly. In addition, the controller 4 may have a function for recovering data in a defective physical block. The controller 4 has an error correction function that corrects data in which an error occurs by using, for example, an ECC.

In order to increase the amount of user data that can be stored in the nonvolatile memory 5, it is desirable that a ratio of ECCs in data stored in the nonvolatile memory 5 be lower. In other words, it is desirable to be able to cope with defects of physical blocks at a lower ratio of ECCs.

A memory system according to a comparative example uses, for example, a complete media block which is composed of physical blocks, as a unit protected by an ECC. The memory system according to the comparative example reduces the ratio of ECCs for coping with the defects of the physical blocks by increasing the size of the complete media block, that is, increasing the number of physical blocks included in the complete media block.

However, increasing the size of the complete media block supplied as a host write destination increases the number of physical blocks that needs to be secured simultaneously.

As an example, a case where sizes of a complete media block which are different each other are applied to a memory system having a user capacity of 256 GB will be described. The size of a physical block is assumed to be 16 MB.

Example 1: When the Size of a Complete Media Block is 1 GB

In order to write 256 GB data which has a size equivalent to the user capacity, 256 (=256 GB/1 GB) complete media blocks are required. In addition, the number of physical blocks that needs to be secured to supply one complete media block is 64 (=1 GB/16 MB).

Example 2: When the Size of a Complete Media Block is 4 GB

In order to write 256 GB data which has a size equivalent to the user capacity, 64 (=256 GB/4 GB) complete media blocks are required. In addition, the number of physical blocks that needs to be secured to supply one complete media block is 256 (=4 GB/16 MB).

In this way, increasing the size of a complete media block increases the number of physical blocks that needs to be secured simultaneously. Therefore, there are trade-offs described in (A) and (B) below depending on the size of a complete media block.

(A) When the size of a complete media block is large, the ratio of ECCs is low, but the number of physical blocks that needs to be secured simultaneously is large.

(B) When the size of a complete media block is small, the ratio of ECCs is high, but the number of physical blocks that needs to be secured simultaneously is small.

Therefore, the controller 4 of the memory system 3 according to the first embodiment does not collectively supply all physical blocks constituting a complete media block as host write destination blocks. The number of physical blocks supplied by the controller 4 as the host write destination blocks at one time is smaller than the number of physical blocks constituting the complete media block.

FIG. 3 illustrates a state transition example of physical blocks used in the memory system 3 according to the first embodiment. A physical block (or a logical block including physical blocks) may repeat transitions in the order of a host write destination block 411, an active block 412, a GC source block 413, and a free block 414.

The controller 4 supplies, for example, a physical block 421 that will constitute a complete media block, as a host write destination block 411. When writing data up to the end of the supplied physical block 421, the controller 4 supplies another physical block 422 that will constitute the complete media block, as the host write destination block 411. The controller 4 then writes data up to the end of the other physical block 422.

Each of the supplied physical blocks 421 and 422 is one of a specific number of physical blocks (for example, n physical blocks) that constitutes the complete media block. When the number of supplied physical blocks has not reached the specific number, the physical blocks 421 and 422 constitute an incomplete media block. FIG. 3 illustrates a host write destination block 411-1 in a state where only the physical block 421 is supplied. When the physical block 422 is further supplied, the host write destination block 411-1 becomes a host write destination block 411-2 including the physical block 421 and the physical block 422.

The controller 4 protects the host write destination block 411 that is constituted by the physical blocks less than the specific number (that is, the incomplete media block), with the intermediate ECC. The intermediate ECC is an ECC for protecting user data written in the host write destination block 411. The controller 4 writes the intermediate ECC to another physical block or stores the intermediate ECC in the RAM such as the DRAM 6.

When the controller 4 supplies a specific number of physical blocks 421, 422, 423, and 424 and writes data up to the end of the finally supplied physical block 424 (hereinafter, also referred to as the final physical block 424) by repeating the above described supply and writing, the physical blocks 421, 422, 423, and 424 become an active block 412. The active block 412 is a complete media block. That is, a specific number of physical blocks 421, 422, 423, and 424 supplied and having data written up to the end constitute a complete media block.

The controller 4 writes user data to the physical blocks 421, 422, and 423 other than the final physical block 424. On the other hand, the controller 4 writes user data 424D and a final ECC 424P to the final physical block 424. The final ECC 424P is an ECC for protecting a complete media block. When the user data 424D and the final ECC 424P have been written to the final physical block 424 and then the physical blocks 421, 422, 423, and 424 have become the active block 412 (the complete media block), the controller 4 discards the intermediate ECC for protecting the host write destination block 411 (the incomplete media block).

The controller 4 may invalidate user data stored in the active block 412 in accordance with a request by the host 2 to update or erase the user data. Therefore, the active block 412 may include invalid data. For example, an active block 412-1 in which only valid data is stored transitions to the active block 412 including valid data and invalid data.

The controller 4 performs GC processing using, for example, an active block 412 having a small amount of valid data as a GC source block 413. In the GC processing for releasing the GC source block 413, the controller 4 releases the physical blocks 421, 422, 423, and 424 constituting the GC source block 413 one by one in order. Each of the released physical blocks becomes a free block 414. A physical block that is a free block 414 does not store valid data. The controller 4 may perform erase processing on a physical block that is the free block 414 and then supply the physical block as the host write destination block 411 again.

In addition, an unreleased physical block in the GC source block 413 constitutes an incomplete media block. FIG. 3 illustrates a GC source block 413-1 in which the physical block 421 and the physical block 422 are released and the physical block 423 and the physical block 424 are not yet released. When the physical block 423 is further released, the GC source block 413-1 becomes a GC source block 413-2 in which only the physical block 424 is not yet released.

The controller 4 protects each of the GC source blocks 413-1 and 413-2 (i.e., the incomplete media blocks) which includes at least one unreleased physical block, with an intermediate ECC. The intermediate ECC is obtained by subtracting ECC difference information which is an ECC corresponding to user data stored in the released physical block (or ECCs corresponding to the user data stored in the released physical blocks), from the final ECC 424P.

As described above, the controller 4 of the memory system 3 according to the first embodiment protects the active block 412 which is the complete media block, with the final ECC 424P. The controller 4 protects the host write destination block 411 which is the incomplete media block, with the intermediate ECC. The controller 4 protects the GC source block 413 which is the incomplete media block, with the intermediate ECC. The controller 4 supplies the physical blocks to be used as the host write destination block 411 one by one. In addition, the controller 4 releases the physical blocks in the GC source block 413 one by one. From these facts, the memory system 3 of the first embodiment can reduce the number of physical blocks to be secured as the write destination while maintaining the ECCs that can cope with the defect of the physical blocks.

When the intermediate ECC and the ECC difference information are written into the nonvolatile memory 5, a sequential write performance and a compaction performance may decrease, and a write amplification factor (WAF) may increase. The WAF is a value obtained by dividing the amount of data actually written into the nonvolatile memory 5 by the amount of data written into the nonvolatile memory 5 in accordance with requests by the host 2.

When the intermediate ECC and the ECC difference information are stored in the RAM such as the DRAM 6, it is possible to suppress the decrease in the sequential write performance and the compaction performance and the increase in the WAF. Note that if a power supply interruption occurs before the final ECC is written to the nonvolatile memory 5, the intermediate ECC and the ECC difference information stored in the RAM are lost. Therefore, the user data stored in the nonvolatile memory 5 (more specifically, the incomplete media block) cannot be protected.

FIG. 4 illustrates a difference between the memory system according to the comparative example and the memory system 3 according to the first embodiment.

The memory system according to the comparative example and the memory system 3 according to the first embodiment are the same in terms of a unit of write operation, a unit of erase operation, and a unit constituted by physical blocks operating in parallel in a parallel write operation. That is, both the memory systems use a WLSC as a unit of write operation on a physical block. Both the memory systems use a physical block as a unit of erase operation. In addition, both the memory systems may perform a parallel write operation on physical blocks constituting a logical block.

In addition, the memory system according to the comparative example and the memory system 3 according to the first embodiment are different in a unit of block supply, a unit of block release, and an ECC used for error correction.

Specifically, the memory system according to the comparative example uses a complete media block as a unit of block supplied as a host write destination.

On the other hand, the memory system 3 according to the first embodiment uses a physical block as a unit of block supplied as a host write destination. The memory system 3 supplies physical blocks that are one or more and less than or equal to the number of physical blocks that constitute a complete media block, as the host write destination at a time.

The memory system according to the comparative example uses a complete media block as a unit for releasing an active block.

On the other hand, the memory system 3 according to the first embodiment uses a physical block as a unit for releasing an active block. The memory system 3 releases physical blocks that are one or more and less than or equal to the number of physical blocks that constitute a complete media block, at a time.

In addition, the memory system according to the comparative example uses a final ECC as an ECC used for error correction.

On the other hand, the memory system 3 according to the first embodiment uses at least one of (1) a final ECC, (2) an intermediate ECC, and (3) a final ECC and ECC difference information as an ECC (or ECCs) used for error correction. More specifically, when user data in which an error occurs is read from a complete media block, the memory system 3 corrects the error with the final ECC. When user data in which an error occurs is read from a host write destination block (that is, an incomplete media block), the memory system 3 corrects the error with the intermediate ECC. In addition, when user data in which an error occurs is read from a GC source block (that is, an incomplete media block), the memory system 3 corrects the error with the final ECC and the ECC difference information.

In addition, the memory system 3 may operate by using, for example, the logical-to-physical address conversion table 35, the media block management table 36, and the data address-ECC address correspondence table 37.

FIG. 5 illustrates a configuration example of the logical-to-physical address conversion table 35 used in the memory system 3 according to the first embodiment. The logical-to-physical address conversion table 35 is realized as, for example, a look-up table (LUT). The logical-to-physical address conversion table 35 manages mapping between each logical address and each physical address of the nonvolatile memory 5.

FIG. 6 illustrates a configuration example of the media block management table 36 used in the memory system 3 according to the first embodiment. The media block management table 36 may include entries corresponding to media blocks (i.e., complete media blocks and/or incomplete media blocks). Each of the entries in the media block management table 36 includes a media block ID field and a combination of an ID field and an unreleased/released field for each of physical blocks that constitute a media block.

The media block ID field indicates identification information assigned to the corresponding media block.

The ID field of a physical block indicates identification information assigned to the physical block. In addition, the unreleased/released field of the physical block indicates whether the physical block is an unreleased physical block or a released physical block. The unreleased physical block is a physical block that constitutes a complete media block or an incomplete media block. The released physical block is a physical block that constituted a complete media block before and has become a free block by GC or the like.

Each of the entries includes combinations of a physical block ID field and an unreleased/released field as many as the number of physical blocks that constitute the complete media block. For example, in a case where the complete media block includes n physical blocks, each of the entries includes n combinations of an ID field and an unreleased/released field that correspond to a physical block PB #0, a physical block PB #1, . . . , and a physical block PB #(n−1), respectively.

FIG. 7 illustrates a configuration example of the data address-ECC address correspondence table 37 used in the memory system 3 according to the first embodiment. Each entry in the data address-ECC address correspondence table 37 includes a physical address field of user data and a physical address field of an intermediate ECC or ECC difference information.

The physical address field of user data indicates a physical address of user data stored in an unreleased physical block that constitutes an incomplete media block, or a physical address of user data stored in a released physical block that constituted a complete media block. Hereinafter, user data stored in the unreleased physical block that constitutes the incomplete media block is also referred to as unreleased data. In addition, user data stored in the released physical block that constituted the complete media block is also referred to as released data.

When a physical address of unreleased data is set in the physical address field of user data, the physical address field of an intermediate ECC or ECC difference information indicates a physical address where an intermediate ECC corresponding to the unreleased data is stored. In addition, when a physical address of released data is set in the physical address field of user data, the physical address field of an intermediate ECC or ECC difference information indicates a physical address where ECC difference information corresponding to the released data is stored.

Each of the configurations of the logical-to-physical address conversion table 35, the media block management table 36, and the data address-ECC address correspondence table 37 described above is an example, and may be changed as appropriate according to the design of the hardware and software (for example, firmware) of the memory system 3.

Figure 8:
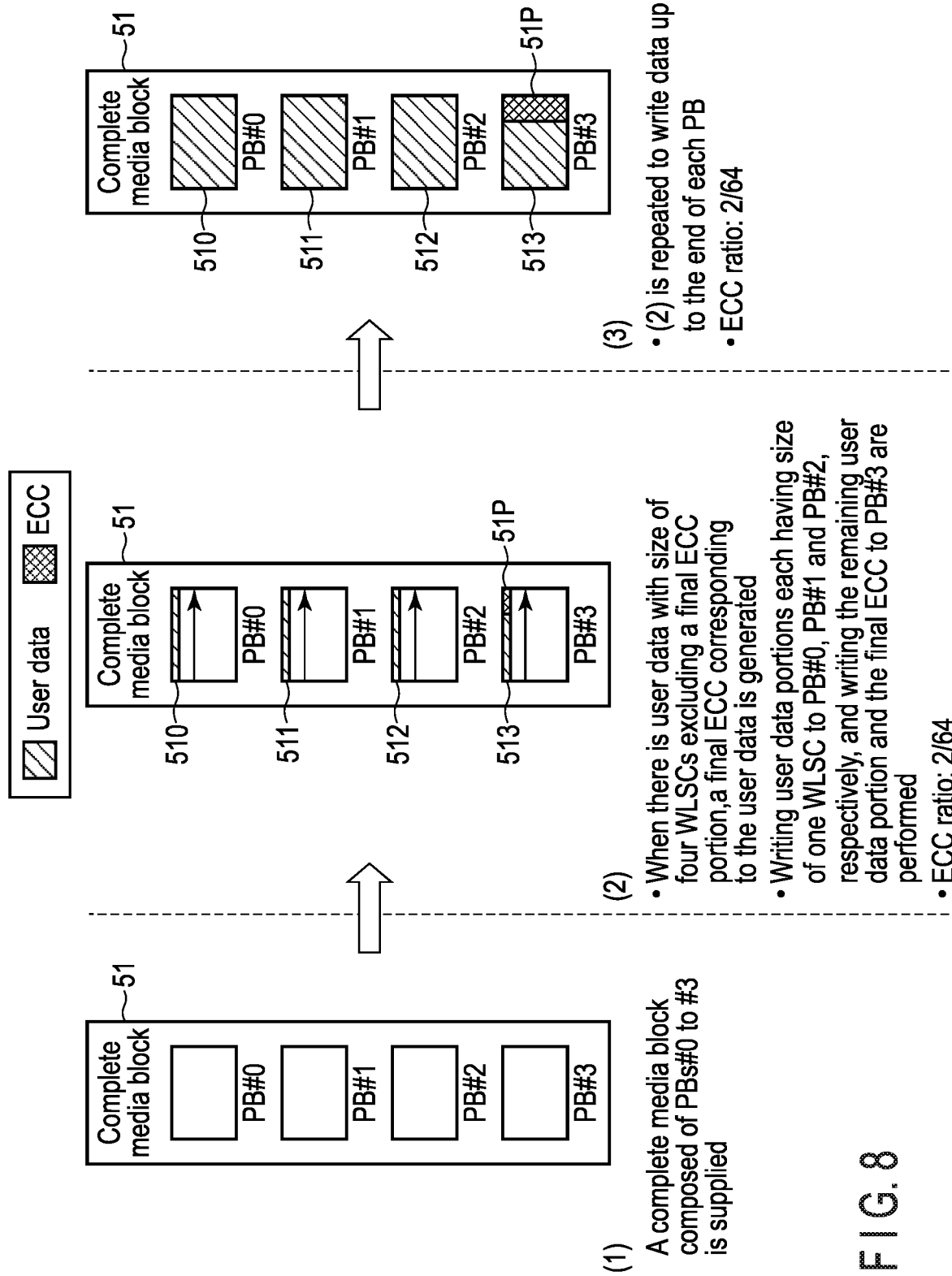
FIG. 8 is a diagram illustrating an example of a host write operation in the memory system of the comparative example.

FIG. 8 illustrates an example of a host write operation in the memory system according to the comparative example.

A controller of the memory system according to the comparative example writes user data to physical blocks that constitute a complete media block 51 are used as a host write destination block. The controller performs writing, in parallel, to the physical blocks. Here, the case where the complete media block 51 is composed of four physical blocks, that is, a physical block PB #0, a physical block PB #1, a physical block PB #2, and a physical block PB #3 is illustrated, but the complete media block 51 may be composed of two or more physical blocks.

Hereinafter, the host write operation will be specifically described.

(1) The controller supplies the physical block PB #0, the physical block PB #1, the physical block PB #2, and the physical block PB #3 constituting the complete media block 51 as a host write destination block. More specifically, the controller selects four physical blocks from free blocks. Then, the controller performs erase processing on each of the selected physical blocks and supplies those physical blocks as the host write destination block.

(2) When there are user data portions 510, 511, 512, and 513 with the size of four WLSCs excluding a final ECC portion which are to be written, the controller generates a final ECC 51P corresponding to the user data portions 510, 511, 512, and 513. Then, the controller performs writing the user data portions 510, 511, and 512 each having the size of a WLSC to the physical block PB #0, the physical block PB #1, and the physical block PB #2, respectively, and writing the remaining user data portion 513 and the final ECC 51P to the physical block PB #3. Data obtained by concatenating the remaining user data portion 513 and the final ECC 51P is data in a unit of WLSC. The controller writes the final ECC 51P to, for example, a terminal position in the data writing in the unit of WLSC.

The written user data portions 510, 511, 512, and 513 and the final ECC 51P constitute an ECC frame. That is, the user data portions 510, 511, 512, and 513 are protected by the final ECC 51P. Therefore, when an error occurs in reading any of the user data portions 510, 511, 512, and 513, the controller 4 can perform error correction processing using the reading results of the user data portions 510, 511, 512, and 513 and the final ECC 51P.

For example, when 2/16 of the size of a WLSC is equivalent to the size of the final ECC 51P, an ECC ratio indicating a ratio of the final ECC 51P to entire data including the user data portions 510, 511, 512, and 513 and the final ECC 51P written in the operation (2) is 2/64.

(3) The controller 4 repeats the operation (2) described above to write user data portions 510, 511, 512, and 513 and a final ECC 51P up to the end of each of the physical blocks PB #0 to PB #3. Each time the controller 4 repeats the operation (2), the user data portions 510, 511, 512, and 513 and the final ECC 51P constituting one ECC frame are written to the complete media block 51.

In addition, for example, when 2/16 of the size of a WLSC is equivalent to the size of the final ECC 51P, the ECC ratio indicating the ratio of the final ECC 51P to the entire data written in the complete media block 51 is 2/64. That is, the ECC ratio when the user data portions 510, 511, 512, and 513 are protected by the final ECC 51P in the complete media block 51 is 2/64.

By the host write operation illustrated in FIG. 8, the controller of the memory system according to the comparative example can store the user data portions 510, 511, 512, and 513 protected by the final ECC 51P in the complete media block 51.

Figure 9:
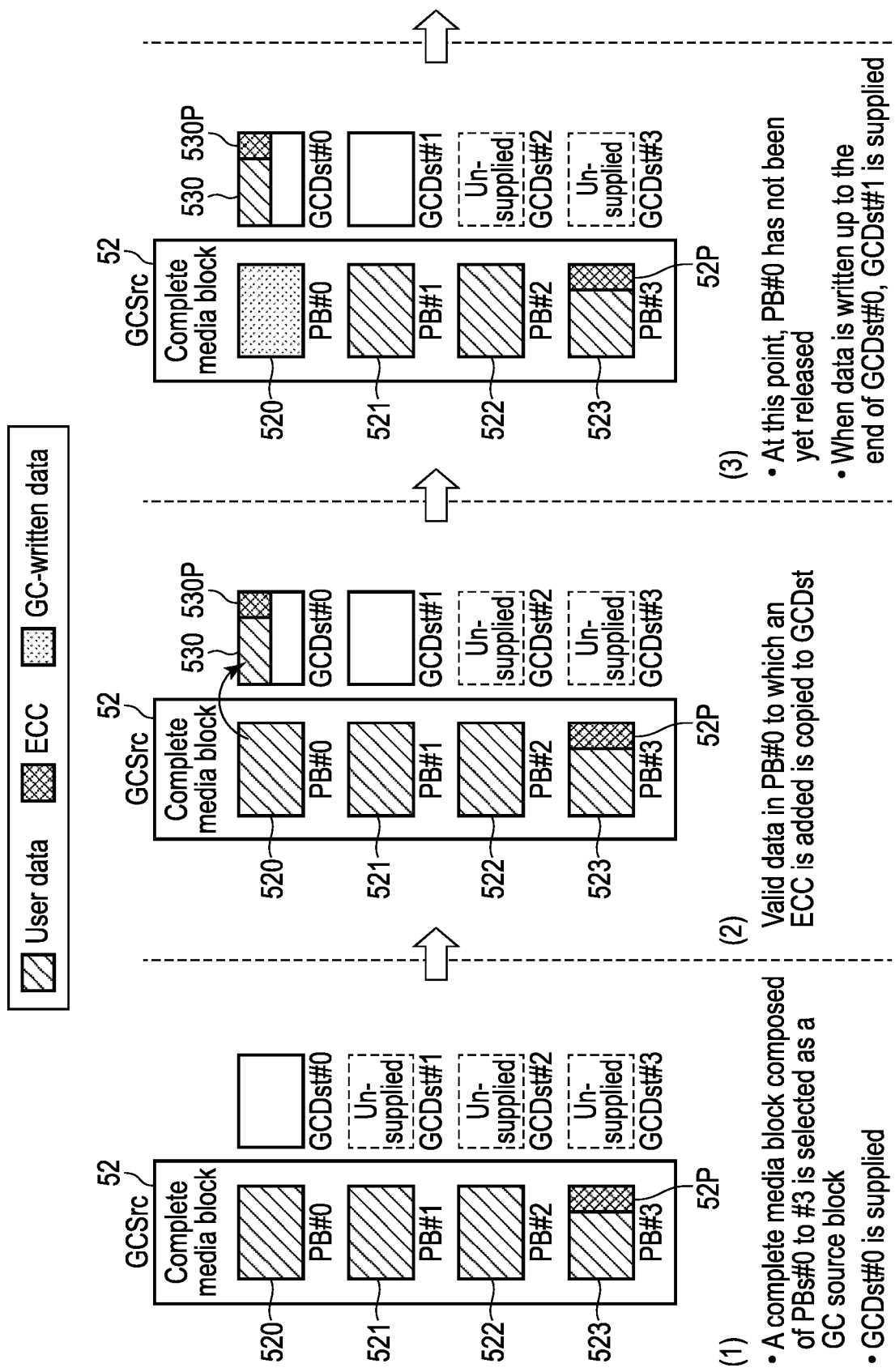
FIG. 9 is a diagram illustrating an example of a garbage collection (GC) operation in the memory system of the comparative example.
Figure 11:
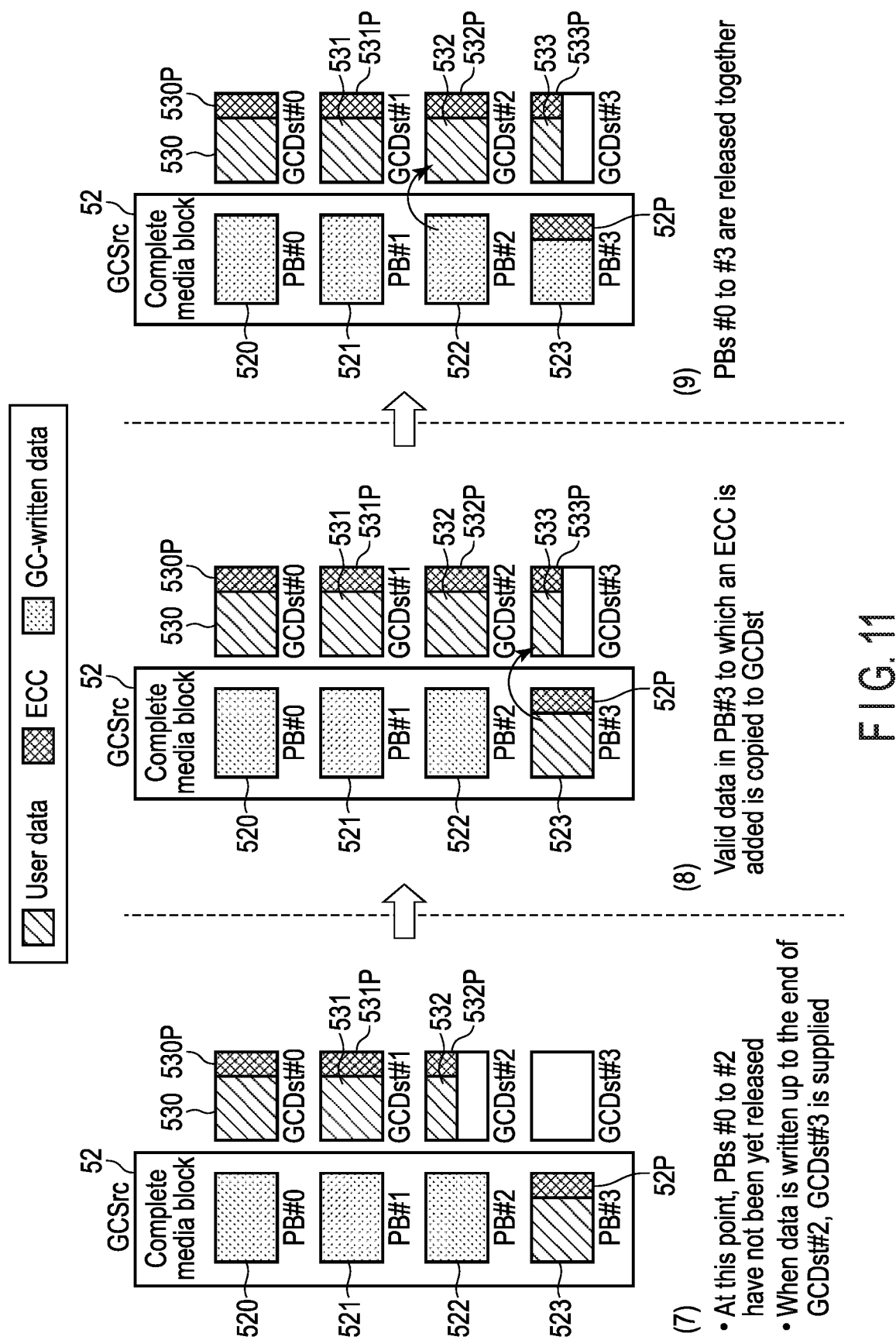
FIG. 11 is a diagram illustrating an example of the GC operation following FIG. 10.

FIGS. 9, 10, and 11 illustrate an example of a GC operation in the memory system according to the comparative example. The controller of the memory system according to the comparative example performs a GC operation on physical blocks constituting a complete media block 52 used as a GC source block (GCSrc). By the GC operation, the controller copies all valid data stored in the physical blocks to a GC destination block (GCDst), and then releases the physical blocks at once. In addition, here, the case where the complete media block 52 is composed of four physical blocks, that is, a physical block PB #0, a physical block PB #1, a physical block PB #2, and a physical block PB #3 is illustrated, but the complete media block 52 may include two or more physical blocks.

Hereinafter, the GC operation will be specifically described.

FIG. 9 illustrates an example of the GC operation in the memory system according to the comparative example.

(1) The controller selects the physical block PB #0, the physical block PB #1, the physical block PB #2, and the physical block PB #3 constituting the complete media block 52 as a GC source block GCSrc. The controller selects, for example, the physical blocks PB #0 to PB #3 constituting the complete media block 52 having a small amount of valid data as the GC source block GCSrc.

The physical block PB #0 stores user data 520. The physical block PB #1 stores user data 521. The physical block PB #2 stores user data 522. The physical block PB #3 stores user data 523 and final ECCs 52P.

In addition, the controller supplies a GC destination block GCDst #0. More specifically, the controller selects one physical block from free blocks. Then, the controller performs erase processing on the selected physical block and supplies the physical block as the GC destination block GCDst #0.

(2) The controller adds an ECC 530P to valid data 530 stored in the physical block PB #0 and copies it to the GC destination block GCDst #0. More specifically, the controller encodes the valid data 530 of the user data 520 stored in the physical block PB #0 in units of WLSC excluding an ECC portion to generate the ECC 530P. Then, the controller writes the valid data 530 and the ECC 530P to the GC destination block GCDst #0 (that is, performs a GC write operation).

(3) When the controller copies all the valid data 530 stored in the physical block PB #0 to the GC destination block GCDst #0, the physical block PB #0 becomes a physical block including GC-written data. The controller has not yet released the physical block PB #0 including the GC-written data. That is, the physical block PB #0 is not yet used as a free block.

In addition, when the controller writes data up to the end of the GC destination block GCDst #0, the controller supplies another GC destination block GCDst #1.

FIG. 10 illustrates an example of the GC operation following FIG. 9.

(4) The controller adds an ECC 531P to valid data 531 stored in the physical block PB #1 and copies it to the GC destination block GCDst #0, #1. More specifically, the controller encodes the valid data 531 of the user data 521 stored in the physical block PB #1 in units of WLSC excluding an ECC portion to generate the ECC 531P. Then, the controller writes the valid data 531 and the ECC 531P to the GC destination block GCDst #0, #1.

The GC destination block GCDst #0, #1 represents the GC destination block GCDst #0 or the GC destination block GCDst #1. When data is written to the end of a GC destination block (e.g., GCDst #0), the controller writes data to a next supplied GC destination block (e.g., GCDst #1). The same applies to a write operation on a GC destination block described below.

(5) When the controller copies all the valid data 531 stored in the physical block PB #1 to the GC destination block GCDst #0, #1, the physical block PB #1 becomes a physical block including GC-written data. The controller has not yet released the physical block PB #1 including the GC-written data. That is, the physical block PB #1 is not yet used as a free block.

In addition, when the controller writes data to the end of the GC destination block GCDst #1, the controller supplies another GC destination block GCDst #2.

(6) The controller adds an ECC 532P to valid data 532 stored in the physical block PB #2 and copies it to the GC destination block GCDst #0, #1, #2. More specifically, the controller encodes the valid data 532 of the user data 522 stored in the physical block PB #2 in units of WLSC excluding an ECC portion, thereby generating the ECC 532P. Then, the controller writes the valid data 532 and the ECC 532P to the GC destination block GCDst #0, #1, #2.

FIG. 11 illustrates an example of the GC operation following FIG. 10.

(7) When the controller copies all the valid data 532 stored in the physical block PB #2 to the GC destination block GCDst #0, #1, #2, the physical block PB #2 becomes a physical block including GC-written data. The controller has not yet released the physical block PB #2 including the GC-written data. That is, the physical block PB #2 is not yet used as a free block.

In addition, when the controller writes data to the end of the GC destination block GCDst #2, the controller supplies another GC destination block GCDst #3.

(8) The controller adds an ECC 533P to valid data 533 stored in the physical block PB #3 and copies it to the GC destination block GCDst #0, #1, #2, #3. More specifically, the controller encodes the valid data 533 of the user data 523 stored in the physical block PB #3 in units of WLSC excluding an ECC portion, thereby generating the ECC 533P. Then, the controller writes the valid data 533 and the ECC 533P to the GC destination block GCDst #0, #1, #2, #3.

(9) When the controller copies all the valid data 533 stored in the physical block PB #3 to the GC destination block GCDst #0, #1, #2, #3, the physical block PB #3 becomes a physical block including GC-written data. As a result, the GC operation for all of the physical blocks PB #0, the physical block PB #1, the physical block PB #2, and the physical block PB #3 constituting the complete media block 52 is completed, and the physical block PB #0, the physical block PB #1, the physical block PB #2, and the physical block PB #3 become physical blocks including GC-written data.

When the GC operation for all of the physical blocks PB #0, the physical block PB #1, the physical block PB #2, and the physical block PB #3 constituting the complete media block 52 has been completed, the controller releases the physical block PB #0, the physical block PB #1, the physical block PB #2, and the physical block PB #3 together. That is, the physical block PB #0, the physical block PB #1, the physical block PB #2, and the physical block PB #3 become free blocks.

By the GC operation illustrated in FIGS. 9, 10, and 11, the controller of the memory system according to the comparative example does not release the physical blocks PB #0 to PB #3 until all valid data in the physical blocks PB #0 to PB #3 that constitute the complete media block 52 is copied to the GC destination blocks GCDst #0, #1, #2, and #3. As a result, the controller can protect the user data stored in the complete media block 52 by the final ECCs 52P even during the GC operation. That is, the controller can perform error correction processing using the final ECC 52P even when a read error occurs during the GC operation.

Figure 12:
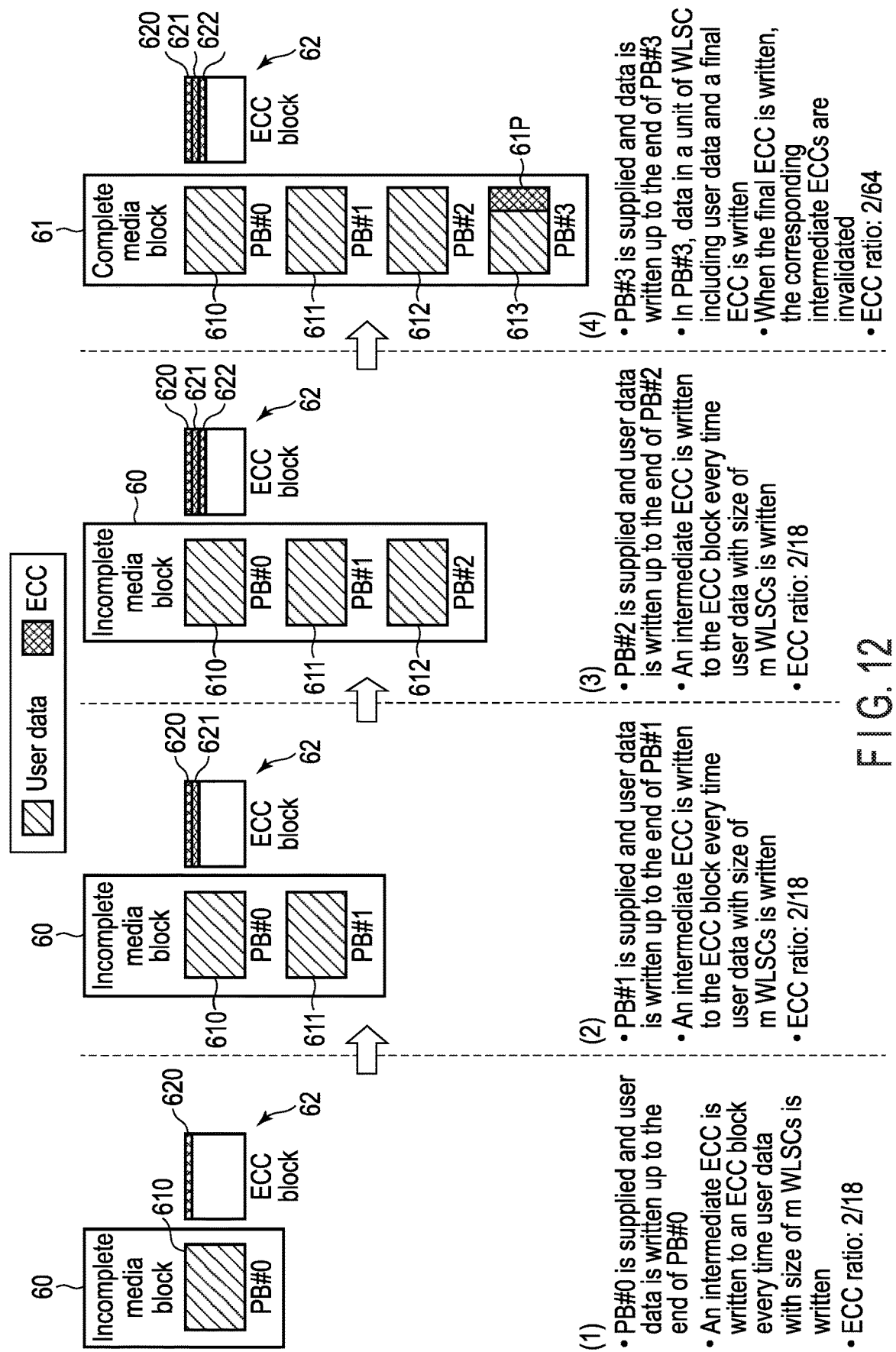
FIG. 12 is a diagram illustrating an example of a host write operation in the memory system of the first embodiment.

FIG. 12 illustrates an example of a host write operation in the memory system 3 according to the first embodiment. The controller 4 sequentially supplies one physical block that will constitute a complete media block 61, and writes user data to the physical block. Here, a host write operation until one complete media block 61 is formed is exemplified. The complete media block 61 is assumed to include four physical blocks, that is, a physical block PB #0, a physical block PB #1, a physical block PB #2, and a physical block PB #3, but may include two or more physical blocks.

Hereinafter, the host write operation will be specifically described.

(1) The controller 4 supplies the physical block PB #0 as a host write destination block. More specifically, the controller 4 selects one physical block from free blocks. Then, the controller 4 performs erase processing on the selected physical block and supplies it as the physical block PB #0. The physical block PB #0 constitutes an incomplete media block 60.

The controller 4 writes a user data portion 610 up to the end of the physical block PB #0. During the writing, the controller 4 writes intermediate ECCs 620 corresponding to the written user data portion 610 to an ECC block 62 every time the user data portion 610 with the size of m WLSCs is written. That is, since the user data portion 610 with the size of m WLSCs corresponds to the intermediate ECCs 620 in a unit of WLSC, the controller 4 writes the intermediate ECCs 620 in the unit of WLSC to the ECC block 62.

Note that the ECC block 62 may be prepared in advance, or may be supplied by the controller 4 at a start of the GC operation. The controller 4 may supply the ECC block 62 in the same manner as the physical block PB #0.

The user data portion 610 in the unit of WLSC (that is, a first protection unit) written in the physical block PB #0 constitutes an ECC frame of the first size together with the corresponding intermediate ECC 620 written in the ECC block 62. Therefore, when an error occurs in reading the user data portion 610, the controller 4 can perform error correction processing by using a reading result of the user data portion 610 and a reading result of the corresponding intermediate ECC 620.

In addition, for example, when the intermediate ECCs 620 in the unit of WLSC corresponds to the user data portion 610 with the size of eight WLSCs (that is, m=8), an ECC ratio indicating a ratio of the intermediate ECCs 620 to the entire data written in the ECC block 62 and the physical block PB #0 for which the writing has been completed is 2/18.

(2) The controller 4 supplies the physical block PB #1 as the host write destination block. The physical block PB #1 constitutes the incomplete media block 60.

The controller 4 writes a user data portion 611 up to the end of the physical block PB #1. During the writing, the controller 4 writes intermediate ECCs 621 corresponding to the written user data portion 611 to the ECC block 62 every time the user data portion 611 with the size of m WLSCs is written. That is, the written user data portion 611 is protected by the intermediate ECCs 621. The user data portion 611 with the size of m WLSCs corresponds to, for example, the intermediate ECCs 621 in a unit of WLSC. That is, the controller 4 writes the intermediate ECCs 621 in the unit of WLSC to the ECC block 62.

The user data portion 611 in the unit of WLSC written in the physical block PB #1 constitutes an ECC frame of the first size together with the corresponding intermediate ECC 621 written in the ECC block 62. Therefore, when an error occurs in reading the user data portion 611, the controller 4 can perform error correction processing by using a reading result of the user data portion 611 and a reading result of the corresponding intermediate ECC 621.

In addition, for example, when the intermediate ECCs 621 in the unit of WLSC corresponds to the user data portion 611 with the size of eight WLSCs (that is, m=8), an ECC ratio indicating a ratio of the intermediate ECCs 620, 621 to the entire data written in the ECC block 62 and the physical blocks PB #0 and PB #1 for which the writing have been completed is 2/18, similarly to (1).

(3) The controller 4 supplies the physical block PB #2 as the host write destination block. The physical block PB #2 constitutes the incomplete media block 60.

The controller 4 writes a user data portion 612 to the end of the physical block PB #2. During the writing, the controller 4 writes intermediate ECCs 622 corresponding to the written user data portion 612 to the ECC block 62 every time the user data portion 612 with the size of m WLSCs is written. The user data portion 612 with the size of m WLSCs corresponds to, for example, intermediate ECCs 622 in a unit of WLSC. That is, the controller 4 writes the intermediate ECCs 622 in the unit of WLSC to the ECC block 62.

The user data portion 612 in a unit of WLSC written in the physical block PB #2 constitutes an ECC frame of the first size together with the corresponding intermediate ECC 622 written in the ECC block 62. Therefore, when an error occurs in reading the user data portion 612, the controller 4 can perform error correction processing by using a reading result of the user data portion 612 and a reading result of the corresponding intermediate ECC 622.

In addition, for example, when the intermediate ECC 622 in the unit of WLSC corresponds to the user data portion 612 with the size of eight WLSCs (that is, m=8), an ECC ratio indicating a ratio of the intermediate ECCs 620, 621, and 622 to the entire data written in the ECC block 62 and the physical blocks PB #0, PB #1, and PB #2 for which the writing have been completed is 2/18.

(4) The controller 4 supplies the physical block PB #3 as the host write destination block. The controller 4 writes data in units of WLSC that includes user data 613 and a final ECC 61P, up to the end of the physical block PB #3.

When there is a user data portion 613, to be written, with the size of one WLSC excluding a final ECC portion, the controller 4 determines the user data portions 610, 611, and 612 that constitute an ECC frame of the second size together with the user data portion 613 and are stored in the physical block PB #0, the physical block PB #1, and the physical block PB #2, respectively. The controller 4 generates the final ECC 61P corresponding to the user data portion 613 and the determined user data portions 610, 611, and 612. The user data portion 613 and the determined user data portions 610, 611, and 612 are user data of a second protection unit.

Then, the controller 4 writes data in the unit of WLSC including the user data portion 613 and the final ECC 61P to the physical block PB #3. The controller 4 writes the final ECC 61P to, for example, a terminal position in the data writing in the unit of WLSC. In addition, the controller 4 invalidates the intermediate ECCs 620, 621, and 622 in the ECC block 62 (that is, set each of them in an invalid state) corresponding to the determined user data portions 610, 611, and 612 when the final ECC 61P has been written.

Invalidation of an ECC corresponds to deleting an entry corresponding to the ECC from the data address-ECC address correspondence table 37. As described above, the data address-ECC address correspondence table 37 includes an entry indicating the physical address where each ECC (more specifically, an intermediate ECC or ECC difference information) is stored. The controller 4 invalidates the intermediate ECCs 620, 621, and 622 by deleting three entries indicating the physical addresses in which the intermediate ECC 620, 621, and 622 are stored, respectively, from the data address-ECC address correspondence table 37.

Alternatively, ECC management information including information indicating validity or invalidity of each ECC may be stored in the DRAM 6 or the like. In this case, the controller 4 changes the information corresponding to each of the intermediate ECCs 620, 621, and 622 from valid to invalid (that is, clears a valid flag and sets an invalid flag) in the ECC management information, thereby invalidating the intermediate ECCs 620, 621, and 622.

The invalidated ECC is no longer be read by the controller 4. The controller 4 treats the invalidated ECC in the same manner as the invalid data (that is, invalidated user data) described above. For example, when ECCs are written up to the end of the ECC block 62 and all the ECCs are then invalidated, the ECC block 62 becomes a free block. That is, the ECC block 62 in which no valid ECC is stored becomes a free block. The controller 4 may perform erase processing on the free block and supply the free block again as a host write destination block or an ECC block.

When the controller 4 writes the user data 613 and the final ECC 61P up to the end of the physical block PB #3, the physical block PB #0, the physical block PB #1, the physical block PB #2, and the physical block PB #3 constitute a complete media block 61.

In addition, for example, in a case where 2/16 of the size of a WLSC is equivalent to the size of a final ECC 61P, the ECC ratio indicating the ratio of the final ECCs 61P to the entire data written in the complete media block 61 is 2/64. That is, the ECC ratio when the user data portions 610, 611, 612, and 613 are protected by the final ECCs 61P in the complete media block 61 is 2/64.

Therefore, the ECC ratio of the complete media block 61 is lower than the ECC ratio when the user data portions 610, 611, and 612 are protected by the intermediate ECCs 620, 621, and 622 in the operations (1) to (3) described above (=2/18). In addition, the ECC ratio of the complete media block 61 is the same as the ECC ratio when the user data portions 510, 511, 512, and 513 are protected by the final ECCs 51P in the complete media block 51 in the memory system according to the comparative example described above with reference to FIG. 8.

As described above, the controller 4 of the memory system 3 according to the first embodiment supplies physical blocks one by one as a host write destination block. On the other hand, the controller of the memory system according to the comparative example collectively supplies physical blocks constituting a complete media block as a host write destination block. Therefore, in the memory system 3 according to the first embodiment, the number of physical blocks secured at the same time as the host write destination block can be reduced as compared with the memory system according to the comparative example.

Therefore, in the first embodiment, it is possible to reduce the number of physical blocks to be secured as the host write destination block without increasing the data amount of ECCs for coping with a defect of physical blocks.

FIGS. 13, 14, and 15 illustrate examples of a GC operation in the memory system 3 according to the first embodiment. The controller 4 performs a GC operation on physical blocks constituting a complete media block 65 used as a GC source block. The controller 4 releases a physical block each time it copies all valid data stored in the physical block to a GC destination block in the GC operation. In addition, here, the case where the complete media block 65 is composed of four physical blocks, that is, a physical block PB #0, a physical block PB #1, a physical block PB #2, and a physical block PB #3 is exemplified, but the complete media block 65 may include two or more physical blocks.

Hereinafter, the GC operation will be specifically described.

FIG. 13 illustrates an example of a GC operation in the memory system according to the first embodiment.

(1) The controller 4 selects the physical block PB #0, the physical block PB #1, the physical block PB #2, and the physical block PB #3 constituting the complete media block 65 as the GC source block GCSrc. More specifically, the controller 4 selects, for example, the physical blocks PB #0 to PB #3 constituting the complete media block 65 having a small amount of valid data as the GC source block GCSrc.

The physical block PB #0 stores user data 650. The physical block PB #1 stores user data 651. The physical block PB #2 stores user data 652. The physical block PB #3 stores user data 653 and final ECCs 65P.

Note that in the following, a portion of the user data 650 stored in the physical block PB #0 will be referred to as a user data portion 650. The same applies to the user data 651, 652, and 653 that are stored in the physical block PB #1, the physical block PB #2, and the physical block PB #3, respectively.

The controller 4 supplies a GC destination block GCDst #0. More specifically, the controller 4 selects a physical block from free blocks. Then, the controller 4 performs erase processing on the selected physical block and supplies the physical block as the GC destination block GCDst #0.

(2) The controller 4 adds an ECC 660P to valid data 660 stored in the physical block PB #0 and copies the valid data to which the ECC 660P is added, to the GC destination block GCDst #0. More specifically, the controller 4 encodes the valid data 660 of the user data 650 stored in the physical block PB #0 in units of WLSC excluding an ECC portion to generate the ECC 660P. Then, the controller 4 writes the valid data 660 and the ECC 660P to the GC destination block GCDst #0 (that is, performs a GC write operation).

In addition, the controller 4 generates ECC difference information 670 corresponding to the user data 650 stored in the physical block PB #0 and writes it to an ECC block 67. More specifically, the controller 4 encodes the user data 650 stored in the physical block PB #0 in units of WLSC to generate the ECC difference information 670. Then, the controller 4 writes the generated ECC difference information 670 to the ECC block 67 every time the ECC difference information 670 corresponding to the user data portion 650 with the size of m WLSCs is generated. That is, since the user data portion 650 with the size of m WLSCs corresponds to the ECC difference information 670 in the unit of WLSC, the controller 4 writes the ECC difference information 670 in the unit of WLSC to the ECC block 67.

The ECC block 67 may be prepared in advance, or may be supplied by the controller 4 at a start of the GC operation. The controller 4 may supply the ECC block 67 in the same manner as the GC destination block GCDst #0.

(3) When all the valid data 660 stored in physical block PB #0 has been copied to the GC destination block GCDst

0 and the ECC difference information 670 corresponding to all the user data 650 stored in the physical block PB #0 has been written in the ECC block 67, the controller 4 releases the physical block PB #0. The released physical block PB #0 becomes a free block. Furthermore, in response to the release of the physical block PB #0, the physical blocks PB #1, the physical block PB #2, and the physical block PB #3 which are unreleased constitute an incomplete media block 65-1.

The controller 4 can protect the user data 651, 652, and 653 stored in the physical blocks PB #1, the physical block PB #2, and the physical block PB #3 constituting the incomplete media block 65-1 by using the ECC difference information 670 and the final ECCs 65P.

For example, when a user data portion 651 (that is, a portion of the user data 651 stored in the physical block PB #1) is read from the unreleased physical block PB #1, and an error occurs in the read user data portion 651, the controller 4 determines a user data portion 650 that constitutes an ECC frame of the second size together with the user data portion 651 and was stored in the released physical block PB #0. Then, the controller 4 reads the ECC difference information 670 corresponding to the determined user data portion 650 from the ECC block 67. The controller 4 reads a user data portion 652 constituting the ECC frame of the second size together with the user data portion 651, from the unreleased physical block PB #2. In addition, the controller 4 reads a user data portion 653 and the final ECC 65P that constitute the ECC frame of the second size together with the user data portion 651, from the unreleased physical block PB #3.

The controller 4 acquires an intermediate ECC by subtracting the ECC difference information 670 from the final ECC 65P. Then, the controller 4 performs error correction processing for the user data portions 651, 652, and 653 by using the acquired intermediate ECC. As a result, even after the user data portion 650 constituting the ECC frame of the second size is lost by releasing the physical block PB #0, other user data portions 651, 652, and 653 constituting the ECC frame of the second size can be protected by the intermediate ECC obtained by subtracting the ECC difference information 670 from the final ECC 65P.

When the controller 4 has written data to the end of the GC destination block GCDst #0, the controller 4 supplies another GC destination block GCDst #1.

FIG. 14 illustrates an example of the GC operation following FIG. 13.

(4) The controller 4 adds an ECC 661P to valid data 661 stored in the physical block PB #1 and copies the valid data 661 to which the ECC 661P is added, to the GC destination block GCDst #0, #1. More specifically, the controller 4 encodes the valid data 661 of the user data 651 stored in the physical block PB #1 in units of WLSC excluding an ECC portion to generate the ECC 661P. Then, the controller 4 writes the valid data 661 and the ECC 661P to the GC destination block GCDst #0, #1.

In addition, the controller 4 generates ECC difference information 671 corresponding to the user data 651 stored in the physical block PB #1 and writes it to the ECC block 67. More specifically, the controller 4 encodes the user data 651 stored in the physical block PB #1 in units of WLSC to generate the ECC difference information 671. Then, the controller 4 writes the generated ECC difference information 671 to the ECC block 67 every time the ECC difference information 671 that corresponds to the user data portion 651 with the size of m WLSCs is generated. That is, since the user data portion 651 with the size of m WLSCs corresponds to the ECC difference information 671 in a unit of WLSC, the controller 4 writes the ECC difference information 671 in the unit of WLSC to the ECC block 67.

(5) When all the valid data 661 stored in physical block PB #1 has been copied to the GC destination block GCDst #0, #1 and the ECC difference information 671 corresponding to all the user data 651 stored in the physical block PB #1 has been written in the ECC block 67, the controller 4 releases the physical block PB #1. The released physical block PB #1 becomes a free block. Further, in response to the release of the physical block PB #1, the physical block PB #2, and the physical block PB #3 which are unreleased constitute an incomplete media block 65-2.

The controller 4 can protect the user data 652 and 653 stored in the physical block PB #2 and the physical block PB #3 constituting the incomplete media block 65-2 by using the ECC difference information 670 and 671 and the final ECCs 65P.

For example, when a user data portion 652 (that is, a portion of the user data 652 stored in the physical block PB #2) is read from the unreleased physical block PB #2, and an error occurs in the read user data portion 652, the controller 4 determines a user data portion 650 that constitutes an ECC frame of the second size together with the user data portion 652 and was stored in the released physical block PB #0. Then, the controller 4 reads the ECC difference information 670 corresponding to the determined user data portion 650 from the ECC block 67. In addition, the controller 4 determines a user data portion 651 that constitutes the ECC frame of the second size together with the user data portion 652 and was stored in the released physical block PB #1. Then, the controller 4 reads the ECC difference information 671 corresponding to the determined user data portion 651 from the ECC block 67. Further, the controller 4 reads a user data portion 653 and a final ECC 51P constituting the ECC frame of the second size together with the user data portion 652, from the unreleased physical block PB #3.

The controller 4 subtracts the ECC difference information 670 and the ECC difference information 671 from the final ECC 65P, to acquire an intermediate ECC. Then, the controller 4 performs error correction processing for the user data portions 652 and 653 by using the acquired intermediate ECC. As a result, even after the user data portions 650 and 651 constituting the ECC frame of the second size are lost by releasing the physical blocks PB #0 and PB #1, other user data portions 652 and 653 constituting the ECC frame of the second size can be protected by the intermediate ECC obtained by subtracting the ECC difference information 670 and 671 from the final ECC 65P.

When the controller 4 has written data to the end of the GC destination block GCDst #1, the controller 4 supplies another GC destination block GCDst #2.

(6) The controller 4 adds an ECC 662P to valid data 662 stored in the physical block PB #2 and copies the valid data to which the ECC 662P is added, to the GC destination block GCDst #0, #1, #2. More specifically, the controller 4 encodes the valid data 662 of the user data 652 stored in the physical block PB #2 in units of WLSC excluding an ECC portion to generate the ECC 662P. Then, the controller 4 writes the valid data 662 and the ECC 662P to the GC destination block GCDst #0, #1, #2.

In addition, the controller 4 generates ECC difference information 672 corresponding to the user data 652 stored in the physical block PB #2 and writes it to the ECC block 67. More specifically, the controller 4 encodes the user data 652 stored in the physical block PB #2 in units of WLSC to generate the ECC difference information 672. Then, the controller 4 writes the generated ECC difference information 672 to the ECC block 67 every time the ECC difference information 672 corresponding to the user data portion 652 with the size of m WLSCs is generated. That is, since the user data portion 652 with the size of m WLSCs corresponds to the ECC difference information 672 in a unit of WLSC, the controller 4 writes the ECC difference information 672 in the unit of WLSC to the ECC block 67.

FIG. 15 illustrates an example of the GC operation following FIG. 14.

(7) When all the valid data 662 stored in the physical block PB #2 has been copied to the GC destination block GCDst #0, #1, #2 and the ECC difference information 672 corresponding to all the user data 652 stored in the physical block PB #2 has been written in the ECC block 67, the controller 4 releases the physical block PB #2. The released physical block PB #2 becomes a free block. Further, in response to the release of the physical block PB #2, the physical block PB #3 which is unreleased constitutes an incomplete media block 65-3.

The controller 4 can protect the user data 653 stored in the physical block PB #3 constituting the incomplete media block 65-3 by using the ECC difference information 670, 671, and 672 and the final ECCs 65P.

For example, when a user data portion 653 (that is, a portion of the user data 653 stored in the physical block PB #3) is read from the unreleased physical block PB #3, and an error occurs in the read user data portion 653, the controller 4 determines a user data portion 650 that constitutes an ECC frame of the second size together with the user data portion 653 and was stored in the released physical block PB #0. Then, the controller 4 reads the ECC difference information 670 corresponding to the determined user data portion 650 from the ECC block 67. In addition, the controller 4 determines a user data portion 651 that constitutes the ECC frame of the second size together with the user data portion 653 and was stored in the released physical block PB #1. Then, the controller 4 reads the ECC difference information 671 corresponding to the determined user data portion 651 from the ECC block 67. Further, the controller 4 determines a user data portion 652 that constitutes the ECC frame of the second size together with the user data portion 653 and was stored in the released physical block PB #2. Then, the controller 4 reads the ECC difference information 672 corresponding to the determined user data portion 652 from the ECC block 67. In addition, the controller 4 reads the final ECC 65P constituting the ECC frame of the second size together with the user data portion 653 from the unreleased physical block PB #3.

The controller 4 acquires an intermediate ECC by subtracting the ECC difference information 670, the ECC difference information 671, and the ECC difference information 672 from the final ECC 65P. Then, the controller 4 performs error correction processing for the user data portion 653 by using the acquired intermediate ECC. As a result, even after the user data portions 650, 651, and 652 constituting the ECC frame of the second size are lost by releasing the physical blocks PB #0, PB #1, and PB #2, another user data portion 653 constituting the ECC frame of the second size can be protected by the intermediate ECC obtained by subtracting the ECC difference information 670, 671, and 672 from the final ECC 65P.

When the controller 4 has written data to the end of the GC destination block GCDst #2, the controller 4 supplies another GC destination block GCDst #3.

(8) The controller 4 adds an ECC 663P to valid data 663 stored in the physical block PB #3 and copies the valid data 663 to which the ECC 663P is added, to the GC destination block GCDst #0, #1, #2, #3. More specifically, the controller 4 encodes the valid data 663 of the user data 653 stored in the physical block PB #3 in units of WLSC excluding an ECC portion to generate the ECC 663P. Then, the controller 4 writes the valid data 663 and the ECC 663P to the GC destination block GCDst #0, #1, #2, #3.

(9) When all the valid data 663 stored in the physical block PB #3 has been copied to the GC destination block GCDst #0, #1, #2, #3, the controller 4 releases the physical block PB #3. The released physical block PB #3 becomes a free block. In addition, since the physical block PB #3 in which the user data 653 is stored has been released, the controller 4 invalidates the ECC difference information 670, 671, and 672 for protecting the user data 653 stored in the ECC block 67 (i.e., sets the ECC difference information 670, 671, and 672 in an invalid state).

As described above, the invalidation of an ECC corresponds to deleting an entry corresponding to the ECC from the data address-ECC address correspondence table 37. The data address-ECC address correspondence table 37 includes an entry indicating a physical address where each of ECCs (more specifically, intermediate ECC or ECC difference information) is stored. The controller 4 invalidates the pieces of ECC difference information 670, 671, and 672 by erasing three entries indicating the physical addresses in which the pieces of ECC difference information 670, 671, and 672 are stored, respectively, from the data address-ECC address correspondence table 37.

Alternatively, ECC management information including information indicating validity or invalidity of each ECC may be stored in the DRAM 6 or the like. In this case, the controller 4 changes the information corresponding to each of the pieces of ECC difference information 670, 671, and 672 from valid to invalid in the ECC management information, thereby invalidating the pieces of ECC difference information 670, 671, and 672.

The invalidated ECC is no longer be read by the controller 4. The controller 4 treats the invalidated ECC in the same manner as the invalid data (that is, invalidated user data) described above. For example, when ECCs are written up to the end of the ECC block 67 and all the ECCs are then invalidated, the ECC block 67 becomes a free block. That is, the ECC block 67 in which no valid ECC is stored becomes a free block. The controller 4 may perform erase processing on the free block and supply the free block again as a host write destination block or an ECC block.

By the GC operation illustrated in FIGS. 13, 14, and 15, the controller 4 of the memory system 3 according to the first embodiment releases a physical block that constitutes the complete media block 65 every time all the valid data in the physical block has been copied to the GC destination block GCDst #0, #1, #2, #3 and the ECC difference information corresponding to the user data stored in the physical block has been written to the ECC block 67. As a result, the controller 4 can protect the user data stored in each of the incomplete media blocks 65-1, 65-2, and 65-3 by the intermediate ECC obtained by subtracting the ECC difference information 670, 671, and 672 from the final ECC 65P even during the GC operation. That is, even if a read error occurs during the GC operation, the controller 4 can perform error correction processing by using the intermediate ECC obtained by subtracting the ECC difference information 670, 671, and 672 from the final ECC 65P.

Note that, the controller 4 may interrupt the GC operation for the physical blocks PB #0 to PB #3 constituting the complete media block 65 in accordance with the result of analyzing write requests by the host 2, in order to stop a sequential release of releasing the physical blocks PB #0 to PB #3 one by one in order. For example, when a write pattern that indicates sequential writing and repetitive overwriting for a certain logical address space is detected as the result of the analysis, the controller 4 interrupts the GC operation for the physical blocks PB #0 to PB #3. As a result, the controller 4 does not perform the GC operation when it is predicted that the physical blocks PB #0 to PB #3 will transition to a state in which invalid data is stored by overwriting for the certain logical address space. In addition, since the interruption of the GC operation also stops the generation and writing of ECC difference information, an overhead can be eliminated.

As illustrated in FIG. 1, the CPU 12 of the controller 4 can function as a read control module 121, a write control module 122, a garbage collection (GC) control module 123, and an error correction processing module 124. The CPU 12 may function as these modules 121, 122, 123, and 124 by, for example, executing firmware.

The read control module 121 controls each component in the controller 4 to perform a host read operation. The host read operation is an operation for reading user data from the nonvolatile memory 5 in accordance with receiving a read command from the host 2.

The write control module 122 receives user data to be written to the nonvolatile memory 5 from the host 2 in accordance with receiving a write command from the host 2. Then, the write control module 122 controls each component in the controller 4 to perform a host write operation. As described above, the host write operation is an operation for writing the received user data into the nonvolatile memory 5.

The GC control module 123 controls each component in the controller 4 to perform a GC operation. As described above, the GC operation is an operation for copying valid data stored in a GC source block to a GC destination block.

The error correction processing module 124 performs error correction processing when an error occurs in user data that is read from the nonvolatile memory 5 by the read control module 121 or the GC control module 123. In addition, the error correction processing module 124 performs the error correction processing when writing of user data into the nonvolatile memory 5 by the write control module 122 is not successful.

In the following, operation examples of these modules 121, 122, 123, and 124 will be described more specifically.

FIG. 16 is a block diagram illustrating a configuration example for a host write operation in the memory system 3 according to the first embodiment. Here, a case where a complete media block is composed of n physical blocks is exemplified. Note that n is an integer greater than one.

(1) The write control module 122 receives user data to be written to the nonvolatile memory 5 from the host 2 in accordance with receiving a write command from the host 2. The write control module 122 may accumulate the received user data in the WB 31.

(2) The write control module 122 transfers a user data portion to be written to the nonvolatile memory 5 to the storage I/F 13.

(3) The write control module 122 transfers the same user data portion as in (2) to the ECC encoder 15. The write control module 122 may transfer the user data portion to the storage I/F 13 and the ECC encoder 15 in parallel. Alternatively, the write control module 122 may transfer the user data portion to the ECC encoder 15 and then to the storage I/F 13.

(4) The ECC encoder 15 encodes the user data portion, thereby generating an ECC that constitutes an ECC frame together with the user data portion. The ECC encoder 15 generates an intermediate ECC for protecting a user data portion of the first protection unit or a final ECC for protecting a user data portion of the second protection unit. The user data of the second protection unit includes n−1 user data portions of the first protection unit when a complete media block is composed of n physical blocks.

More specifically, the ECC encoder 15 encodes a user data portion of the first protection unit, thereby generating an intermediate ECC. The user data portion of the first protection unit and the intermediate ECC constitute an ECC frame of the first size. The ECC encoder 15 transfers the generated intermediate ECC to the storage I/F 13.

In addition, when n−1 user data portions of the first protection unit that are included in n−1 ECC frames of the first size, respectively, have been written into the nonvolatile memory 5, the ECC encoder 15 encodes the n−1 user data portions of the first protection unit and another second user data portion to be written to the nonvolatile memory 5, thereby generating an final ECC. The n−1 user data portions of the first protection unit, the second user data portion, and the final ECC constitute an ECC frame of the second size. The second size is larger than the first size. In addition, data obtained by combining the n−1 user data portions of the first protection unit and the second user data portion is a user data portion of the second protection unit. The ECC encoder 15 transfers the generated final ECC to the storage I/F 13.

(5) The storage I/F 13 writes the user data portion of the first protection unit transferred by the write control module 122 and the intermediate ECC transferred by the ECC encoder 15, into the nonvolatile memory 5.

More specifically, the storage I/F 13 writes the user data portion of the first protection unit to one of the n physical blocks. In addition, the storage I/F 13 writes the intermediate ECC to an ECC block. As a result, the user data portion of the first protection unit is protected by the corresponding intermediate ECC.

In (4), the ECC encoder 15 may transfer the intermediate ECC to the DRAM I/F 14. In this case, the DRAM I/F 14 stores the intermediate ECC in the DRAM 6.

In addition, the storage I/F 13 writes the second user data portion transferred by the write control module 122 and the final ECC transferred by the ECC encoder 15, into the nonvolatile memory 5.

More specifically, the storage I/F 13 writes the second user data portion and the final ECC to the last physical block of the n physical blocks. As a result, the user data portion of the second protection unit, that is, the n−1 user data portions of the first protection unit and the second user data portion are protected by the corresponding final ECC.

(6) After writing the second user data portion and the final ECC to the nonvolatile memory 5, the write control module 122 invalidates the n−1 intermediate ECCs that are included in the n−1 ECC frames of the first size, respectively, and are stored in the nonvolatile memory 5 or the DRAM 6. Specifically, the write control module 122 determines, for example, the physical address of each of the n−1 user data portions of the first protection unit that constitute the ECC frame of the second size. The write control module 122 updates the data address-ECC address correspondence table 37 so that the determined physical address of each of the n−1 user data portions is not associated with any physical address of an intermediate ECC. As a result, the n−1 intermediate ECCs which correspond to the n−1 user data portions of the first protection unit, respectively, are invalidated.

With the configuration illustrated in FIG. 16, the controller 4 can protect the user data portion of the first protection unit by the intermediate ECC. In addition, the controller 4 can protect the user data portion of the second protection unit by the final ECC.

Note that in the operation (5) in FIG. 16, when writing (more specifically, programming) part or all of a user data portion of the first protection unit to a physical block (i.e., nonvolatile memory 5) is not successful, the error correction processing module 124 performs error correction processing on the user data portion of the first protection unit by using an intermediate ECC constituting an ECC frame of the first size together with the user data portion of the first protection unit. Erasure correction may be used for the error correction processing. That is, the error correction processing module 124 restores the user data portion of the first protection unit in which the writing is not successful by using the intermediate ECC. As a result, the write control module 122 can perform writing to the physical block again by using the restored user data portion of the first protection unit.

FIG. 17 is a block diagram illustrating a configuration example for a GC operation in the memory system 3 according to the first embodiment. Here, a case where a complete media block includes n physical blocks is exemplified. Note that n is an integer greater than one.

(1) The storage I/F 13 reads data (hereinafter referred to as a GC data portion) from a GC source block in the nonvolatile memory 5 in accordance with a read instruction by the GC control module 123. The GC data portion includes at least one of valid data and invalid data.

(2) The storage I/F 13 transfers the GC data portion to the GC control module 123. The GC control module 123 may accumulate the GC data portion in the GC buffer 32.

(3) The GC control module 123 transfers valid data in the GC data portion to the storage I/F 13.

(4) The GC control module 123 transfers the valid data in the GC data portion to the ECC encoder 15. The GC control module 123 may transfer the valid data to the storage I/F 13 and the ECC encoder 15 in parallel. Alternatively, the GC control module 123 may transfer the valid data to the ECC encoder 15 and then to the storage I/F 13.

(5) The ECC encoder 15 encodes the valid data in units of WLSC excluding an ECC portion, thereby generating an ECC. The ECC encoder 15 transfers the generated ECC to the storage I/F 13. The size of data obtained by concatenating the valid data and the generated ECC is equivalent to the size of a WLSC.

(6) The storage I/F 13 writes the valid data and the corresponding ECC to a GC destination block in the nonvolatile memory 5.

(7) The GC control module 123 transfers the GC data portion to the ECC encoder 15.

(8) The ECC encoder 15 encodes the GC data portion for each first protection unit, thereby generating ECC difference information. The ECC encoder 15 transfers the generated ECC difference information to the storage I/F 13.

(9) The storage I/F 13 writes the ECC difference information to an ECC block in the nonvolatile memory 5. In (8), the ECC encoder 15 may transfer the ECC difference information to the DRAM I/F 14. In this case, the DRAM I/F 14 stores the ECC difference information in the DRAM 6.

The controller 4 may perform the operations (3) to (6) and the operations (7) to (9) in parallel, or may perform the operations (3) to (6) after the operations (7) to (9).

Here, in the GC operation, a case where a third user data portion of the first protection unit that is included in an ECC frame of the second size and is stored in the nonvolatile memory 5 is erased as a GC data portion is exemplified. In this case, the GC control module 123 generate ECC difference information corresponding to the third user data portion with the ECC encoder 15. The GC control module 123 writes the generated ECC difference information to the ECC block in the nonvolatile memory 5 via the storage I/F 13, or stores the generated ECC difference information in the DRAM 6 via the DRAM I/F 14.

After that, when the GC control module 123 reads a fourth user data portion included in the ECC frame of the second size from the nonvolatile memory 5 and an error occurs in the read fourth user data portion, the error correction processing module 124 performs error correction processing. Note that when the read control module 121 reads the fourth user data portion included in the ECC frame of the second size from the nonvolatile memory 5 in accordance with receiving a read command from the host 2 and an error occurs in the read fourth user data portion, the error correction processing module 124 also performs the error correction processing.

The error correction processing module 124 acquires an intermediate ECC by subtracting the ECC difference information corresponding to the third user data portion from the final ECC included in the ECC frame of the second size. The error correction processing module 124 performs the error correction processing on a data portion obtained by excluding the third user data portion from the data portion included in the ECC frame of the second size, by using the acquired intermediate ECC.

More specifically, for example, when erasing the third user data portion included in the ECC frame of the second size from a fourth physical block of the n physical blocks, the GC control module 123 generates ECC difference information corresponding to the third user data portion with the ECC encoder 15. Then, the GC control module 123 writes the generated ECC difference information to the ECC block or stores the generated ECC difference information in the DRAM 6.

After that, when the GC control module 123 reads a fourth user data portion which is included in the ECC frame of the second size, from one of n−1 physical blocks that are obtained by excluding the fourth physical block from the n physical blocks, and an error occurs in the read fourth user data portion, the GC control module 123 acquires a fourth ECC by subtracting the ECC difference information corresponding to the third user data portion from the final ECC included in the ECC frame of the second size. Then, the error correction processing module 124 performs the error correction processing on a data portion that is included in the ECC frame of the second size and is stored in the n−1 physical blocks that are obtained by excluding the fourth physical block from the n physical blocks.

With the configuration illustrated in FIG. 17, the controller 4 can protect user data in an unreleased physical block that constitutes an ECC frame of the second size together with GC data by an intermediate ECC. The controller 4 can calculate the intermediate ECC by subtracting ECC difference information corresponding to the GC data from a final ECC in the unreleased physical block.

Figure 18:
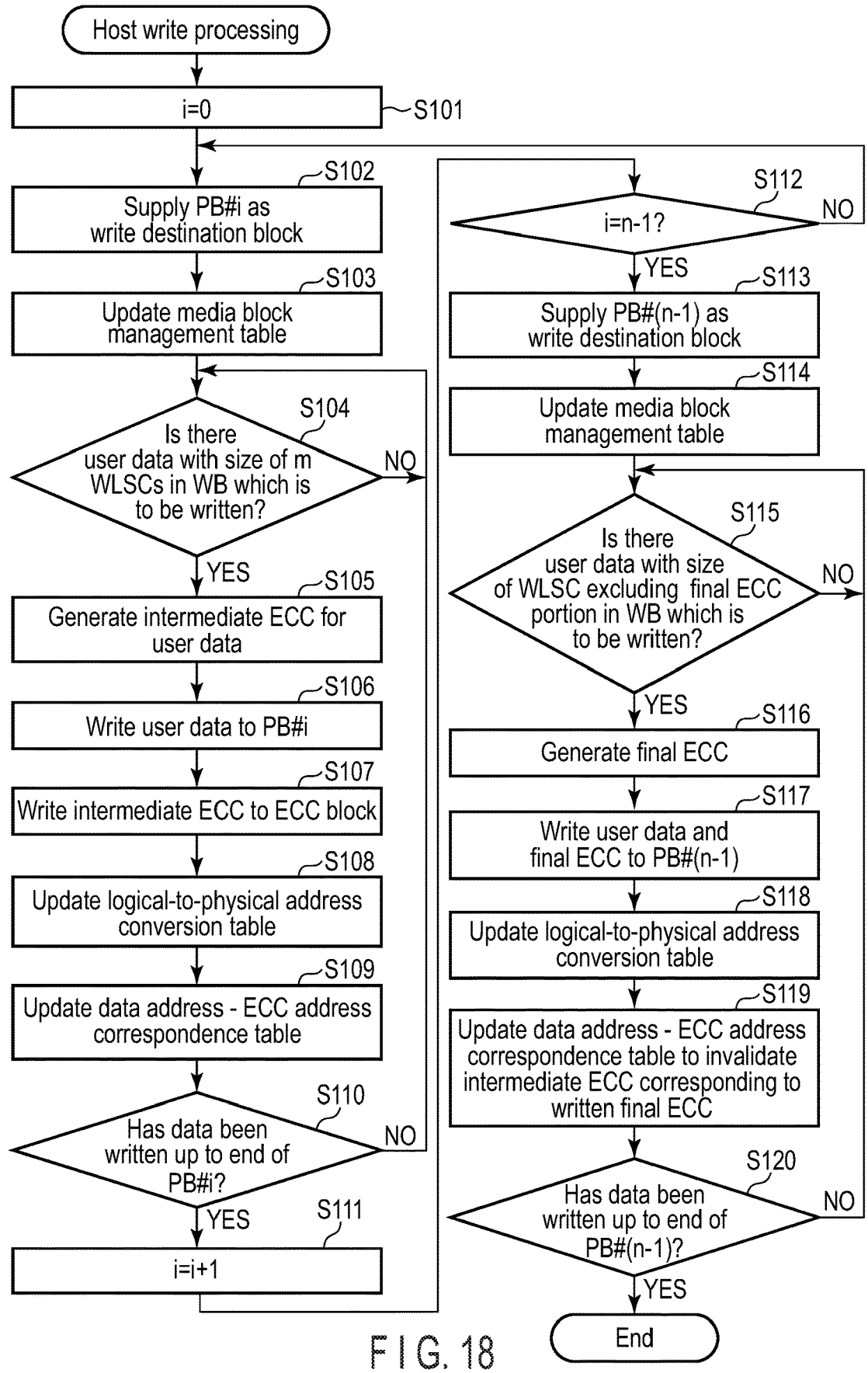
FIG. 18 is a flowchart illustrating an example of the procedure of host write processing executed by a write control module in a controller in the memory system of the first embodiment.

FIG. 18 is a flowchart illustrating an example of the procedure of host write processing executed by the write control module 122 in the controller 4 in the memory system 3 according to the first embodiment. Here, a case where a complete media block is composed of n physical blocks PB #0 to PB #(n−1) is exemplified.

The write control module 122 sets a variable i to zero (S101). The write control module 122 supplies a physical block PB #i as a write destination block (S102).

The write control module 122 updates the media block management table 36 to indicate that the physical block PB #i is one of n physical blocks that constitute a complete media block (S103).

Next, the write control module 122 determines whether or not user data with the size of m WLSCs which is to be written to the write destination block is accumulated in the WB 31 (S104). Note that m is an integer greater than one. Intermediate ECCs corresponding to the user data with the size of m WLSCs have a size of a write unit for an ECC block (for example, WLSC).

When user data with the size of m WLSCs which is to be written to the write destination block is not accumulated in the WB 31 (S104 NO), the write control module 122 returns to the procedure of S104.

When user data with the size of m WLSCs which is to be written to the write destination block is accumulated in the WB 31 (S104 YES), the write control module 122 encodes each of m user data portions with the size of m WLSCs with the ECC encoder 15 to generate the intermediate ECCs each constituting an ECC frame of the first size together with each of the user data portions (S105).

The write control module 122 writes the m user data portions to the physical block PB #i (S106). The write control module 122 writes the generated intermediate ECCs to the ECC block (S107). The write control module 122 updates the logical-to-physical address conversion table 35 so as to indicate the mapping between the logical address and the physical address of the user data written in the physical block PB #i (S108). Then, the write control module 122 updates the data address-ECC address correspondence table 37 so as to indicate the correspondence between the physical address of the user data written in the physical block PB #i and the physical address of the intermediate ECC written in the ECC block (S109).

Next, the write control module 122 determines whether or not user data has been written up to the end of the physical block PB #i (S110). When user data is not written up to the end of the physical block PB #i (S110 NO), the write control module 122 proceeds to the procedure of S104 so as to further write another user data portion to the physical block PB #i.

When user data has been written up to the end of the physical block PB #i (S110 YES), the write control module 122 adds one to the variable i (S111). Then, the write control module 122 determines whether or not the variable i is equal to n−1 (S112). That is, the write control module 122 determines whether or not a physical block PB #i which is used next as the write destination block is the last physical block PB #(n−1) that constitutes the complete media block. When the variable i is not equal to n−1 (S112 NO), the write control module 122 proceeds to the procedure of S102 so as to write a user data portion to the next physical block PB #i which is not the last physical block that constitutes the complete media block and protect the user data portion by an intermediate ECC.

When the variable i is equal to n−1 (S112 YES), the write control module 122 supplies the physical block PB #(n−1) as the write destination block (S113). The write control module 122 updates the media block management table 36 to indicate that the physical block PB #(n−1) is one of the n physical blocks that constitute the complete media block (S114).

Then, the write control module 122 determines whether or not user data with the size of a WLSC excluding a final ECC portion which is to be written to the write destination block is accumulated in the WB 31 (S115). When user data with the size of a WLSC excluding a final ECC portion which is to be written to the write destination block is not accumulated in the WB 31 (S115 NO), the write control module 122 returns to the procedure of S115.

When user data with the size of a WLSC excluding a final ECC portion which is to be written to the write destination block is accumulated in the WB 31 (S115 YES), the write control module 122 generates a final ECC corresponding to an ECC frame of the second size that extends from the physical block PB #0 to the physical block PB #(n−1) in the complete media block, with the ECC encoder 15 (S116). The ECC frame of the second size includes the user data with the size of a WLSC written in each of the physical blocks other than the physical block PB #(n−1) in the complete media block, the user data with the size of a WLSC excluding a final ECC portion which is to be written to the physical block PB #(n−1), and the final ECC corresponding to these user data. The write control module 122 writes the user data with the size of a WLSC excluding a final ECC portion, and the final ECC to the physical block PB #(n−1) (S117).

For example, when the complete media block includes four physical blocks PB #0 to PB #3, the write control module 122 generates a final ECC corresponding to user data portions each having the size of a WLSC that have been written in the physical blocks PB #0 to PB #2, respectively, and a user data portion with the size of a WLSC excluding a final ECC portion which is to be written to the physical block PB #3, with the ECC encoder 15. Then, the write control module 122 writes the user data portion with the size of a WLSC excluding a final ECC portion, and the final ECC to the physical block PB #3.

Next, the write control module 122 updates the logical-to-physical address conversion table 35 so as to indicate the mapping between the logical address and the physical address of the user data written in the physical block PB #(n−1) (S118). Then, the write control module 122 updates the data address-ECC address correspondence table 37 to invalidate the intermediate ECCs corresponding to the written final ECC (S119). That is, since the final ECC corresponding to the ECC frame of the second size has been written in the physical block PB #(n−1), the write control module 122 invalidates the intermediate ECCs that are generated for the user data in the ECC frame of the second size and are written in the ECC block.

The write control module 122 determines whether or not data has been written up to the end of the physical block PB #(n−1) (S120). When data is not written up to the end of the physical block PB #(n−1) (S120 NO), the write control module 122 proceeds to the procedure of S115 so as to further write another user data and a final ECC to the physical block PB #(n−1).

When data has been written up to the end of the physical block PB #(n−1) (S120 YES), the write control module 122 ends the host write processing (end).

By the host write processing illustrated in FIG. 18, the write control module 122 can protect the complete media block by the final ECC. Further, the write control module 122 writes user data to physical blocks that will constitute the complete media block and can protect the user data written in the physical blocks by intermediate ECCs until the final ECC is written, that is, while the physical blocks that will constitute the complete media block constitute an incomplete media block.

Figure 19:
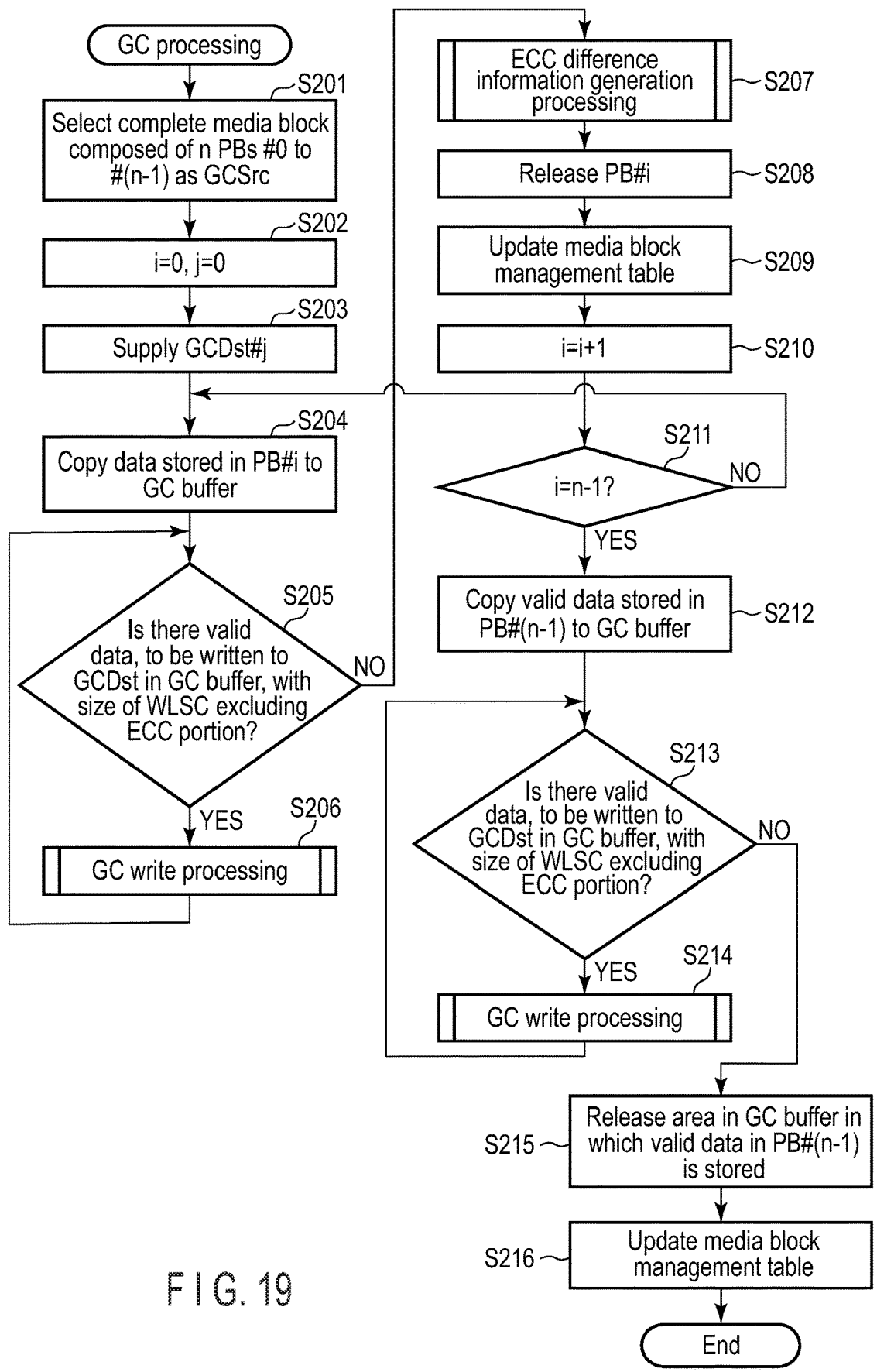
FIG. 19 is a flowchart illustrating an example of the procedure of GC processing executed by a GC control module in the controller in the memory system of the first embodiment.

FIG. 19 is a flowchart illustrating an example of the procedure of GC processing executed by the GC control module 123 in the controller 4 in the memory system 3 according to the first embodiment. Here, a case where a complete media block is composed of n physical blocks is exemplified.

The GC control module 123 selects a complete media block that is composed of n physical blocks PB #0 to PB #(n−1), as a GC source block GCSrc (S201). The GC control module 123 selects, for example, a complete media block with a small amount of valid data as the GC source block GCSrc from active blocks. Each of the physical blocks PB #0 to PB #(n−1) constituting the complete media block stores at least one of valid data and invalid data.

The GC control module 123 sets a variable i to zero and sets a variable j to zero (S202). Then, the GC control module 123 supplies a GC destination block GCDst #j (S203).

Next, the GC control module 123 reads data stored in the physical block PB #i and copies the data to the GC buffer 32 (S204). The GC control module 123 determines whether or not valid data with the size of a WLSC excluding an ECC portion which is to be written to the GC destination blocks GCDst #0 to #j, is accumulated in the GC buffer 32 (S205). When valid data with the size of a WLSC excluding an ECC portion which is to be written to the GC destination blocks GCDst #0 to #j, is accumulated in the GC buffer 32 (S205 YES), the GC control module 123 executes GC write processing for writing the valid data to the GC destination block (S206), and proceeds to 3205. The detailed procedure of the GC write processing will be described later with reference to the flowchart of FIG. 20.

When valid data with the size of a WLSC excluding an ECC portion which is to be written to the GC destination blocks GCDst #0 to #j, is not accumulated in the GC buffer 32 (S205 NO), the GC control module 123 executes ECC difference information generation processing (S207). In the ECC difference information generation processing, the GC control module 123 generates ECC difference information corresponding to user data stored in the physical block PB #i and writes the ECC difference information to the ECC block 67. The detailed procedure of the ECC difference information generation processing will be described later with reference to the flowchart of FIG. 21.

After executing the ECC difference information generation processing in S207, the GC control module 123 releases the physical block PB #i (S208). As a result, the physical block PB #i becomes a free block. Then, the GC control module 123 updates the media block management table 36 to indicate that the physical block PB #i is a released physical block (S209). The ECC difference information generated in S207 is used to protect the user data stored in the physical blocks PB #(i+1) to PB #(n−1) that have not been released yet.

Next, the GC control module 123 adds one to the variable i (S210). Then, the GC control module 123 determines whether or not the variable i is equal to n−1 (S211). That is, the GC control module 123 determines whether or not the next physical block PB #i is the last physical block constituting the complete media block. When the variable i is not equal to n−1 (S211 NO), the GC control module 123 proceeds to the procedure of S204 so as to perform GC for the next physical block PB #i and generate ECC difference information for protecting user data stored in at least one physical block in the complete media block that has not been released yet.

When the variable i is equal to n−1 (S211 YES), the GC control module 123 reads data stored in the physical block PB #(n−1) and copies the data to the GC buffer 32 (S212). The GC control module 123 determines whether or not valid data with the size of a WLSC excluding an ECC portion which is to be written to the GC destination blocks GCDst #0 to #j, is accumulated in the GC buffer 32 (S213). When valid data with the size of a WLSC excluding an ECC portion which is to be written to the GC destination blocks GCDst #0 to #j, is accumulated in the GC buffer 32 (S213 YES), the GC control module 123 executes GC write processing for writing the valid data to the GC destination block GCDst (S214), and proceeds to S213.

When valid data with the size of a WLSC excluding an ECC portion which is to be written to the GC destination blocks GCDst #0 to #j, is not accumulated in the GC buffer 32 (S213 NO), the GC control module 123 releases an area in the GC buffer 32 in which the valid data in the physical block PB #i is stored (S215). Since all the physical blocks PB #0 to PB #(n−1) constituting the complete media block have been released, the GC control module 123 updates the media block management table 36 to delete the entry indicating that the physical blocks PB #0 to PB #(n−1) constitute the complete media block (S216), and ends the GC processing in FIG. 19.

By the GC processing illustrated in FIG. 19, the GC control module 123 can protect the unreleased physical blocks in the complete media block (that is, the physical blocks constituting the incomplete media block) by using the final ECC and the ECC difference information, while performing the GC on the complete media block.

FIG. 20 is a flowchart illustrating an example of the procedure of GC write processing executed by the GC control module 123 in the controller 4 in the memory system 3 according to the first embodiment. The GC write processing corresponds to the procedure of S206 of the GC processing described above with reference to FIG. 19. In the GC write processing, the variable j illustrated in the GC processing is used.

The GC write processing is executed when valid data with the size of a WLSC excluding an ECC portion which is to be written to the GC destination block GCDst is accumulated in the GC buffer 32. In the following, valid data with the size of a WLSC excluding an ECC portion which is to be written to the GC destination block GCDst is referred to as GC write data.

The GC control module 123 generates an ECC corresponding to the GC write data with the ECC encoder 15 (S31). The GC control module 123 writes the GC write data and the ECC to the GC destination block GCDst #j (S32). The combined data of the GC write data and the ECC has a size equivalent to the size of a WLSC.

Next, the GC control module 123 determines whether or not data has been written up to the end of the GC destination block GCDst #j (S33). When data has been written up to the end of the GC destination block GCDst #j (S33 YES), the GC control module 123 updates the logical-to-physical address conversion table 35 so as to indicate the mapping between the physical address and the logical address of the GC write data (user data) written in the GC destination block GCDst #j (S34). The GC control module 123 adds one to the variable j (S35). Then, the GC control module 123 supplies a new GC destination block GCDst #j (S36) and ends the GC write processing (end).

When data is not written up to the end of the GC destination block GCDst #j (S33 NO), the GC control module 123 ends the GC write processing (end).

By the GC write processing described above, the GC control module 123 can write the GC write data to the GC destination block.

Figure 21:
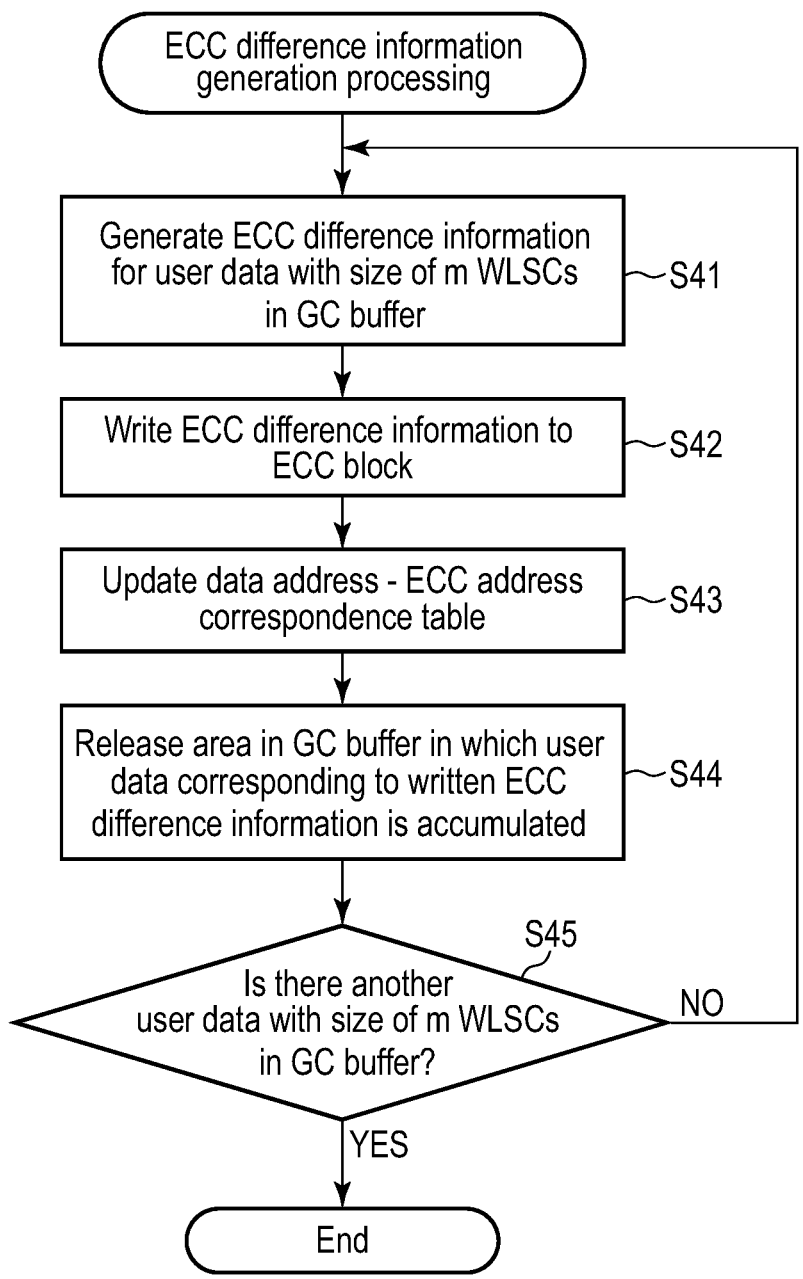
FIG. 21 is a flowchart illustrating an example of the procedure of ECC difference information generation processing executed by the GC control module in the controller in the memory system of the first embodiment.

FIG. 21 is a flowchart illustrating an example of the procedure of ECC difference information generation processing executed by the GC control module 123 in the controller 4 in the memory system 3 according to the first embodiment. The ECC difference information generation processing corresponds to the procedure of S207 of the GC processing described above with reference to FIG. 19. As described above with reference to the flowchart of FIG. 19, user data stored in the physical block PB #i in the complete media block is copied to the GC buffer 32 before the ECC difference information generation processing is started.

The GC control module 123 encodes each of m user data portions with the size of m WLSCs in the GC buffer 32 with the ECC encoder 15, thereby generating ECC difference information (S41). Note that m is an integer greater than one. The ECC difference information corresponding to the user data with the size of m WLSCs has, for example, a size of the write unit for the ECC block 67.

The GC control module 123 writes the generated ECC difference information to the ECC block (S42). The GC control module 123 updates the data address-ECC address correspondence table 37 so as to indicate the correspondence between the physical address of the user data stored in the physical block PB #i and the physical address of the ECC difference information written in the ECC block (S43). Then, the GC control module 123 releases an area in the GC buffer 32 in which the user data corresponding to the written ECC difference information is accumulated (S44).

Next, the GC control module 123 determines whether or not another user data with the size of m WLSCs is accumulated in the GC buffer 32 (S45). When another user data with the size of m WLSCs is accumulated in the GC buffer 32 (S45 YES), the GC control module 123 proceeds to the procedure of S41 so as to generate ECC difference information for the other user data. When another user data with the size of m WLSCs is not accumulated in the GC buffer 32 (S45 NO), the GC control module 123 ends the ECC difference information generation processing (end).

By the ECC difference information generation processing illustrated in FIG. 21, the GC control module 123 can generate the ECC difference information for all the user data copied from the physical block PB #i to the GC buffer 32 and write the ECC difference information to the ECC block 67. Therefore, when the physical block PB #i is released by performing GC on the physical block PB #i, user data stored in a physical block that has not been released yet and constitutes the complete media block that included the physical block PB #i (that is, an unreleased physical block that constitutes an incomplete media block) can be protected by using the final ECC and the ECC difference information.

Figure 22:
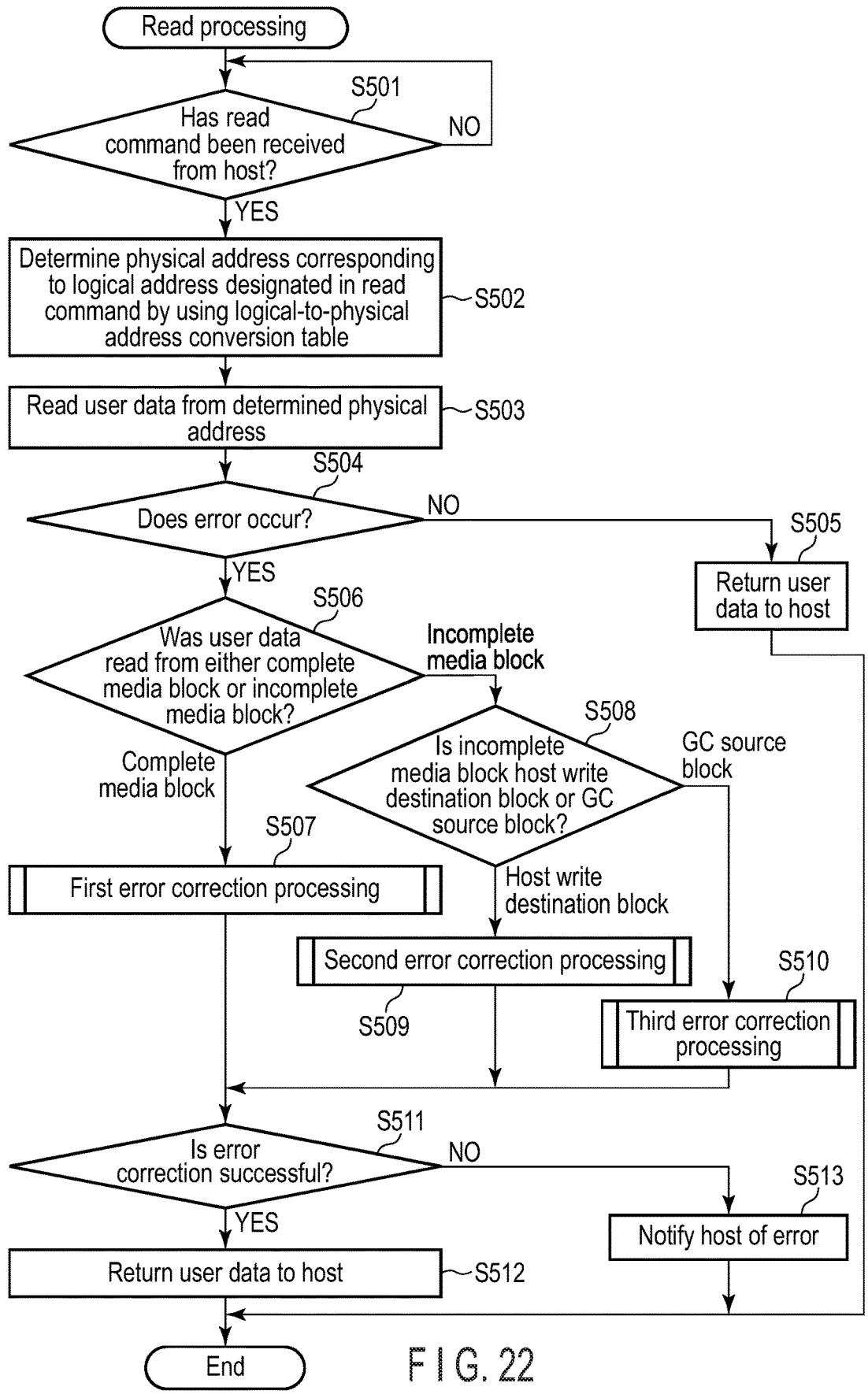
FIG. 22 is a flowchart illustrating an example of the procedure of read processing executed by a read control module and an error correction processing module in the controller in the memory system of the first embodiment.

FIG. 22 is a flowchart illustrating an example of the procedure of read processing executed by the read control module 121 and the error correction processing module 124 in the controller 4 in the memory system 3 according to the first embodiment. Here, the read processing performed in accordance with receiving a read command from the host 2 is illustrated, but the same read processing is also performed in an internal operation of the memory system 3 (for example, a GC operation).

The read control module 121 determines whether or not a read command has been received from the host 2 (S501). When no read command is received from the host 2 (S501 NO), the read control module 121 returns to the procedure of S501.

When a read command has been received from the host 2 (S501 YES), the read control module 121 determines a physical address corresponding to a logical address designated in the read command by using the logical-to-physical address conversion table 35 (S502). The read control module 121 reads user data from the determined physical address in the nonvolatile memory 5 (S503).

The read control module 121 determines whether or not an error occurs in the read user data (S504). The read control module 121 can detect an error that occurs in the read user data by using an intra-page ECC included in the user data. In addition, the read user data may be user data of the first protection unit, or may be a portion thereof. When no error occurs in the read user data (S504 NO), the read control module 121 returns the user data to the host 2 (S505) and ends the read processing (end).

When an error occurs in the read user data (S504 YES), the error correction processing module 124 determines whether the user data was read from either the complete media block or the incomplete media block (S506). Specifically, the error correction processing module 124 uses the media block management table 36 to acquire an entry including identification information of the physical block from which the user data was read. When the entry indicates identification information of a specific number of unreleased physical blocks (for example, n unreleased physical blocks), the error correction processing module 124 determines that the user data was read from the complete media block.

On the other hand, when the entry indicates identification information of unreleased physical blocks that are less than the specific number, the error correction processing module 124 determines that the user data was read from the incomplete media block. Alternatively, when the entry indicates, for example, identification information of at least one released physical block, the error correction processing module 124 can determine that the user data was read from the incomplete media block.

When the user data was read from the complete media block (S506 complete media block), the error correction processing module 124 executes first error correction processing (S507), and proceeds to the procedure of 3511. In the first error correction processing, error correction for an ECC frame of the second size including the user data in which the error occurs is performed using a final ECC. The detailed procedure of the first error correction processing will be described later with reference to the flowchart of FIG. 23.

When the user data was read from the incomplete media block (S506 incomplete media block), the error correction processing module 124 determines whether the incomplete media block is a host write destination block or a GC source block (S508). Specifically, the error correction processing module 124 acquires an entry including identification information of the physical block from which the user data was read, by using the media block management table 36. The entry may be the entry acquired in S506. When the entry indicates identification information of at least one released physical block, the error correction processing module 124 can determine that the user data was read from a GC source block. When the entry does not indicate any identification information of a released physical block, that is, indicates only identification information of unreleased physical blocks, the error correction processing module 124 can determine that the user data was read from a host write destination block.

When the incomplete media block is a host write destination block (S508 host write destination block), the error correction processing module 124 executes second error correction processing (S509), and proceeds to the procedure of S511. In the second error correction processing, error correction for an ECC frame of the first size including the user data in which the error occurs is performed using an intermediate ECC. The detailed procedure of the second error correction processing will be described later with reference to the flowchart of FIG. 24.

When the incomplete media block is a GC source block (S508 GC source block), the error correction processing module 124 executes third error correction processing (S510), and proceeds to the procedure of S511. In the third error correction processing, error correction on user data in at least one unreleased physical block is performed by using an intermediate ECC obtained by subtracting ECC difference information from a final ECC. The at least one unreleased physical block constitutes an ECC frame of the second size which includes the user data in which the error occurred. The detailed procedure of the third error correction processing will be described later with reference to the flowchart of FIG. 25.

The error correction processing module 124 determines whether or not the error correction in the procedure of S507, S508, or S509 is successful (S511). When the error correction is successful (S511 YES), the error correction processing module 124 returns the error-corrected user data to the host 2 (S512), and ends the read processing (end). When the error correction is not successful (S511 NO), the error correction processing module 124 notifies the host 2 of the error (S513) and ends the read processing (end).

By the read processing illustrated in FIG. 22, the read control module 121 and the error correction processing module 124 can return the user data corresponding to the read command to the host 2, or notify the host 2 that an error occurred in the processing according to the read command. When an error occurs in the read user data, the error correction processing module 124 can execute the error correction processing for correcting the error. Likewise, when an error occurs in data read during GC processing by the GC control module 123, the error correction processing module 124 can execute the error correction processing for correcting the error in the read data.

Figure 23:
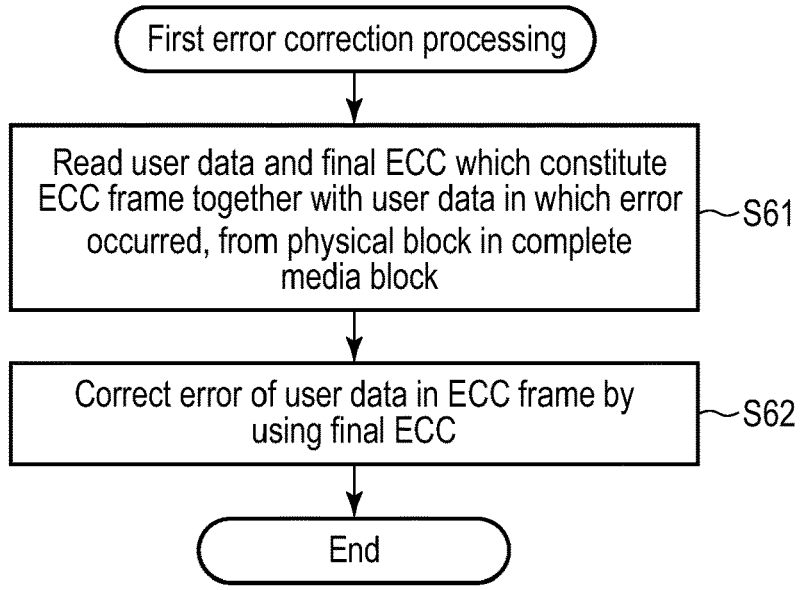
FIG. 23 is a flowchart illustrating an example of the procedure of first error correction processing executed by the error correction processing module in the controller in the memory system of the first embodiment.

FIG. 23 is a flowchart illustrating an example of the procedure of first error correction processing executed by the error correction processing module 124 in the controller 4 in the memory system 3 according to the first embodiment. The first error correction processing is processing executed when user data in which an error occurred during reading is stored in a complete media block.

The error correction processing module 124 reads user data and a final ECC constituting an ECC frame of the second size together with the user data in which the error occurred, from physical blocks in the complete media block (S61). The error correction processing module 124 performs error correction on the user data constituting the ECC frame of the second size using the final ECC (S62), and ends the first error correction processing (end).

By the first error correction processing illustrated in FIG. 23, the error correction processing module 124 can perform the error correction of the user data stored in the complete media block.

Figure 24:
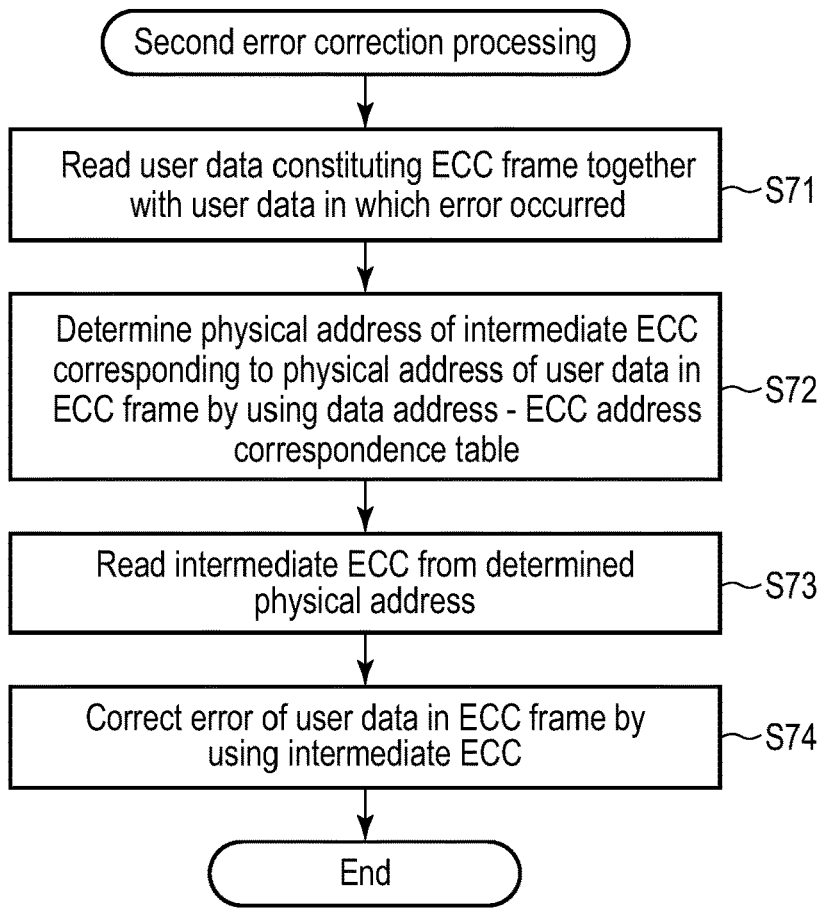
FIG. 24 is a flowchart illustrating an example of the procedure of second error correction processing executed by the error correction processing module in the controller in the memory system of the first embodiment.

FIG. 24 is a flowchart illustrating an example of the procedure of second error correction processing executed by the error correction processing module 124 in the controller 4 in the memory system 3 according to the first embodiment. The second error correction processing is executed when user data in which an error occurred during reading is stored in an incomplete media block used as a host write destination block.

The error correction processing module 124 reads user data constituting an ECC frame of the first size together with the user data in which the error occurred, from a physical block in the incomplete media block (S71). The error correction processing module 124 determines a physical address of an intermediate ECC corresponding to the physical address of the user data constituting the ECC frame of the first size by using the data address-ECC address correspondence table 37 (S72).

Next, the error correction processing module 124 reads the intermediate ECC from the determined physical address of the intermediate ECC (S73). The error correction processing module 124 corrects the error of the user data constituting the ECC frame of the first size by using the read intermediate ECC (S74).

By the second error correction processing illustrated in FIG. 24, the error correction processing module 124 can perform the error correction of the user data stored in the incomplete media block used as the host write destination block.

Figure 25:
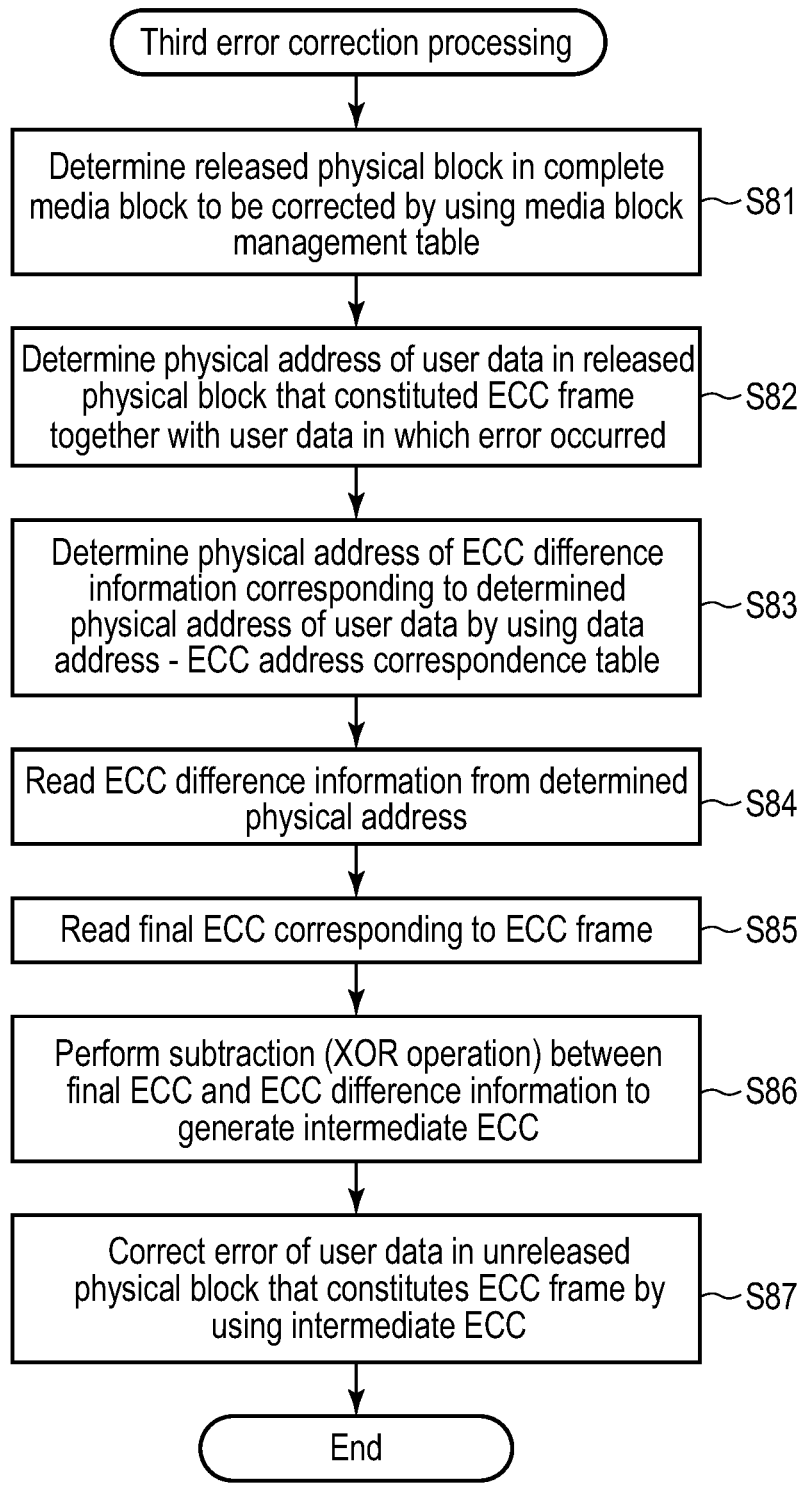
FIG. 25 is a flowchart illustrating an example of the procedure of third error correction processing executed by the error correction processing module in the controller in the memory system of the first embodiment.

FIG. 25 is a flowchart illustrating an example of the procedure of third error correction processing executed by the error correction processing module 124 in the controller 4 in the memory system 3 according to the first embodiment. The third error correction processing is executed when user data in which an error occurred during reading is stored in an incomplete media block used as a GC source block. When at least one of physical blocks that constitute a complete media block has become a released physical block, unreleased physical blocks in the complete media block constitute the incomplete media block. That is, the user data in which the error occurred is stored in one of the unreleased physical blocks in the complete media block.

The error correction processing module 124 determines a complete media block including a physical block that stores user data in which an error occurred (hereinafter, referred to as a complete media block to be corrected) and determines at least one released physical blocks in the complete media block to be corrected, by using the media block management table 36 (S81). The determined released physical block is a physical block that stored user data that constitutes the ECC frame of the second size together with the user data in which the error occurred before the release. The error correction processing module 124 determines a physical address of the user data in the released physical block that constitutes the ECC frame of the second size together with the user data in which the error occurred (S82).

The error correction processing module 124 determines a physical address of ECC difference information corresponding to the determined physical address of the user data by using the data address-ECC address correspondence table 37 (S83). The error correction processing module 124 reads the ECC difference information from the determined physical address (S84). In addition, the error correction processing module 124 reads a final ECC corresponding to the ECC frame of the second size (S85). The final ECC is stored in the unreleased physical block in the complete media block to be corrected (more specifically, the physical block to be released at the last in the complete media block).

The error correction processing module 124 performs subtraction (that is, XOR operation) between the final ECC and the ECC difference information, thereby calculating an intermediate ECC (S86). Then, the error correction processing module 124 performs error correction for the user data in the unreleased physical block that constitutes the ECC frame of the second size by using the intermediate ECC (S87).

By the third error correction processing illustrated in FIG. 25, the error correction processing module 124 can perform the error correction for the user data stored in the incomplete media block that is used as the GC source block.

As described above, according to the first embodiment, it is possible to reduce the number of physical blocks to be secured as a write destination while maintaining ECC that can cope with a defect of physical blocks. The controller 4 generates a first ECC that constitutes an ECC frame of a first size together with a data portion of a first protection unit to be written into the nonvolatile memory 5 by encoding the data portion of the first protection unit, writes the data portion of the first protection unit into the nonvolatile memory 5, and writes the first ECC into the nonvolatile memory 5 or stores the first ECC in the RAM such as the DRAM 6. When the controller 4 writes n−1 data portions of the first protection unit that are included in n−1 ECC frames of the first size, respectively, in the nonvolatile memory 5, the controller 4 generates a second ECC that constitutes an ECC frame of the second size together with the n−1 data portions of the first protection unit and a second data portion to be written into the nonvolatile memory 5 by encoding the n−1 data portions of the first protection unit and the second data portion, and writes the second data portion and the second ECC into the nonvolatile memory 5. Then, the controller 4 sets each of n−1 ECCs that are included in the n−1 ECC frames of the first size, respectively, and are stored in the nonvolatile memory 5 or the RAM such as the DRAM 6, in an invalid state. Note that n is an integer greater than one.

As a result, the controller 4 can protect the data portion of the first protection unit with the ECC frame of the first size. Since the data portion of the first protection unit is protected with the ECC frame of the first size, the controller 4 does not need to collectively secure areas in the nonvolatile memory 5 for writing the n−1 data portions of the first protection unit and the second data portion that are protected with the ECC frame of the second size (for example, multiple physical blocks).

Further, when the n−1 data portions of the first protection unit that are included in the n−1 ECC frames of the first size, respectively, have been written in the nonvolatile memory 5, the controller 4 can protect the n−1 data portions of the first protection unit and the second data portion with the ECC frame of the second size. When the n−1 data portions of the first protection unit and the second data portion are protected with the ECC frame of the second size, the controller 4 discards the ECCs constituting the ECC frames of the first size.

Therefore, the controller 4 can reduce the number of physical blocks to be secured as the write destination while maintaining the ECCs that can cope with the defect of the physical blocks. In addition, even if a power supply interruption or a program status fail (PSF) occurs during a host write operation or a GC operation, since the controller 4 may restore data not in units of complete media block but in units of physical block, a restoration speed is improved.

Second Embodiment

In the first embodiment, a complete media block functions as a unit protected by a final ECC. On the other hand, in a second embodiment, logical WLSCs function as a unit protected by a final ECC.

In addition, in the first embodiment, an incomplete media block functions as a unit protected by an intermediate ECC. On the other hand, in the second embodiment, a logical WLSC functions as a unit protected by an intermediate ECC.

The configuration of a memory system 3 according to the second embodiment is the same as that of the memory system 3 of the first embodiment, and the second embodiment is different from the first embodiment only in the configuration for protecting logical WLSCs by a final ECC and protecting a logical WLSC by an intermediate ECC. Hereinafter, the points different from the first embodiment will be mainly described.

FIG. 26 is a block diagram illustrating a configuration example of an information processing system including the memory system 3 according to the second embodiment. In the memory system 3 of the second embodiment, the media block management table 36 used in the memory system 3 of the first embodiment is replaced with a logical block management table 38. The logical block management table 38 manages multiple logical blocks. The logical block management table 38 is stored in, for example, a storage area of the DRAM 6.

One logical block includes multiple physical blocks (that is, a set of physical blocks). In addition, the logical block includes multiple logical storage areas. A logical storage area corresponds to a data unit that is able to be written in a parallel write operation (for example, a logical WLSC). More specifically, the multiple physical blocks correspond to a physical storage area. Storage areas are obtained by dividing the physical storage area into units each of which is able to be written in a parallel write operation. One of the storage areas corresponds to one logical storage area.

FIG. 27 illustrates a configuration example of a logical block managed in the memory system 3 according to the second embodiment. Here, a case where one logical block 9 includes x physical blocks and includes y logical storage areas will be exemplified. x is an integer of two or more. y is an integer of two or more.

In the example illustrated in FIG. 27, x columns 91 indicate storage areas of the x physical blocks, respectively. y rows 92 indicate the y logical storage areas, respectively. In addition, each of cells 93 indicates a storage area in WLSC unit.

Each of the y logical storage areas is an area in which data is able to be written in one parallel write operation. That is, each of the y logical storage areas corresponds to a logical WLSC. In addition, one logical storage area is composed of x storage areas in units of WLSC (that is, x cells 93) that are included in the x physical blocks, respectively.

The controller 4 may write data using one logical block as a write destination logical block. The controller 4 may write data with the size of a logical WLSC into the write destination logical block in one parallel write operation. More specifically, the controller 4 may write, in parallel, data portions each having the size of a WLSC into the physical blocks in the write destination logical block, respectively, in one parallel write operation.

The controller 4 performs writing to the write destination logical block, for example, in order from the beginning of the logical block and in units of logical WLSC. In the following, each of the y logical storage areas will be referred to as logical WLSCm according to the order of writing. m is the ID of a logical WLSC. m is, for example, any value from 0 to (y−1). Note that the controller 4 may write, in parallel, at least one data portion in WLSC unit which is smaller than a logical WLSC, into the logical block.

In addition, the controller 4 performs read verification (RV) on the written data. The read verification is an operation for verifying integrity of the data written in the nonvolatile memory 5.

The read verification performed by the controller 4 will be described. After writing data into the nonvolatile memory 5, the controller 4 reads the written data from the nonvolatile memory 5. Then, the controller 4 performs error correction on the read data by using an intra-page ECC included in the read data. The intra-page ECC is, for example, a BCH code or an LDPC code. When the error correction is successful, the controller 4 determines that the integrity of the written data has been confirmed. When the error correction is not successful, the controller 4 determines that the integrity of the written data is not confirmed.

FIG. 28 illustrates a configuration example of the logical block management table 38 used in the memory system 3 according to the second embodiment. The logical block management table 38 may include entries that correspond to logical blocks, respectively.

Each of the entries in the logical block management table 38 includes a block ID field, a writing field, an RV completed logical WLSC ID field, and a logical WLSC ID to be next written field.

The block ID field indicates identification information assigned to the corresponding logical block.

The writing field indicates whether the corresponding logical block is currently allocated as a write destination logical block to which user data is to be written. For example, when "Yes" is set in the writing field, the corresponding logical block is currently allocated as the write destination logical block of user data. On the other hand, when "No" is set in the writing field, the corresponding logical block is not currently allocated as the write destination logical block of user data.

The RV completed logical WLSC ID field indicates the ID of the last logical WLSC among the logical WLSCs for which the read verification have been completed in the corresponding logical block. That is, in the corresponding logical block, the read verification for the logical WLSCs from the 0-th to the ID indicated in the RV completed logical WLSC ID field is completed.

The logical WLSC ID to be next written field indicates the ID of the logical WLSC to which data is to be next written in the corresponding logical block. A value is set in the logical WLSC ID to be next written field of the corresponding logical block during write (i.e., when "Yes" is set in the writing field).

The logical block management table 38 illustrated in FIG. 28 indicates that the logical block having block ID of 1 and the logical block having block ID of 2 are not logical blocks during write. In addition, the logical block management table 38 indicates that the logical block having block ID of 3 is a logical block during write. In the logical block having the block ID of 3, the last logical WLSC for which the read verification has been completed is the logical WLSC having the logical WLSC ID of 14. In the logical block having the block ID of 3, the logical WLSC to which data is to be next written is the logical WLSC having the logical WLSC ID of 16.

Recently, the size of one physical block is increasing, and the total number of physical blocks in the memory system 3 is decreasing. Along with this, a ratio of the number of physical blocks used for storing system data to the total number of physical blocks in the memory system 3 is increasing. In the memory system 3, the increase in the ratio of the number of physical blocks used for storing system data to the number of physical blocks used for storing user data causes deterioration in the cost of the memory system 3. Therefore, it is necessary to realize a new function for reducing the number (or ratio) of physical blocks used for storing system data.

Figure 29:
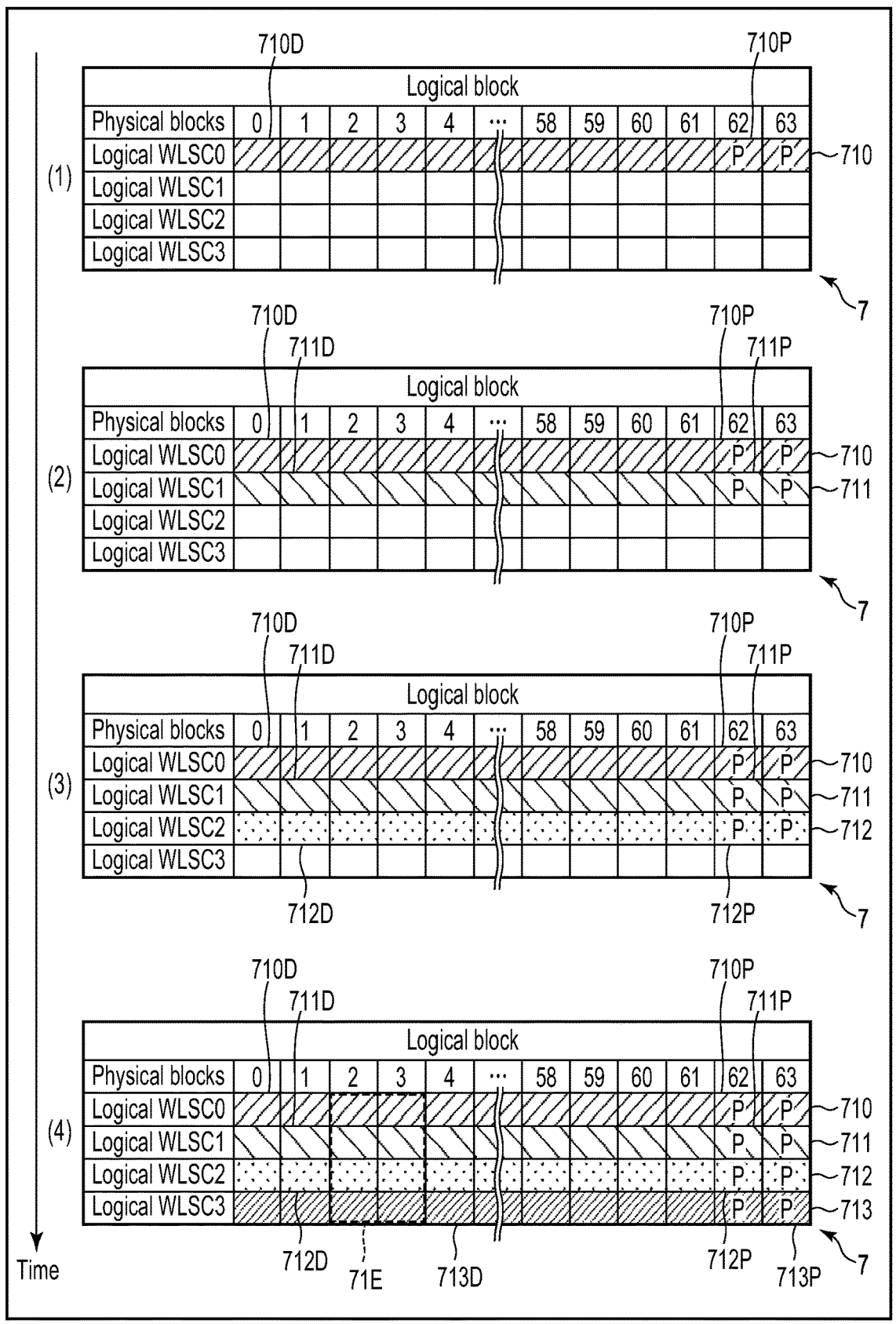
FIG. 29 is a diagram illustrating an example of a write operation in a memory system according to a comparative example.

FIG. 29 is a diagram illustrating an example of a write operation in a memory system according to a comparative example. A controller of the memory system according to the comparative example supplies a logical block 7 as a write destination block for user data and ECC. Here, a case where the logical block 7 is composed of 64 physical blocks and includes four logical WLSCs is exemplified. Note that the logical block 7 may be composed of any number of physical blocks of two or more. In addition, the logical block 7 may include any number of logical WLSCs of two or more.

In addition, here, data of one logical WLSC constitutes an ECC frame. That is, the data of one logical WLSC is composed of user data and an ECC. The user data has a size obtained by subtracting the ECC from one logical WLSC. The size of the ECC is equivalent to the size of two WLSCs.

Hereinafter, a specific example of the write operation will be described in chronological order.

(1) The controller writes a data portion 710 of the logical WLSC unit into a logical WLSC0 of the logical block 7. The data portion 710 of the logical WLSC unit is composed of a user data portion 710D and an ECC 710P. The user data portion 710D is at least part of user data that is accumulated in a WB and is to be written. The ECC 710P is an ECC of the user data portion 710D. That is, the user data portion 710D and the ECC 710P form an ECC frame. Therefore, when an error occurs in reading the user data portion 710D, the controller can perform error correction processing by using a reading result of the user data portion 710D and a reading result of the ECC 710P.

(2) The controller writes a data portion 711 of the logical WLSC unit to a logical WLSC1 of the logical block 7. The data portion 711 of the logical WLSC unit is composed of a user data portion 711D and an ECC 711P. The user data portion 711D is at least part of the user data that is accumulated in the WB and is to be written. The ECC 711P is an ECC of the user data portion 711D. That is, the user data portion 711D and the ECC 711P form an ECC frame. Therefore, when an error occurs in reading the user data portion 711D, the controller can perform error correction processing by using a reading result of the user data portion 711D and a reading result of the ECC 711P.

(3) The controller writes a data portion 712 of the logical WLSC unit to a logical WLSC2 of the logical block 7. The data portion 712 of the logical WLSC unit is composed of a user data portion 712D and an ECC 712P. The user data portion 712D is at least part of the user data that is accumulated in the WB and is to be written. The ECC 712P is an ECC of the user data portion 712D. That is, the user data portion 712D and the ECC 712P form an ECC frame. Therefore, when an error occurs in reading the user data portion 712D, the controller can perform error correction processing by using a reading result of the user data portion 712D and a reading result of the ECC 712P.

(4) The controller writes a data portion 713 of the logical WLSC unit to a logical WLSC3 of the logical block 7. The data portion 713 of the logical WLSC unit is composed of a user data portion 713D and an ECC 713P. The user data portion 713D is at least part of the user data that is accumulated in the WB and is to be written. The ECC 713P is an ECC of the user data portion 713D. That is, the user data portion 713D and the ECC 713P form an ECC frame.

Therefore, when an error occurs in reading the user data portion 713D, the controller can perform error correction processing by using a reading result of the user data portion 713D and a reading result of the ECC 713P.

As illustrated in (1) to (4) above, in the memory system according to the comparative example, each of the data portions 710, 711, 712, and 713 of the logical WLSC unit corresponds to an ECC frame. For example, even if an error (burst error) occurs in a user data portion 71E with the size of two WLSCs in each of the data portions 710, 711, 712, and 713 of the logical WLSC unit, the controller can correct the error by using the read result of the data portions 710, 711, 712, and 713 that include the ECCs 710P, 711P, 712P, and 713P, respectively.

When the write operation from (1) to (4) is completed, the user data portions with the size of 248 WLSCs and the ECCs with the size of eight WLSCs have been written in the nonvolatile memory 5. In this case, a coding ratio is 0.96 (=248/(248+8)). The coding ratio indicates the ratio of user data to data written in the nonvolatile memory 5. A maximum value of the coding ratio is one. It can be said that the higher the coding ratio, the better the writing efficiency of user data.

In order to increase the coding ratio, it is necessary to reduce the ratio of ECCs to the written data. However, if the ECC ratio is reduced, there is a high possibility that an error occurring in data read from the nonvolatile memory 5 cannot be relieved.

Therefore, in the memory system 3 according to the second embodiment, on the basis of different characteristics of errors that occur between data being written and data that has been written, the data being written and the data that has been written are protected by ECCs with different relief capabilities, respectively. The data being written is data from the time when the data is written to the nonvolatile memory 5 to the time before the integrity is confirmed with read verification. The data that has been written is data whose integrity has been confirmed with the read verification.

The characteristics related to the occurrence of burst error differ between the data being written and the data that has been written. The burst error is an error that occurs intensively on data in a specific storage area. Specifically, the burst error is likely to occur in the data being written. The burst error is unlikely to occur in the data that has been written.

On the basis of the characteristics related to the occurrence of burst error, the memory system 3 protects user data being written by an ECC having high relief capability and protects user data that has been written by an ECC having low relief capability. The ECC that protects user data being written is called an intermediate ECC. The ECC that protects user data that has been written is called a final ECC. For example, an RS code or an XOR parity is used as the intermediate ECC and the final ECC.

The intermediate ECC constitutes an ECC frame of a first size (that is, a first frame length) together with user data of a first protection unit. That is, the user data of the first protection unit is protected by the corresponding intermediate ECC. The size of the first protection unit is equivalent to, for example, the size of a logical WLSC.

The intermediate ECC is invalidated when writing of the corresponding user data of the first protection unit is completed. That is, the intermediate ECC protects the corresponding user data of the first protection unit from the time the user data is written into the nonvolatile memory 5 until the integrity of the user data is confirmed with read verification. The intermediate ECC is invalidated when the integrity of the corresponding user data of the first protection unit is confirmed. Therefore, the intermediate ECC is data that is temporarily stored.

Note that the completion of writing the user data of the first protection unit mean not only that the integrity of the user data of the first protection unit is confirmed with read verification, but also that the user data of the first protection unit is less likely to be destroyed. More specifically, the completion of writing the user data of the first protection unit corresponds to, for example, that the writing proceeds from a word line in which the user data of the first protection unit is written to two word lines ahead, or writing to all the word lines in the logical block including the word line in which the user data of the first protection unit is written.

In addition, the read verification for the user data of the first protection unit is performed, for example, several word lines later than the writing of the user data of the first protection unit. That is, when writing proceeds from the word line in which the user data of the first protection unit is written to several word lines ahead, the read verification is performed for the user data of the first protection unit. Alternatively, the read verification for the user data of the first protection unit is performed, for example, after writing of the logical block in which the user data of the first protection unit is written is completed. That is, when writing is performed to all the word lines in the logical block including the word line in which the user data of the first protection unit is written, the read verification is performed for the user data of the first protection unit.

In a case where the read verification is performed, the intermediate ECC protects the corresponding user data of the first protection unit from the time the user data is written into the nonvolatile memory 5 until the read verification for the user data is correctly completed (that is, until the read verification confirms the integrity of the user data). The intermediate ECC is invalidated when the read verification for the corresponding user data of the first protection unit is correctly completed.

In a case where the read verification is not performed, the intermediate ECC protects the corresponding user data of the first protection unit after the user data of the first protection unit is written into the nonvolatile memory 5 until the user data of the first protection unit is less likely to be destroyed. The intermediate ECC is invalidated when the user data of the first protection unit is less likely to be destroyed.

When the user data is protected by the intermediate ECC with high relief capability, the coding ratio decreases. However, the intermediate ECC is invalidated upon confirmation of the integrity of the corresponding data. Therefore, the decrease in the coding ratio due to writing the intermediate ECC to the nonvolatile memory 5 is temporary.

The final ECC constitutes an ECC frame of a second size (that is, a second frame length) together with user data of a second protection unit. That is, the user data of the second protection unit is protected by the corresponding final ECC. The second protection unit is larger than the first protection unit. The user data of the second protection unit includes at least one user data of the first protection unit. The second size is larger than the first size. The second size is equivalent to, for example, the size of n logical WLSCs. n is an integer of two or more.

The data length of a final ECC is, for example, equal to the data length of an intermediate ECC. In addition, the data length of user data of the second protection unit protected by a final ECC is longer than the data length of user data of the first protection unit protected by an intermediate ECC.

Therefore, it can be said that the relief capability of the final ECC is lower than the relief capability of the intermediate ECC.

The final ECC protects the corresponding user data from the time the integrity of the user data is confirmed to the time the user data is invalidated. That is, the final ECC is data that may be stored permanently (for long periods).

When the user data is protected by the final ECC with low relief capability, the coding ratio is improved. Therefore, a constant coding ratio in the nonvolatile memory 5 can be improved.

In addition, it is unlikely that a burst error will occur in the user data after the writing is completed. Therefore, even when the user data is protected by the final ECC with low relief capability, the specifications regarding an early failure rate (EFR) or a failure rate (for example, defective parts per million: DPPM) of the memory system 3 can be satisfied.

In this way, in the memory system 3, the user data being written is protected by the intermediate ECC, and the user data that has been written is protected by the final ECC, so that it is possible to improve the constant coding ratio in the nonvolatile memory 5 while appropriately protecting the user data.

Figure 30:
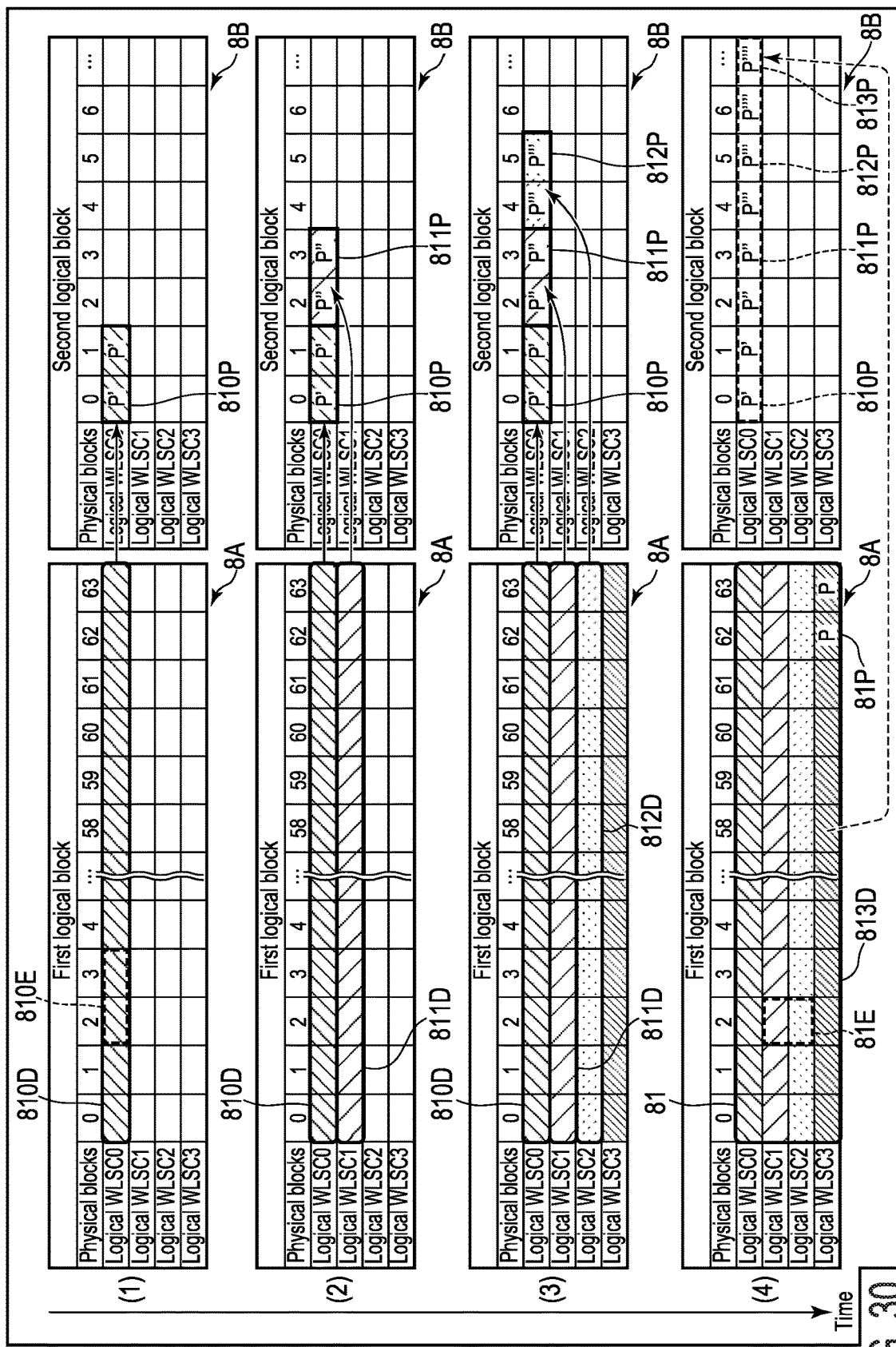
FIG. 30 is a diagram illustrating an example of a write operation in the memory system according to the second embodiment.

FIG. 30 illustrates an example of a write operation in the memory system 3 according to the second embodiment. In the example illustrated in FIG. 30, the controller 4 of the memory system 3 supplies a logical block 8A as a write destination logical block of user data and final ECCs. The controller 4 supplies another logical block 8B as a write destination block of intermediate ECCs. Note that the controller 4 may supply a physical block as the write destination block of intermediate ECCs.

Here, a case where each of the logical blocks 8A and 8B includes 64 physical blocks and includes four logical WLSCs is exemplified. Hereinafter, the logical block 8A is also referred to as a first logical block 8A. The logical block 8B is also referred to as a second logical block 8B.

In addition, here, the size of user data of the first protection unit is equivalent to the size of one logical WLSC. The size of an intermediate ECC is equivalent to the size of two WLSCs. Therefore, the user data of one logical WLSC and the intermediate ECC of two WLSCs constitute an ECC frame of the first size.

User data of the second protection unit has a size obtained by subtracting a final ECC portion from four logical WLSCs. The size of a final ECC is equivalent to the size of two WLSCs. That is, data with the size of four logical WLSCs which includes the user data and the final ECC constitutes an ECC frame of the second size. In other words, the data of four logical WLSCs functions as a unit protected by the final ECC.

The data sizes of the user data of the first protection unit, the user data of the second protection unit, the intermediate ECC, and the final ECC are examples. Each data size may be freely set according to, for example, the specifications of the nonvolatile memory 5.

Hereinafter, a specific example of the write operation will be described in chronological order.

(1) The controller 4 writes a user data portion 810D of the logical WLSC unit into a logical WLSC0 of the first logical block 8A. The user data portion 810D is at least part of user data that is accumulated in the WB 31 and is to be written. In addition, the controller 4 writes an intermediate ECC 810P into a logical WLSC0 of the second logical block 8B. The intermediate ECC 810P is an ECC of the user data portion 810D. That is, the user data portion 810D and the intermediate ECC 810P form an ECC frame. Therefore, when an error occurs in reading the user data portion 810D, the controller 4 can perform error correction processing by using a reading result of the user data portion 810D and a reading result of the intermediate ECC 810P.

(2) The controller 4 writes a user data portion 811D of the logical WLSC unit into a logical WLSC1 of the first logical block 8A. The user data portion 811D is at least part of the user data that is accumulated in the WB 31 and is to be written. In addition, the controller 4 writes an intermediate ECC 811P into the logical WLSC0 of the second logical block 8B. The intermediate ECC 811P is written in an area following the area in which the intermediate ECC 810P is stored in the logical WLSC0 of the second logical block 8B. The intermediate ECC 811P is an ECC of the user data portion 811D. That is, the user data portion 811D and the intermediate ECC 811P form an ECC frame. Therefore, when an error occurs in reading the user data portion 811D, the controller 4 can perform error correction processing by using a reading result of the user data portion 811D and a reading result of the intermediate ECC 811P.

(3) The controller 4 writes a user data portion 812D of the logical WLSC unit into a logical WLSC2 of the first logical block 8A. The user data portion 812D is at least part of the user data that is accumulated in the WB 31 and is to be written. In addition, the controller 4 writes an intermediate ECC 812P into the logical WLSC0 of the second logical block 8B. The intermediate ECC 812P is written in an area following the area in which the intermediate ECC 811P is stored in the logical WLSC0 of the second logical block 8B. The intermediate ECC 812P is an ECC of the user data portion 812D. That is, the user data portion 812D and the intermediate ECC 812P form an ECC frame. Therefore, when an error occurs in reading the user data portion 812D, the controller 4 can perform error correction processing by using a reading result of the user data portion 812D and a reading result of the intermediate ECC 812P.

(4) The controller 4 writes a user data portion 813D and a final ECC 81P into a logical WLSC3 of the first logical block 8A. The user data portion 813D is at least part of the user data that is accumulated in the WB 31 and is to be written. The user data portion 813D has a data size obtained by subtracting a final ECC portion from a logical WLSC. The final ECC 81P is an ECC of the user data portion 810D, the user data portion 811D, the user data portion 812D, and the user data portion 813D. That is, the user data portion 810D, the user data portion 811D, the user data portion 812D, the user data portion 813D, and the final ECC 81P form an ECC frame 81. Therefore, when an error occurs in reading the user data portion 810D, the user data portion 811D, the user data portion 812D, and the user data portion 813D, the controller 4 can perform error correction processing by using a reading result of the user data portion 810D, the user data portion 811D, the user data portion 812D, and the user data portion 813D, and a reading result of the final ECC 81P.

Note that the controller 4 may write an intermediate ECC 813P of the user data portion 813D into the logical WLSC0 of the second logical block 8B. The intermediate ECC 813P is written in an area following the area in which the intermediate ECC 812P is stored in the logical WLSC0 of the second logical block 8B. The user data portion 813D and the intermediate ECC 813P form an ECC frame. Therefore, when an error occurs in reading the user data portion 813D, the controller 4 can perform error correction processing by using a reading result of the user data portion 813D and a reading result of the intermediate ECC 813P. That is, the controller 4 may be configured to correct the user data portion 813D by using the intermediate ECC 813P, like other user data portions 810D, 811D, and 812D. As a result, the controller 4 can uniformly perform correction processing using the corresponding intermediate ECC for each of the user data portions.

In addition, the controller 4 confirms integrity of the data constituting the ECC frame 81 by read verification. When the controller 4 has confirmed the integrity of the data constituting the ECC frame 81, the controller 4 invalidates the intermediate ECC 810P, the intermediate ECC 811P, and the intermediate ECC 812P stored in the second logical block 8B. Note that when the intermediate ECC 813P of the user data portion 813D is stored in the second logical block 8B, the controller 4 also invalidates the intermediate ECC 813P. The user data portion 810D, the user data portion 811D, the user data portion 812D, and the user data portion 813D whose integrity has been confirmed (that is, the writing has been completed) are protected by the final ECC 81P.

As illustrated in (1) to (4) above, in the memory system 3, the user data portions 810D, 811D, and 812D of the logical WLSC unit being written are protected by the corresponding intermediate ECCs 810P, 811P, and 812P, respectively. For example, even if an error occurs in a user data portion 810E with the size of two WLSCs, the controller 4 can correct the error by using the reading result of the user data portion 810D and the reading result of the intermediate ECC 810P.

In addition, in the memory system 3, the user data portions 810D, 811D, 812D, and 813D that have been written are protected by the final ECC 81P. For example, even if an error occurs in a user data portion 81E with the size of two WLSCs, the controller 4 can correct the error by using the reading result of the user data portions 810D, 811D, 812D, and 813D, and the reading result of the final ECC 81P.

Note that when the first logical block 8A includes, for example, eight or more logical WLSCs, the controller 4 may repeat the operations (1) to (4) for each of the four logical WLSCs in the first logical block 8A.

In the memory system 3, user data being written which is prone to burst error is protected by an intermediate ECC with high relief capability. In the write operation from (1) to (3), the user data portions 810D, 811D, and 812D being written are protected by the corresponding intermediate ECCs 810P, 811P, and 812P, respectively. In this case, the user data portions 810D, 811D, and 812D with the size of 192 WLSCs and the intermediate ECCs 810P, 811P, and 812P with the size of six WLSCs have been written in the nonvolatile memory 5. Therefore, the coding ratio is 0.97 (=192/(192+6)). However, the intermediate ECCs 810P, 811P, and 812P are invalidated when the writing of the user data portions 810D, 811D, 812D, and 813D and the final ECC 81P is completed. Therefore, the decrease in the coding ratio due to writing the intermediate ECCs 810P, 811P, and 812P is temporary.

In addition, in the memory system 3, user data that has been written which is unlikely to cause a burst error is protected by a final ECC with low relief capability. When the write operation from (1) to (4) is completed, the user data portions 810D, 811D, 812D, and 813D with the size of 254 WLSCs and the final ECC 81P with the size of two WLSCs have been written in the nonvolatile memory 5. In this case, a coding ratio is 0.99 (=254/(254+2)). The user data portions 810D, 811D, 812D, and 813D and the final ECC 81P that have been written are likely to be stored for a long period of time. Therefore, a constant coding ratio in the nonvolatile memory 5 can be improved.

Therefore, the constant coding ratio in the nonvolatile memory 5 (0.99) is higher than the coding ratio in the memory system of the comparative example (0.96). Therefore, the memory system 3 can improve the writing efficiency of user data as compared with the memory system of the comparative example.

Next, an example in which the nonvolatile memory 5 is realized as a flash memory configured to store multiple bits per memory cell will be described.

An example of a flash memory configured to store multiple bits per memory cell includes a multi level cell (MLC or 4LC) flash memory configured to store 2-bit data per memory cell, a triple level cell (TLC or 8LC) flash memory configured to store 3-bit data per memory cell, and a quad level cell (QLC or 16LC) flash memory configured to store 4-bit data per memory cell.

In a case where the nonvolatile memory 5 is realized as an MLC flash memory, generally, two page data (lower page data and upper page data) is written in memory cells connected to a single word line. Thus, two bits can be written per memory cell. Any area in the MLC flash memory (for example, any one or more physical blocks) may be used as an area configured to store only one bit per memory cell (SLC area).

In a write operation to write data in an SLC area, only data for one page (one page data) is written in memory cells connected to a single word line. Thus, in each block used as an SLC area, only one bit may be written per memory cell as in each block within an SLC flash memory (SLC block). As a result, each block used as an SLC area function as an SLC block.

In a case where the nonvolatile memory 5 is a TLC flash memory, generally, three page data (lower page data, middle page data and upper page data) is written in memory cells connected to a single word line. Thus, three bits may be written per memory cell. Any area in the TLC flash memory (for example, any one or more blocks) may be used as the above-described SLC area, or an MLC area configured to store two bits per memory cell. Note that each of the SLC and MLC areas may be set by a unit smaller than a block (for example, unit of word line, unit of word lines in a block). In the MLC area, only data of two pages is written in memory cells connected to a single word line. Thus, in the MLC area, only two bits may be written per memory cell.

In a case where the nonvolatile memory 5 is realized as a QLC flash memory, generally, four page data is written in memory cells connected to a single word line. Thus, four bits may be written per memory cell. Any area (for example, any one or more blocks) in the QLC flash memory may be used as the above-described SLC area, or may be used as the above-described MLC area, or may be used as a TLC area configured to store three bits per memory cell. Note that each of the SLC, MLC, and TLS areas may be set by a unit smaller than a block (for example, unit of word line, unit of word lines in a block). In the TLC area, only data of three pages is written in memory cells connected to a single word line. Thus, in the TLC area, only three bits may be written per memory cell.

Note that the nonvolatile memory 5 may be configured to store five or more bits per memory cell. In that case, any area in the nonvolatile memory 5 may be used as an area in which data of four or less bits are written per memory cell.

In addition, the nonvolatile memory 5 may include multiple nonvolatile memory chips (for example, multiple NAND flash memory dies). Each of the nonvolatile memory chips may be realized as a flash memory configured to store multiple bits per memory cell.

FIG. 31 illustrates the characteristics of write modes used in the memory system 3 of the second embodiment. The controller 4 may perform a write operation on the nonvolatile memory 5 in, for example, any of an SLC mode, an MLC mode, a TLC mode, and a QLC mode. The SLC mode is a mode in which one bit is written per memory cell. The MLC mode is a mode in which two bits are written per memory cell. The TLC mode is a mode in which three bits are written per memory cell. The QLC mode is a mode in which four bits are written per memory cell.

A data density per memory cell in the SLC mode is two values (one page). A data density per memory cell in the MLC mode is four values (two pages). A data density per memory cell in the TLC mode is eight values (three pages). A data density per memory cell in the QLC mode is 16 values (four pages).

A data read speed and a data write speed of the nonvolatile memory 5 is slower as the data density is higher, and faster as the data density is lower. Thus, in these four modes, the data read and write speeds in the QLC mode are slowest. In addition, the data read and write speeds in the SLC mode are fastest.

The controller 4 writes user data and a final ECC into the first logical block 8A (more specifically, the physical blocks constituting the first logical block 8A) in, for example, the MLC mode, the TLC mode or the QLC mode. In addition, the controller 4 writes intermediate ECCs into the second logical block 8B (more specifically, the physical block constituting the second logical block 8B) in the SLC mode. By writing the intermediate ECCs in the SLC mode in which the writing speed is high, the write performance of the memory system of the comparative example and the write performance of the memory system 3 of the second embodiment can be made substantially the same. That is, the influence on the write performance by writing the intermediate ECCs to the second logical block 8B can be reduced.

Note that the controller 4 may write the intermediate ECCs into the second logical block 8B in the MLC mode, the TLC mode, or the QLC mode. In this case, there is a merit that WAF is lowered on the premise that each logical block is wear-leveled in accordance with the purpose of storing user data and storing intermediate ECCs.

Figure 32A:
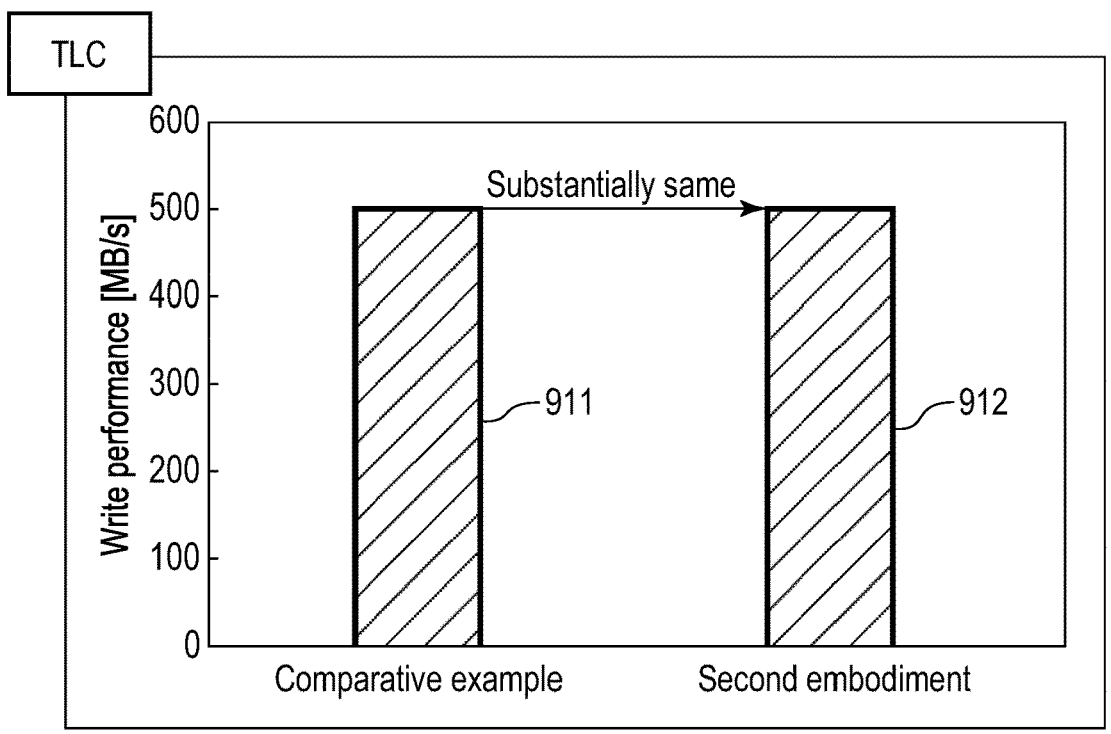
FIG. 32A is a diagram illustrating an example of an influence on write performance by writing intermediate ECCs in a logical block different from a logical block in which user data is written in the memory system according to the second embodiment.

FIG. 32A illustrates an example of an influence on performance by writing intermediate ECCs in a logical block different from a logical block in which user data is written in the memory system 3 according to the second embodiment. In the example illustrated in FIG. 32A, the controller of the memory system of the comparative example writes user data and an ECC into the logical block 7 in the TLC mode. On the other hand, the controller 4 of the memory system 3 of the second embodiment writes user data and a final ECC into the first logical block 8A in the TLC mode, and writes intermediate ECCs to the second logical block 8B in the SLC mode.

In this case, the write performance 912 of the memory system 3 of the second embodiment is substantially the same as the write performance 911 of the memory system of the comparative example. That is, in the memory system 3 of the second embodiment, when the user data and the final ECC are written to the first logical block 8A in the TLC mode, the influence of writing the intermediate ECCs to the second logical block 8B in the SLC mode on the write performance is minor.

Figure 32B:
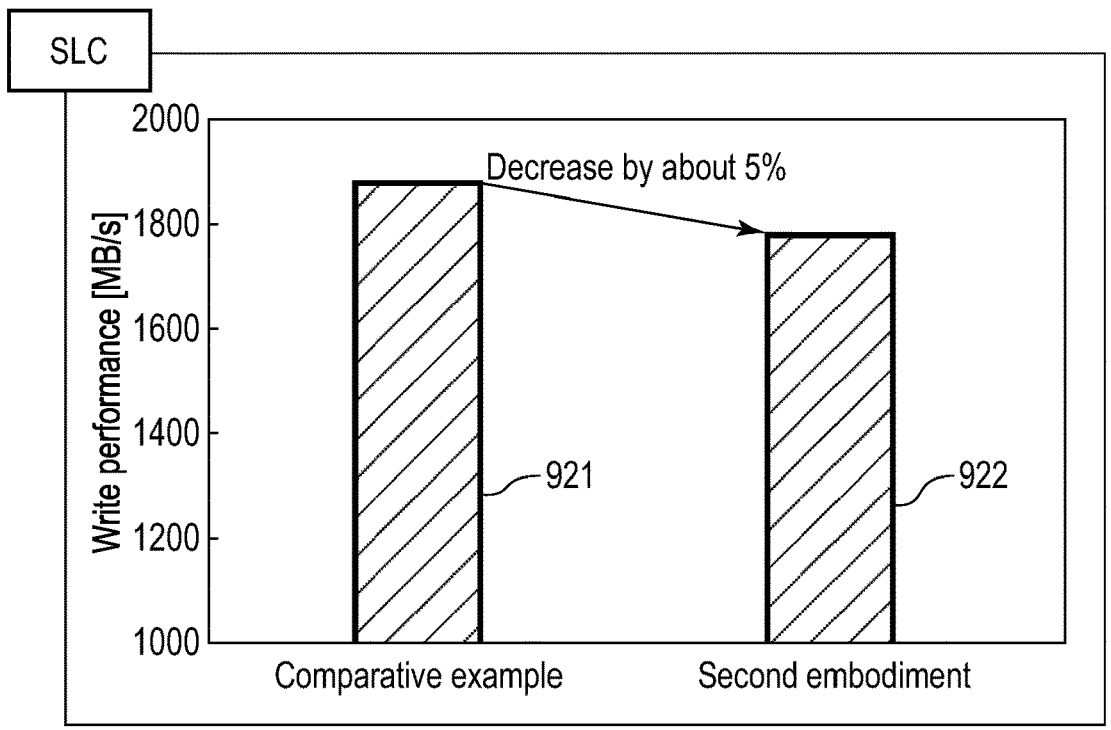
FIG. 32B is a diagram illustrating another example of an influence on write performance by writing intermediate ECCs in a logical block different from the logical block in which user data is written in the memory system according to the second embodiment.

FIG. 32B illustrates another example of an influence on performance by writing intermediate ECCs in a logical block different from a logical block in which user data is written in the memory system 3 according to the second embodiment. In the example illustrated in FIG. 32B, the controller of the memory system of the comparative example writes user data and an ECC into the logical block 7 in the SLC mode. On the other hand, the controller 4 of the memory system 3 of the second embodiment writes user data and a final ECC into the first logical block 8A in the SLC mode, and writes intermediate ECCs into the second logical block 8B in the SLC mode.

In this case, the write performance 922 of the memory system 3 of the second embodiment is about 5% lower than the write performance 921 of the memory system of the comparative example. That is, in the memory system 3 of the second embodiment, when the user data and the final ECC are written to the first logical block 8A in the SLC mode, the influence of writing the intermediate ECCs to the second logical block 8B in the SLC mode on the write performance is large.

The write performance in the SLC mode is higher than the write performance in the TLC mode. Therefore, when writing the user data and the final ECC to the first logical block 8A in the SLC mode, the influence on the write performance by writing the intermediate ECCs to the second logical block 8B becomes larger than when writing the intermediate ECCs in the TLC mode.

As a method for writing user data in the SLC mode, a method using an SLC buffer is available. The SLC buffer is composed of several blocks for the SLC mode. When the write mode is the SLC mode, the controller 4 writes user data into the SLC buffer in the SLC mode. The controller 4 then writes the user data in the SLC buffer into a block for the TLC mode in the TLC mode or a block for the QLC mode in the QLC mode by GC, for example.

As described above, the user data written in the SLC buffer is data temporarily stored, not data stored for long periods. Therefore, when writing user data to the SLC buffer, the number of blocks that are constantly used does not increase even in the method of writing user data and an ECC to the SLC buffer. That is, it does not affect the constant coding ratio in the nonvolatile memory 5.

Therefore, the controller 4 may dynamically change ECC generation and writing architecture depending on the mode in which user data is written.

Specifically, (1) in a case where user data is written in the SLC mode, the controller 4 writes the user data and an ECC into a logical block in the SLC mode. Therefore, the user data is protected by the ECC both during writing and after the writing is completed. In this case, since an intermediate ECC to be written to another logical block is not used, the deterioration of the write performance can be avoided.

In addition, (2) in a case where user data is written in the MLC mode, the TLC mode, or the QLC mode, the controller 4 writes the user data and a final ECC into a logical block in the MLC mode, the TLC mode, or the QLC mode, and writes an intermediate ECC to another logical block in the SLC mode. Note that the controller 4 may write the intermediate ECC to the other logical block in the MLC mode, the TLC mode, or the QLC mode. The user data is protected by the intermediate ECC during writing and is protected by the final ECC after the writing is completed. In this case, it is possible to reduce the constant coding ratio in the nonvolatile memory 5 while appropriately protecting the user data. In addition, the influence on the write performance is also minor.

FIG. 33 is a block diagram illustrating a configuration of a host write operation in the memory system 3 according to the second embodiment.

(1) The write control module 122 receives user data to be written to the nonvolatile memory 5 from the host 2 in accordance with receiving a write command from the host 2. The write control module 122 may accumulate the received user data in the WB 31.

(2) The write control module 122 transfers a user data portion to be written to the nonvolatile memory 5 to the storage I/F 13.

(3) The write control module 122 transfers the same user data portion as in (2) to the ECC encoder 15. Note that the write control module 122 may transfer, in parallel, the user data portion to the storage I/F 13 and the ECC encoder 15. Alternatively, the write control module 122 may transmit the user data portion to the ECC encoder 15 and then to the storage I/F 13.

(4) The ECC encoder 15 encodes the user data portion, thereby generating an ECC that constitutes an ECC frame together with the user data portion. The ECC encoder 15 generates an intermediate ECC for protecting a user data portion of the first protection unit or a final ECC for protecting a user data portion of the second protection unit. In a case where an ECC frame of the second size is composed of n logical WLSCs, the user data of the second protection unit includes n−1 user data portions of the first protection unit.

More specifically, the ECC encoder 15 encodes the user data portion of the first protection unit, thereby generating an intermediate ECC. The user data portion of the first protection unit and the intermediate ECC constitute an ECC frame of the first size. The ECC encoder 15 transfers the generated intermediate ECC to the storage I/F 13.

In addition, when n−1 combinations of a user data portion of the first protection unit and an intermediate ECC which are included in n−1 ECC frames of the first size, respectively, have been written into the nonvolatile memory 5, the ECC encoder 15 encodes the n−1 user data portions of the first protection unit and another second user data portion to be written to the nonvolatile memory 5, thereby generating a final ECC. The n−1 user data portions of the first protection unit, the second user data portion, and the final ECC constitute an ECC frame of the second size. The second size is larger than the first size. In addition, data obtained by combining the n−1 user data portions of the first protection unit and the second user data portion is a user data portion of the second protection unit. The ECC encoder 15 transfers the generated final ECC to the storage I/F 13.

(5) The storage I/F 13 writes the user data portion of the first protection unit transferred by the write control module 122 and the intermediate ECC transferred by the ECC encoder 15 into the nonvolatile memory 5.

More specifically, the storage I/F 13 writes the user data portion of the first protection unit into a logical block (hereinafter referred to as a first logical block). Specifically, the storage I/F 13 writes, in parallel, data portions which are obtained by dividing the user data portion of the first protection unit into WLSC units, to physical blocks, respectively, that constitute the first logical block.

Further, the storage I/F 13 writes the intermediate ECC to at least one physical block in another logical block (hereinafter referred to as a second logical block). For example, when the size of the intermediate ECC is equivalent to the size of two WLSCs, the storage I/F 13 writes, in parallel, two data portions of the WLSC unit which are obtained by dividing the intermediate ECC, to two physical blocks in the second logical block. Note that the storage I/F 13 may write the intermediate ECC to a physical block allocated for writing intermediate ECCs.

As a result, the user data portion of the first protection unit is protected by the corresponding intermediate ECC.

In (4), the ECC encoder 15 may transfer the intermediate ECC to the DRAM I/F 14. In this case, the DRAM I/F 14 stores the intermediate ECC to the DRAM 6.

In addition, the storage I/F 13 writes the second user data unit transferred by the write control module 122 and the final ECC transferred by the ECC encoder 15 into the nonvolatile memory 5.

More specifically, the storage I/F 13 writes the second user data portion and the final ECC into the first logical block. Specifically, the storage I/F 13 writes, in parallel, data portions which are obtained by dividing the second user data portion and the final ECC into WLSC units, to the physical blocks, respectively, that constitute the first logical block. As a result, the user data portion of the second protection unit is protected by the corresponding final ECC. That is, the n−1 user data portions of the first protection unit and the second user data portion are protected by the corresponding final ECC.

(6) The storage I/F 13 reads the n−1 user data portions of the first protection unit, the second user data portion, and the final ECC which have been written in (5), from the nonvolatile memory 5 according to a read instruction by the write control module 122.

(7) The storage I/F 13 transfers the read n−1 user data portions of the first protection unit, the second user data portion, and the final ECC to the write control module 122.

(8) The write control module 122 performs error correction processing on the n−1 user data portions of the first protection unit, the second user data unit, and the final ECC by using an intra-page ECC. The write control module 122 invalidates the n−1 intermediate ECCs that are included in the n−1 ECC frames of the first size, respectively, and are stored in the nonvolatile memory 5 or the DRAM 6 in accordance with the success of the error correction. Specifically, the write control module 122 determines, for example, a physical address of each of the n−1 user data portions of the first protection unit that constitute the ECC frame of the second size. The write control module 122 updates the data address-ECC address correspondence table 37 so that the determined physical address of the user data portion is not associated with any physical address of an intermediate ECC. As a result, the n−1 intermediate ECCs that correspond to the n−1 user data portions of the first protection unit, respectively, are invalidated. Note that the write control module 122 performs refresh processing on the first logical block when the error correction using the intra-page ECC is not successful. In the refresh processing, data stored in the first logical block is rewritten to another logical block.

With the configuration illustrated in FIG. 33 above, the controller 4 can protect the user data portion of the first protection unit by the intermediate ECC. In addition, the controller 4 can protect the user data portion of the second protection unit by the final ECC.

Note that prior to the operation (8) in FIG. 33, when the read control module 121 reads at least part of the user data portion of the first protection unit from the nonvolatile memory 5, and an error occurs in the read user data portion, the error correction processing module 124 performs error correction processing. Specifically, the error correction processing module 124 reads the corresponding intermediate ECC from the nonvolatile memory 5. The error correction processing module 124 performs error correction processing using the reading result of the intermediate ECC and the reading result of all the user data portion of the first protection unit.

FIG. 34 is a block diagram illustrating a configuration example of a GC operation in the memory system 3 according to the second embodiment.

(1) The storage I/F 13 reads data (hereinafter referred to as a GC data portion) from a GC source block in the nonvolatile memory 5 in accordance with a read instruction by a GC control module 123. The GC data portion includes at least one of valid data and invalid data.

(2) The storage I/F 13 transfers the GC data portion to the GC control module 123. The GC control module 123 may accumulate the GC data portion in the GC buffer 32.

(3) The GC control module 123 transfers the valid data in the GC data portion to the storage I/F 13.

(4) The GC control module 123 transfers valid data in the GC data portion to the ECC encoder 15. The GC control module 123 may transfer the valid data in parallel to the storage I/F 13 and the ECC encoder 15. Alternatively, the GC control module 123 may transfer the valid data to the ECC encoder 15 and then to the storage I/F 13.

The subsequent operations (5) to (9) are the same as the operations (4) to (8) in FIG. 33, except that the user data is replaced with the valid data.

With the configuration illustrated in FIG. 34 above, the controller 4 can protect valid data of the first protection unit by an intermediate ECC. In addition, the controller 4 can protect valid data of the second protection unit by a final ECC.

Figure 35A:
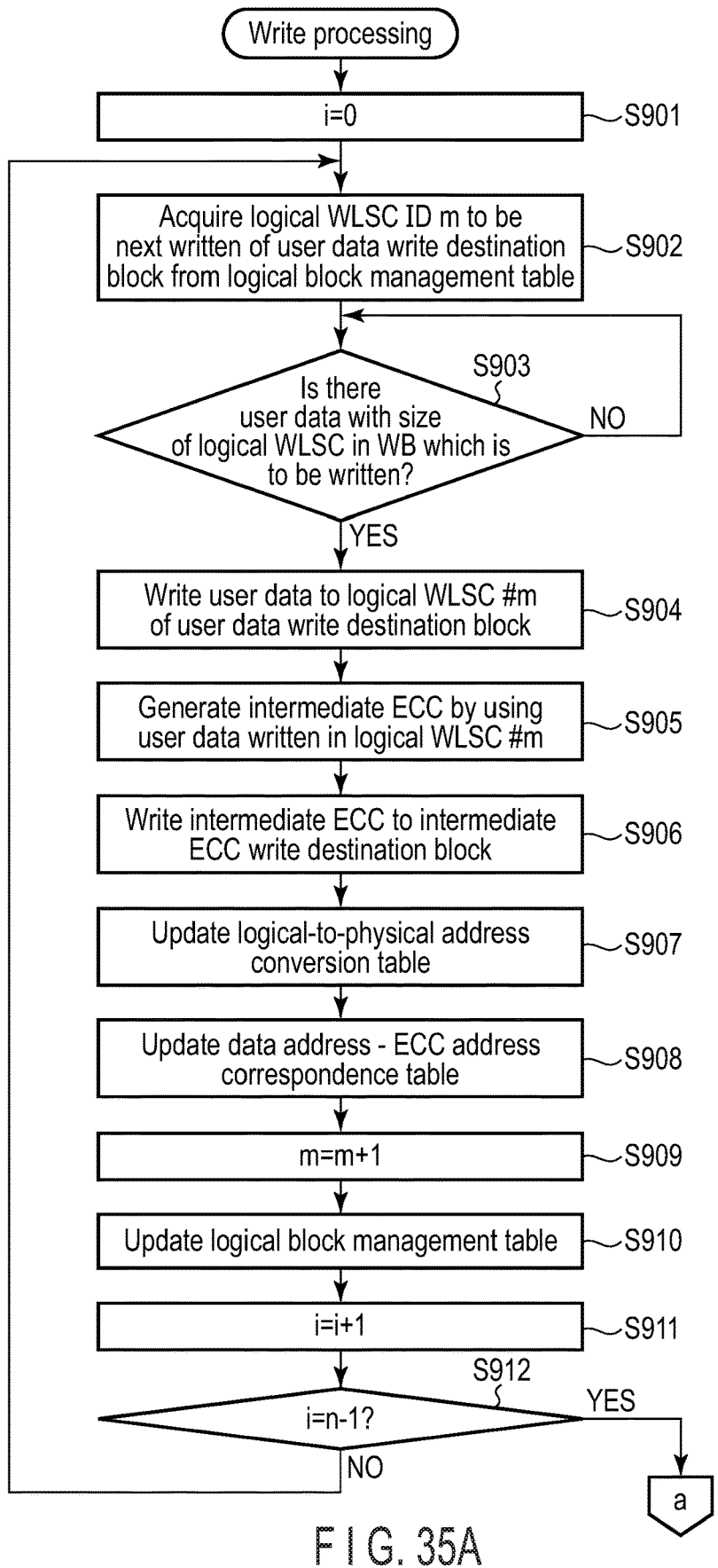
FIG. 35A is a flowchart illustrating an example of the procedure of write processing executed by a write control module in a controller in the memory system according to the second embodiment
Figure 35B:
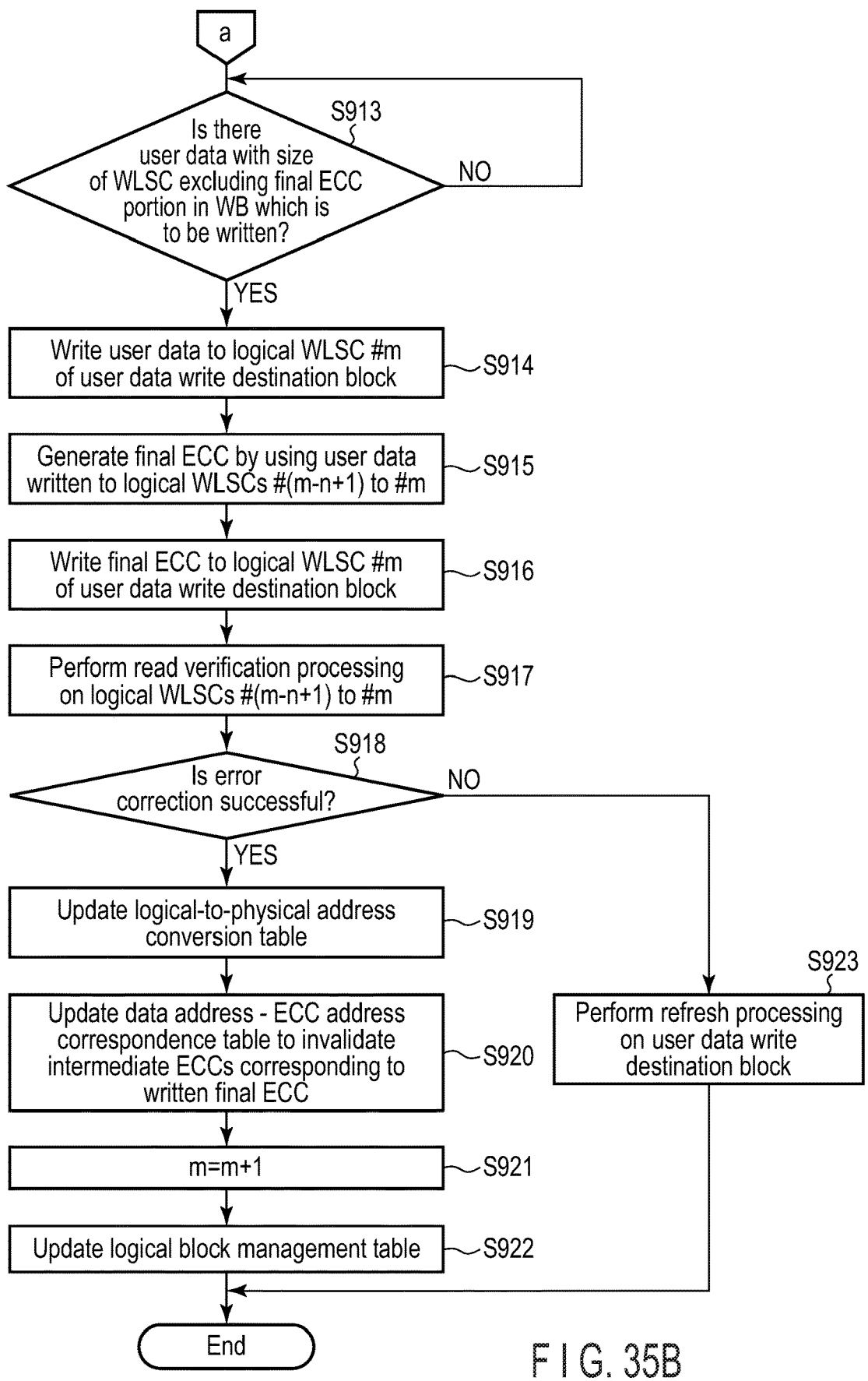
FIG. 35B is a flowchart illustrating an example of the procedure of the write processing following FIG. 35A.

FIGS. 35A and 35B are flowcharts illustrating an example of the procedure of write processing executed by the write control module 122 in the controller 4 in the memory system 3 according to the second embodiment. Here, a case where n logical WLSCs function as a unit protected by a final ECC is exemplified. n is an integer of two or more. In addition, it is assumed that a logical block has already been supplied as a write destination block of user data. It is assumed that a logical block or a physical block has already been supplied as a write destination block of intermediate ECCs. Note that although the write processing performed in response to reception of a write command from the host 2 is exemplified, the same write processing may be performed in internal operations of the memory system 3 (for example, a GC operation, a refresh operation, and a wear leveling operation).

The write control module 122 sets a variable i to zero (S901). Then, the write control module 122 acquires the logical WLSC ID m to be next written of the user data write destination block from the logical block management table 38 (S902).

Next, the write control module 122 determines whether or not user data with the size of a logical WLSC which is to be written to the user data write destination block is accumulated in the WB 31 (S903).

If user data with the size of a logical WLSC which is to be written to the user data write destination block is not accumulated in the WB 31 (S903 NO), the write control module 122 returns to the procedure of S903.

If user data with size of a logical WLSC which is to be written to the user data write destination block is accumulated in the WB 31 (S903 YES), the write control module 122 writes the user data with the size of a logical WLSC into a logical WLSC #m of the user data write destination block (S904).

Then, the write control module 122 encodes the user data written in the logical WLSC #m with the ECC encoder 15, thereby generating an intermediate ECC (S905). The generated intermediate ECC constitutes an ECC frame of the first size together with the user data written in the logical WLSC #m. The write control module 122 writes the generated intermediate ECC into an intermediate ECC write destination block (S906).

Next, the write control module 122 updates the logical-to-physical address conversion table 35 so as to indicate the mapping between the physical address and the logical address of the user data written in the logical WLSC #m (S907). The write control module 122 updates the data address-ECC address correspondence table 37 so as to indicate the correspondence between the physical address of the user data written in the logical WLSC #m and the physical address of the intermediate ECC written in the intermediate ECC write destination block (S908).

Then, the write control module 122 adds one to the logical WLSC ID to be next written m (S909). The write control module 122 updates the logical block management table 38 by using the logical WLSC ID to be written next m after one is added in 3909 (S910). That is, the write control module 122 updates the logical block management table 38 so that the user data write destination block is associated with the logical WLSC ID to be next written m after one is added in S909.

Next, the write control module 122 adds one to the variable i (S911). The write control module 122 determines whether or not the variable i is equal to n−1 (S912). The variable i indicates the number of logical WLSCs written by the write processing. Therefore, in S912, the write control module 122 determines whether the logical WLSC to be next written is a logical WLSC including only user data or a logical WLSC including user data and a final ECC.

If the variable i is not equal to n−1 (S912 NO), the write control module 122 proceeds to the procedure of 3902. That is, the write control module 122 proceeds to the procedure of S902 so as to write a logical WLSC including another user data into the user data write destination block and write an intermediate ECC for the written user data into the intermediate ECC write destination block.

If the variable i is equal to n−1 (S912 YES), the write control module 122 proceeds to the procedure of 3913 illustrated in FIG. 35B. That is, the write control module 122 determines whether or not user data with the size of a logical WLSC excluding a final ECC portion which is to be written to the user data write destination block is accumulated in the WB 31 (S913). If user data with the size of a logical WLSC excluding a final ECC portion which is to be written to the user data write destination block is not accumulated in the WB 31 (S913 NO), the write control module 122 returns to the procedure of S913.

If user data with the size of a logical WLSC excluding a final ECC portion which is to be written to the user data write destination block is accumulated in the WB 31 (S913 YES), the write control module 122 writes the user data with the size of a logical WLSC excluding a final ECC portion into the logical WLSC #m of the user data write destination block (S914). The write control module 122 generates a final ECC using the user data written in the logical WLSCs #(m−n+1) to #m with the ECC encoder 15 (S915). The generated final ECC constitutes an ECC frame of the second size together with the user data written in the logical WLSCs #(m−n+1) to #m. The write control module 122 writes the generated final ECC into the logical WLSC #m of the user data write destination block (S916).

Next, the write control module 122 performs read verification processing for the logical WLSCs #(m−n+1) to #m (S917). Specifically, the write control module 122 reads data from storage areas of the logical WLSCs #(m−n+1) to #m. Then, the write control module 122 performs error correction for the read data by using an intra-page ECC.

The write control module 122 determines whether or not the error correction of the read data in the read verification processing is successful (S918).

If the error correction of the read data is successful (S918 YES), the write control module 122 updates the logical-to-physical address conversion table 35 so as to indicate the mapping between the physical address and the logical address of the user data written in the logical WLSC #m (S919). The write control module 122 updates the data address-ECC address correspondence table 37 to invalidate the intermediate ECCs corresponding to the written final ECC (S920). That is, since the final ECC corresponding to the ECC frame of the second size is written in the logical WLSC #m, the write control module 122 invalidates the intermediate ECCs that are generated for the user data in the ECC frame of the second size and are written in the intermediate ECC write destination block. More specifically, the write control module 122 deletes an entry corresponding to an intermediate ECC to be invalidated from the data address-ECC address correspondence table 37, thereby invalidating the intermediate ECC.

Next, the write control module 122 adds one to the logical WLSC ID to be next written m (S921). The write control module 122 updates the logical block management table 38 by using the logical WLSC ID to be next written m after one is added in S921 (S922), and ends the write processing (end). Note that when data is written up to the end of the user data write destination block, the write control module 122 may supply another logical block as a new write destination block of user data. The write control module 122 updates the logical block management table 38 so that user data is written into the new write destination block. Specifically, the write control module 122 sets "No" in the writing field in the entry of the logical block management table 38 corresponding to the current user data write destination block. Then, the write control module 122 sets "Yes" in the writing field in the entry of the logical block management table 38 corresponding to the new user data write destination block. In addition, the write control module 122 sets zero in the RV completed logical WLSC ID field and sets zero in the logical WLSC ID to be next written field, in the entry of the logical block management table 38 corresponding to the new user data write destination block.

If the error correction of the read data is not successful (S918 NO), the write control module 122 performs refresh processing for the user data write destination block (S923), and ends the write processing (end). In the refresh processing, the write control module 122 rewrites valid data stored in the user data write destination block to another logical block.

By the write processing illustrated in FIGS. 35A and 35B above, the write control module 122 can protect n logical WLSCs stored in the logical block by a final ECC. Further, the write control module 122 can protect each of user data portions which are written in n−1 logical WLSCs, respectively, by the corresponding intermediate ECC from the time when writing the user data portions to the n−1 logical WLSCs of the user data write destination block until the integrity of the user data portions is confirmed with read verification.

Note that the procedure of write processing by the GC control module 123 is also the same as the procedure of the write processing by the write control module 122. Specifically, in the procedure of the write processing by the GC control module 123, user data accumulated in the WB 31 in the procedure of the write processing illustrated in FIGS. 35A and 35B is replaced with valid data accumulated in the GC buffer 32. The valid data accumulated in the GC buffer 32 is valid data copied from a GC source block.

Figure 36:
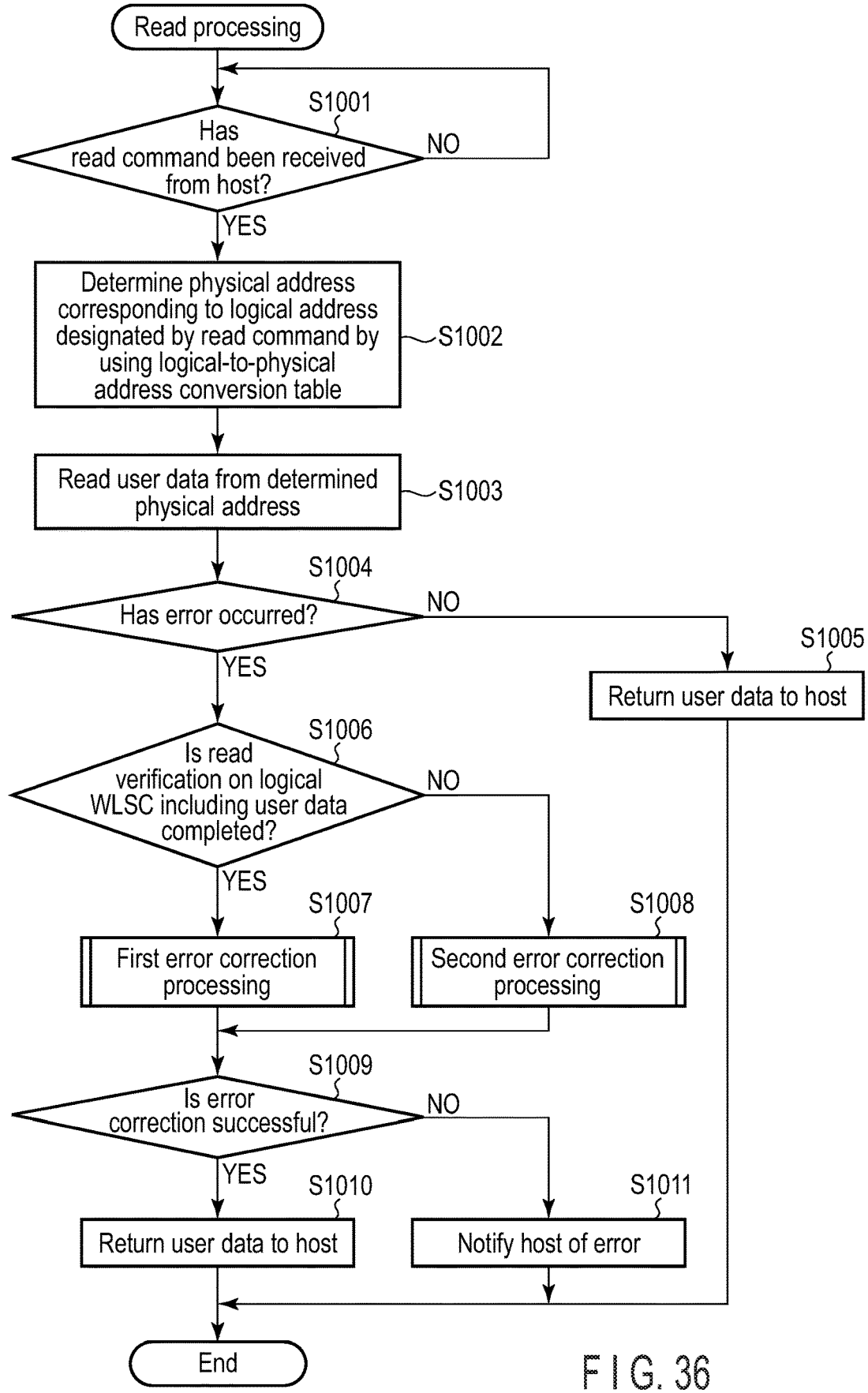
FIG. 36 is a flowchart illustrating an example of the procedure of read processing executed by a read control module and an error correction processing module in the controller in the memory system according to the second embodiment.

FIG. 36 is a flowchart illustrating an example of the procedure of read processing executed by the read control module 121 and the error correction processing module 124 in the controller 4 in the memory system 3 according to the second embodiment. Here, although the read processing performed in accordance with reception of a read command from the host 2 is exemplified, the same read processing may be performed in internal operations of the memory system 3 (for example, a GC operation, a refresh operation, and a wear leveling operation).

The procedure from S1001 to S1003 is the same as the procedure from S501 to S503 of the read processing described above with reference to the flowchart of FIG. 22.

After reading user data corresponding to the read command in S1003, the read control module 121 determines whether or not an error has occurred in the read user data (S1004). Hereinafter, the read user data is also referred to as read data. Specifically, the read control module 121 performs error correction processing for the read data by using an intra-page ECC included in the read data. If the error correction processing is successful, the read control module 121 determines that no error occurs in the read data. If the error correction processing is not successful, the read control module 121 determines that an error has occurred in the read data.

If no error occurs in the read data (S1004: NO), the read control module 121 returns the read data to the host 2 (S1005) and ends the read processing (end).

If an error has occurred in the read data (S1004 YES), the error correction processing module 124 determines whether or not read verification for the logical WLSC including the read data is completed by using the logical block management table 38 (S1006). Specifically, the error correction processing module 124 acquires the RV completed logical WLSC ID associated with the logical block in which the read data is stored from the logical block management table 38. Then, the error correction processing module 124 determines whether or not the acquired RV completed logical WLSC ID is the same as or later than the ID of the logical WLSC including the read data. If the acquired RV completed logical WLSC ID is the same as or later than the ID of the logical WLSC including the read data, the error correction processing module 124 determines that the read verification for the logical WLSC including the read data is completed. If the acquired RV completed logical WLSC ID is earlier than the ID of the logical WLSC including the read data, the error correction processing module 124 determines that the read verification for the logical WLSC including the read data is not completed.

If the read verification for the logical WLSC including the read data is completed (S1006 YES), the error correction processing module 124 executes first error correction processing (S1007), and proceeds to the procedure of S1009. In the first error correction processing, the final ECC is used to perform error correction for the ECC frame of the second size including the user data (read data) in which the error occurred. The detailed procedure of the first error correction processing will be described later with reference to the flowchart of FIG. 37.

If the read verification for the logical WLSC including the read data is not completed (S1006 NO), the error correction processing module 124 executes second error correction processing (S1008), and proceeds to the procedure of S1009. In the second error correction processing, the intermediate ECC is used to perform error correction in the ECC frame of the first size including the user data in which the error occurred. The detailed procedure of the second error correction processing will be described later with reference to the flowchart of FIG. 38.

The error correction processing module 124 determines whether or not the error correction by the procedure of S1007 or S1008 is successful (S1009). If the error correction is successful (S1009 YES), the error correction processing module 124 returns the error-corrected user data to the host 2 (S1010), and ends the read processing (end). If the error correction is not successful (S1009 NO), the error correction processing module 124 notifies the host 2 of the error (S1011) and ends the read processing (end). Note that the error correction processing module 124 does not have to notify the host 2 of the error correction failure of data read in accordance with an internal operation.

By the read processing illustrated in FIG. 36 above, the read control module 121 and the error correction processing module 124 can return the user data corresponding to the read command to the host 2, or notify the host 2 that an error has occurred in the processing according to the read command. If the error has occurred in the read user data, the error correction processing module 124 can execute the error correction processing for correcting the error. Note that similarly to when an error occurs in data read during the GC processing by the GC control module 123, the error correction processing module 124 can execute the error correction processing for correcting the error in the read data.

Figure 37:
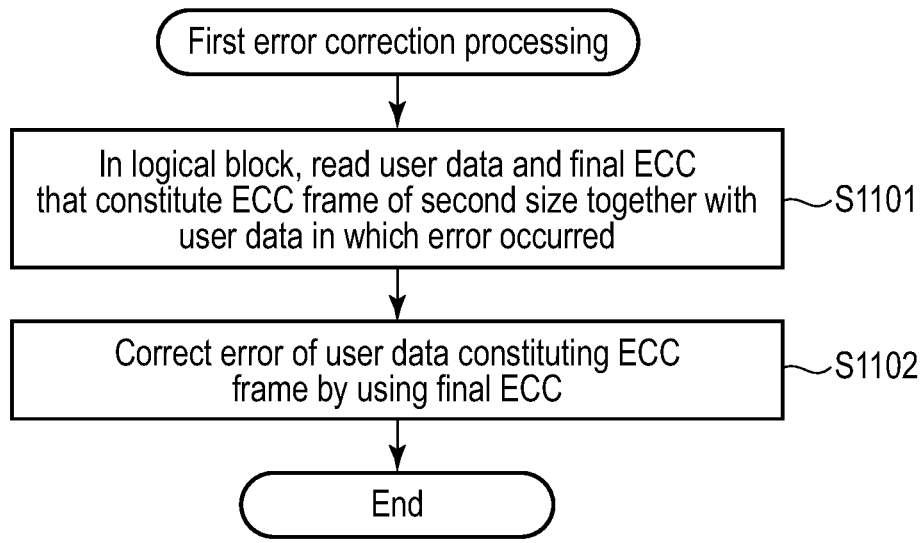
FIG. 37 is a flowchart illustrating an example of the procedure of first error correction processing executed by the error correction processing module in the controller in the memory system according to the second embodiment.

FIG. 37 is a flowchart illustrating an example of the procedure of first error correction processing executed by the error correction processing module 124 in the controller 4 in the memory system 3 according to the second embodiment. The first error correction processing is processing executed when an error occurs in read user data and read verification for a logical WLSC including the read user data is completed. The user data included in the logical WLSC for which the read verification is completed is protected by a final ECC.

The error correction processing module 124 reads user data and a final ECC constituting an ECC frame of the second size together with the user data in which the error occurred, in a logical block (S1101). The error correction processing module 124 performs error correction for the user data constituting the ECC frame of the second size by using the final ECC (S1102), and ends the first error correction processing (end).

By the first error correction processing illustrated in FIG. 37 above, the error correction processing module 124 can correct the error of the user data included in the logical WLSC for which the read verification is completed by using the final ECC.

Figure 38:
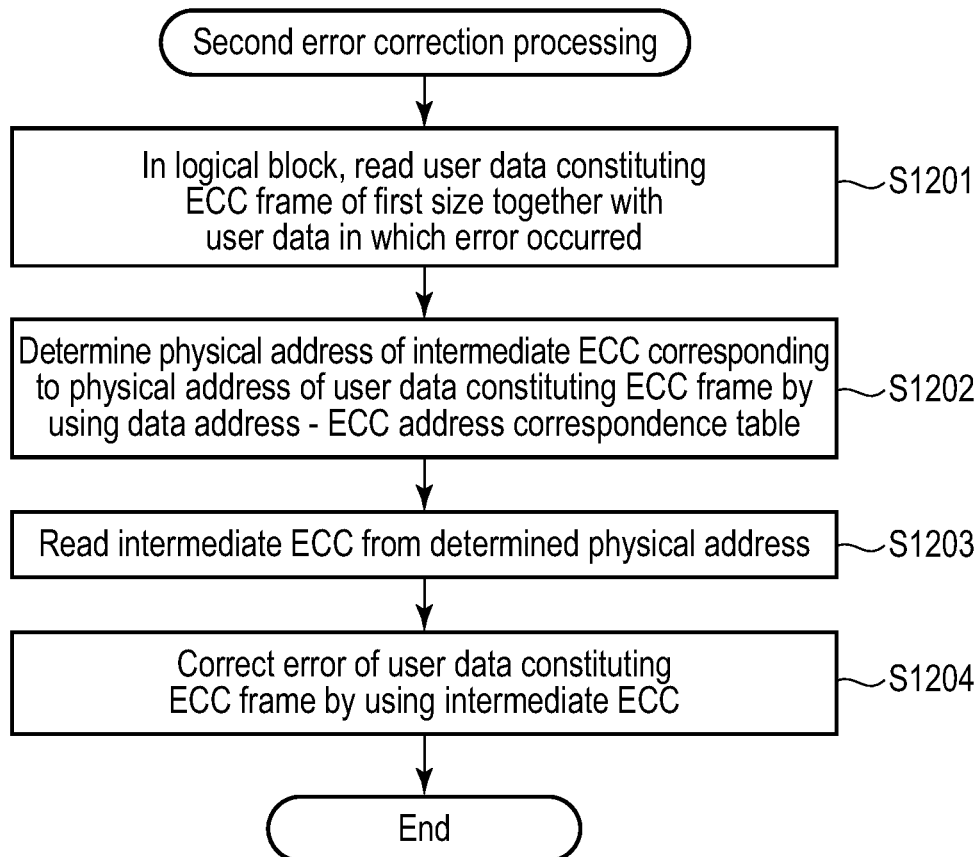
FIG. 38 is a flowchart illustrating an example of the procedure of second error correction processing executed by the error correction processing module in the controller in the memory system according to the second embodiment.

FIG. 38 is a flowchart illustrating an example of the procedure of second error correction processing executed by the error correction processing module 124 in the controller 4 in the memory system 3 according to the second embodiment. The second error correction processing is processing executed when an error occurs in read user data and read verification for a logical WLSC including the read user data is not completed. The user data included in the logical WLSC for which the read verification is not completed is protected by an intermediate ECC.

The error correction processing module 124 reads user data constituting an ECC frame of the first size together with the user data in which the error occurred, in a logical block (S1201). The error correction processing module 124 determines the physical address of the intermediate ECC corresponding to the physical address of the user data constituting the ECC frame of the first size by using the data address-ECC address correspondence table 37 (S1202).

Next, the error correction processing module 124 reads the intermediate ECC from the determined physical address of the intermediate ECC (S1203). The intermediate ECC is stored in a logical block different from the logical block that stores the user data. The error correction processing module 124 performs error correction of the user data constituting the ECC frame of the first size by using the read intermediate ECC (S1204).

By the second error correction processing illustrated in FIG. 38 above, the error correction processing module 124 can correct the error of the user data included in the logical WLSC for which the read verification is not completed by using the intermediate ECC.

As described above, according to the second embodiment, it is possible to improve the constant coding ratio in the nonvolatile memory 5 while appropriately protecting user data. The controller 4 generates a first ECC that constitutes an ECC frame of the first size together with a data portion of the first protection unit to be written to the nonvolatile memory 5 by encoding the data portion of the first protection unit, writes the data portion of the first protection unit into the nonvolatile memory 5, and writes the first ECC into the nonvolatile memory 5 or stores the first ECC in the RAM such as the DRAM 6. When the controller 4 writes n−1 data portions of the first protection unit which are included in n−1 ECC frames of the first size, respectively, into the nonvolatile memory 5, the controller 4 generates a second ECC that constitutes an ECC frame of the second size together with the n−1 data portions of the first protection unit and a second data portion to be written to the nonvolatile memory 5 by encoding the n−1 data portions of the first protection unit and the second data portion, and writes the second data portion and the second ECC into the nonvolatile memory 5. Then, the controller 4 sets, in an invalid state, each of n−1 ECCs that are included in the n−1 ECC frames of the first size, respectively, and are stored in the nonvolatile memory 5 or in the RAM such as the DRAM 6. Note that n is an integer of two or more.

As a result, the controller 4 can protect the data portion of the first protection unit by the ECC frame of the first size. Further, when the n−1 data portions of the first protection unit that are included in the n−1 ECC frames of the first size, respectively, are written into the nonvolatile memory 5, the controller 4 can protect the n−1 data portions of the first protection unit and the second data portion by the ECC frame of the second size. When the n−1 data portions of the first protection unit and the second data portion are protected by the ECC frame of the second size, the controller 4 discards the ECC constituting the ECC frame of the first size.

Therefore, the controller 4 can improve the constant coding ratio in the nonvolatile memory 5 while appropriately protecting user data.

Each of the various functions described in the present embodiment may be realized by a circuit (processing circuit). Examples of the processing circuit include a programmed processor, such as a central processing unit (CPU). The processor executes each of the functions described by executing a computer program (instructions) stored in the memory. The processor may be a microprocessor including an electrical circuit. Examples of the processing circuit also include a digital signal processor (DSP), an application specific integrated circuit (ASIC), a microcontroller, a controller, and other electrical circuit components. Each of the components other than the CPU described in the present embodiment may also be realized by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a nonvolatile memory, comprising:
    generating a first error correction code that constitutes an error correction code frame of a first size together with a data portion of a first unit to be written into the nonvolatile memory by encoding the data portion of the first unit,
    writing the data portion of the first unit into the nonvolatile memory, and writing the first error correction code into the nonvolatile memory or storing the first error correction code in a random access memory; and
    when writing n−1 data portions of the first unit that are included in n−1 error correction code frames of the first size, respectively, in the nonvolatile memory,
        generating a second error correction code that constitutes an error correction code frame of a second size together with the n−1 data portions of the first unit and a second data portion to be written into the nonvolatile memory by encoding the n−1 data portions of the first unit and the second data portion, and
        writing the second data portion and the second error correction code into the nonvolatile memory,
    wherein n is an integer greater than one.

2. The method of claim 1, further comprising
    setting, in an invalid state, each of n−1 error correction codes that are stored in the nonvolatile memory or the random access memory and are included in the n−1 error correction code frames of the first size, respectively, after writing the second data portion and the second error correction code into the nonvolatile memory.

3. The method of claim 2, further comprising
    setting each of the n−1 error correction codes in the invalid state by deleting, from first information that includes a plurality pieces of second information each indicative of an address in the nonvolatile memory or an address in the random access memory in which an error correction code is stored, n−1 pieces of second information that correspond to the n−1 error correction codes, respectively.

4. The method of claim 2, further comprising
    setting each of the n−1 error correction codes in the invalid state by changing, in third information that includes a plurality pieces of fourth information each indicative of validity or invalidity of an error correction code, n−1 pieces of fourth information that correspond to the n−1 error correction codes, respectively, from valid to invalid.

5. The method of claim 1, further comprising
    when erasing a third data portion of the first unit that is included in an error correction code frame of the second size and is stored in the nonvolatile memory:
        generating a third error correction code corresponding to the third data portion; and
        writing the third error correction code into the nonvolatile memory or storing the third error correction code in the random access memory.

6. The method of claim 5, further comprising:
    reading a fourth data portion included in an error correction code frame of the second size from the nonvolatile memory; and
    when an error is detected in the read fourth data portion, performing error correction processing on a data portion in the error correction code frame of the second size excluding the third data portion by using a fourth error correction code obtained by subtracting the third error correction code from the second error correction code.

7. The method of claim 6, further comprising
    detecting the error in the read fourth data portion by using an error correction code included in the fourth data portion.

8. The method of claim 1, further comprising:
    reading part or all of a fifth data portion of the first unit from the nonvolatile memory; and
    when an error is detected in the read part or all of the fifth data portion, performing error correction processing on the fifth data portion by using the first error correction code that constitutes an error correction code frame of the first size together with the fifth data portion.

9. The method of claim 1, further comprising
    performing, when writing of part or all of a sixth data portion of the first unit into the nonvolatile memory is not successful, error correction processing on the sixth data portion by using the first error correction code that constitutes an error correction code frame of the first size together with the sixth data portion.

10. The method of claim 1, wherein
    the nonvolatile memory includes n first physical blocks and a second physical block, and
    the method further comprises:
        generating the first error correction code that constitutes the error correction code frame of the first size together with the data portion of the first unit to be written into the nonvolatile memory by encoding the data portion of the first unit,
        writing the data portion of the first unit to one of the n first physical blocks, and
        writing the first error correction code to the second physical block or storing the first error correction code in the random access memory; and
        when writing the n−1 data portions of the first unit which are included in the n−1 error correction code frames of the first size, respectively, in n−1 physical blocks of the n first physical blocks,
            generating the second error correction code that constitutes the error correction code frame of the second size together with the n−1 data portions of the first unit and the second data portion to be written to a remaining third physical block of the n physical blocks by encoding the n−1 data portions of the first unit and the second data portion, and
            writing the second data portion and the second error correction code to the third physical block.

11. The method of claim 10, further comprising
setting, in an invalid state, each of n−1 error correction codes that are stored in the second physical block or the random access memory and are included in the n−1 error correction code frames of the first size, respectively, after writing the second data portion and the second error correction code to the third physical block.

12. The method of claim 10, further comprising
when erasing a third data portion of the first unit that is included in the error correction code frame of the second size from a fourth physical block of the n first physical blocks:
generating a third error correction code corresponding to the third data portion; and
writing the third error correction code to the second physical block or storing the third error correction code in the random access memory.

13. The method of claim 12, further comprising:
reading a fourth data portion in an error correction code frame of the second size from one of n−1 fifth physical blocks that are obtained by excluding the fourth physical block from the n first physical blocks; and
performing error correction processing on a data portion that is included in the error correction code frame of the second size and is stored in the n−1 fifth physical blocks by using a fourth error correction code obtained by subtracting the third error correction code from the second error correction code, when an error is detected in the read fourth data portion.

14. The method of claim 1, wherein
the nonvolatile memory includes a plurality of physical blocks, and
the method further comprises:
managing a plurality of logical blocks each including a set of one or more of the plurality of physical blocks, a first logical block of the plurality of logical blocks including n logical storage areas, each of the n logical storage areas corresponding to the first unit,
generating the first error correction code that constitutes the error correction code frame of the first size together with the data portion of the first unit to be written into the nonvolatile memory by encoding the data portion of the first unit,
writing the data portion of the first unit into one of the n logical storage areas, and
writing the first error correction code into a second logical block of the plurality of logical blocks or a first physical block of the plurality of physical blocks or storing the first error correction code in the random access memory; and
when writing the n−1 data portions of the first unit that are included in the n−1 error correction code frames of the first size, respectively, in n−1 logical storage areas of the n logical storage areas, respectively,
generating the second error correction code that constitutes the error correction code frame of the second size together with the n−1 data portions of the first unit and the second data portion to be written into a remaining first logical storage area of the n logical storage areas by encoding the n−1 data portions of the first unit and the second data portion, and
writing the second data portion and the second error correction code into the first logical storage area.

15. The method of claim 14, further comprising
setting, in an invalid state, each of n−1 error correction codes that are included in the n−1 first size error correction code frames, respectively, and are stored in one of the second logical block, the first physical block, and the random access memory, after writing the second data portion and the second error correction code into the first logical storage area.

16. The method of claim 15, further comprising:
reading the n−1 data portions of the first unit, the second data portion and the second error correction code from the n logical storage areas, after writing the second data portion and the second error correction code into the first logical storage area; and
setting, in an invalid state, the n−1 error correction codes that are included in the n−1 error correction code frames of the first size, respectively, and are stored in the one of the second logical block, the first physical block, and the random access memory, when integrity of the read n−1 data portions of the first unit, the second data portion and the second error correction code is confirmed.

17. The method of claim 14, wherein
the first error correction code is equal to the second error correction code in data length.

18. The method of claim 14, wherein
the first unit corresponds to a data unit that is able to be written in a parallel write operation.

19. The method of claim 14, wherein
each of the n logical storage areas corresponds to a logical word line string chunk.

20. The method of claim 14, wherein
the first logical block includes n physical blocks,
each of the n logical storage areas is composed of n storage areas that are included in the n physical blocks, respectively, and
the method further comprises
writing, in parallel, data to the n storage areas.

21. The method of claim 1, wherein
the first error correction code and the second error correction code are both linear codes.

22. The method of claim 1, wherein
the second data portion has a size obtained by subtracting a size of the second error correction code from a size of the data portion of the first unit.

\* \* \* \* \*